US011131404B2

(12) United States Patent
Hoots et al.

(10) Patent No.: US 11,131,404 B2
(45) Date of Patent: Sep. 28, 2021

(54) BALL VALVE

(71) Applicant: Hayward Industries, Inc., Berkeley Heights, NJ (US)

(72) Inventors: Joshua Lee Hoots, Clemmons, NC (US); Jon Terence Stone, Clemmons, NC (US); Paul M. Gutmann, Knoxville, TN (US)

(73) Assignee: Hayward Industries, Inc., Berkeley Heights, NJ (US)

( * ) Notice: Subject to any disclaimer, the term of this patent is extended or adjusted under 35 U.S.C. 154(b) by 956 days.

(21) Appl. No.: 15/349,183

(22) Filed: Nov. 11, 2016

(65) Prior Publication Data

US 2017/0138504 A1 May 18, 2017

Related U.S. Application Data

(60) Provisional application No. 62/255,849, filed on Nov. 16, 2015.

(51) Int. Cl.
*F16K 35/10* (2006.01)
*F16K 5/06* (2006.01)
(Continued)

(52) U.S. Cl.
CPC ............ *F16K 35/10* (2013.01); *F16K 5/0626* (2013.01); *F16K 5/0642* (2013.01);
(Continued)

(58) Field of Classification Search
CPC ........ F16K 5/0642; F16K 35/00; F16K 35/06; F16K 35/10; F16K 5/205; F16K 5/207;
(Continued)

(56) References Cited

U.S. PATENT DOCUMENTS 3,380,708 A 4/1968 Scaramucci
3,788,602 A * 1/1974 Kitzie ................. A61M 39/223
251/312
(Continued)

FOREIGN PATENT DOCUMENTS

DE 3336099 A1 4/1984
EP 0209633 A1 1/1987
(Continued)

OTHER PUBLICATIONS

Extended European Search Report dated Mar. 6, 2019, issued by the European Patent Office in connection with European Patent Application No. 16866928.1 (12 pages).
(Continued)

*Primary Examiner* — Kevin F Murphy
*Assistant Examiner* — Jonathan J. Waddy
(74) *Attorney, Agent, or Firm* — McCarter & English, LLP

(57) ABSTRACT

Improved flow control assemblies for fluid systems (e.g., industrial and/or commercial systems) are provided. More particularly, the present disclosure provides for advantageous ball valve assemblies for fluid systems. In exemplary embodiments, the present disclosure provides for improved ball valve assemblies and related features, systems and methods of use. Exemplary ball valve assemblies of the present disclosure offer advantages over conventional assemblies including, without limitation, advantages in the sealing mechanisms of the ball valve assemblies, and advantages with the user interfaces of the ball valve assemblies (e.g., advantages with the lockout mechanisms). Improved, convenient and effective systems and methods for utilizing improved ball valve assemblies in fluid systems are provided.

50 Claims, 51 Drawing Sheets

(51) Int. Cl.
*F16K 27/06* (2006.01)
*F16K 5/20* (2006.01)

(52) U.S. Cl.
CPC .......... *F16K 5/0647* (2013.01); *F16K 5/0689* (2013.01); *F16K 5/205* (2013.01); *F16K 27/067* (2013.01)

(58) Field of Classification Search
CPC ...... F16K 5/208; F16K 5/0626; F16K 5/0647; F16K 5/0689; F16K 27/067
USPC .................. 251/90, 91, 92, 93, 312, 315.14; 137/384.2, 384.4, 385
See application file for complete search history.

(56) References Cited

U.S. PATENT DOCUMENTS

| | | | |
|---|---|---|---|
| 3,857,408 A | | 12/1974 | Rhodes et al. |
| 3,894,718 A | | 7/1975 | Koch et al. |
| 4,023,773 A | * | 5/1977 | Wise ..................... F16K 5/0605 251/148 |
| 4,099,705 A | * | 7/1978 | Runyan ................. F16K 5/0642 251/171 |
| 4,113,229 A | * | 9/1978 | Fujiwara ............... F16K 5/0647 251/174 |
| 4,327,895 A | * | 5/1982 | Blumenkranz ....... F16K 5/0642 137/315.19 |
| 4,411,407 A | | 10/1983 | Ninomiya et al. |
| 4,476,891 A | | 10/1984 | Mulas et al. |
| 4,605,199 A | | 8/1986 | Bonissone et al. |
| 5,170,989 A | * | 12/1992 | Kemp ................... F16K 5/0668 251/174 |
| 5,323,805 A | * | 6/1994 | Scaramucci ............ F16K 35/06 137/382 |
| 5,360,036 A | * | 11/1994 | Kieper .................. F16K 5/0605 137/315.18 |
| 5,396,922 A | | 3/1995 | Ottens |
| 5,427,135 A | | 6/1995 | Kieper |
| 5,579,804 A | * | 12/1996 | Roberts .................. F16K 35/06 137/385 |
| 5,785,074 A | * | 7/1998 | Kieper .................. F16K 5/0605 137/312 |
| 6,217,002 B1 | | 4/2001 | Shafer |
| 6,669,171 B1 | * | 12/2003 | Stunkard ............... F16K 5/0642 251/315.08 |
| 6,695,285 B1 | | 2/2004 | Hotton et al. |
| 6,959,909 B2 | | 11/2005 | Bancroft et al. |
| 7,306,010 B2 | | 12/2007 | Gruener, Sr. |
| 7,506,665 B2 | | 3/2009 | Gruener, Sr. |
| D627,439 S | | 11/2010 | Mazzacano et al. |
| D627,859 S | | 11/2010 | Mazzacano et al. |
| 7,862,276 B2 | | 1/2011 | Mazzacano et al. |
| 8,210,499 B2 | | 7/2012 | Madden et al. |
| 8,245,723 B2 | | 8/2012 | Mazzacano et al. |
| 8,726,927 B2 | | 5/2014 | Bisio et al. |
| 8,740,180 B2 | | 6/2014 | Matsushita et al. |
| 8,757,672 B2 | | 6/2014 | Malagnino |
| 9,010,721 B2 | | 4/2015 | Hoots et al. |
| 9,091,370 B2 | | 7/2015 | Bisio et al. |
| 2007/0007483 A1 | * | 1/2007 | Leblanc .................. F16K 5/205 251/315.14 |
| 2009/0095931 A1 | * | 4/2009 | Stunkard ............... F16K 5/0642 251/174 |
| 2011/0114205 A1 | | 5/2011 | Bisio et al. |
| 2011/0140025 A1 | * | 6/2011 | Beasley ................ F16K 5/0668 251/315.16 |
| 2012/0193558 A1 | * | 8/2012 | Hoots ................... F16K 1/2007 251/89 |
| 2014/0026981 A1 | | 1/2014 | Bisio et al. |
| 2014/0110615 A1 | | 4/2014 | Fukano et al. |
| 2014/0305518 A1 | * | 10/2014 | Stotler .................... F16K 5/201 137/315.18 |
| 2014/0319394 A1 | | 10/2014 | Bisio et al. |
| 2014/0353536 A1 | * | 12/2014 | Le Pellec .............. F16K 5/0642 251/315.13 |
| 2015/0034853 A1 | * | 2/2015 | Gutmann .............. F16K 35/022 251/230 |
| 2015/0300509 A1 | | 10/2015 | He |

FOREIGN PATENT DOCUMENTS

| | | |
|---|---|---|
| EP | 0310142 A1 | 4/1989 |
| EP | 0378520 B1 | 8/1995 |
| EP | 1923611 B1 | 3/2011 |
| EP | 2322829 B1 | 10/2012 |
| EP | 2453153 B1 | 6/2013 |
| EP | 2149731 B1 | 11/2013 |
| EP | 2690326 A1 | 1/2014 |
| EP | 2796755 A1 | 10/2014 |
| GB | 2065276 A | 6/1981 |

OTHER PUBLICATIONS

International Search Report dated Jan. 23, 2017, issued in connection with International Application No. PCT/US2016/061967 (3 pages).
Written Opinion of the International Searching Authority dated Jan. 23, 2017, issued in connection with International Application No. PCT/US2016/061967 (14 pages).
IPEX, VKD Series Ball Valves, Product Data Sheet, 2006 (15 pages).
Examination Report dated Jan. 2, 2020, issued by the European Patent Office in connection with European Patent Application No. 16866928.1 (8 pages).
Notice of Intention to Grant dated Mar. 1, 2021, issued by the European Patent Office in connection with European Patent Application No. 16866928.1 (10 pages).
Examination Report dated Apr. 23, 2021, issued by the Australian Intellectual Property Office in connection with Australian Patent Application No. 2016358158 (6 pages).

* cited by examiner

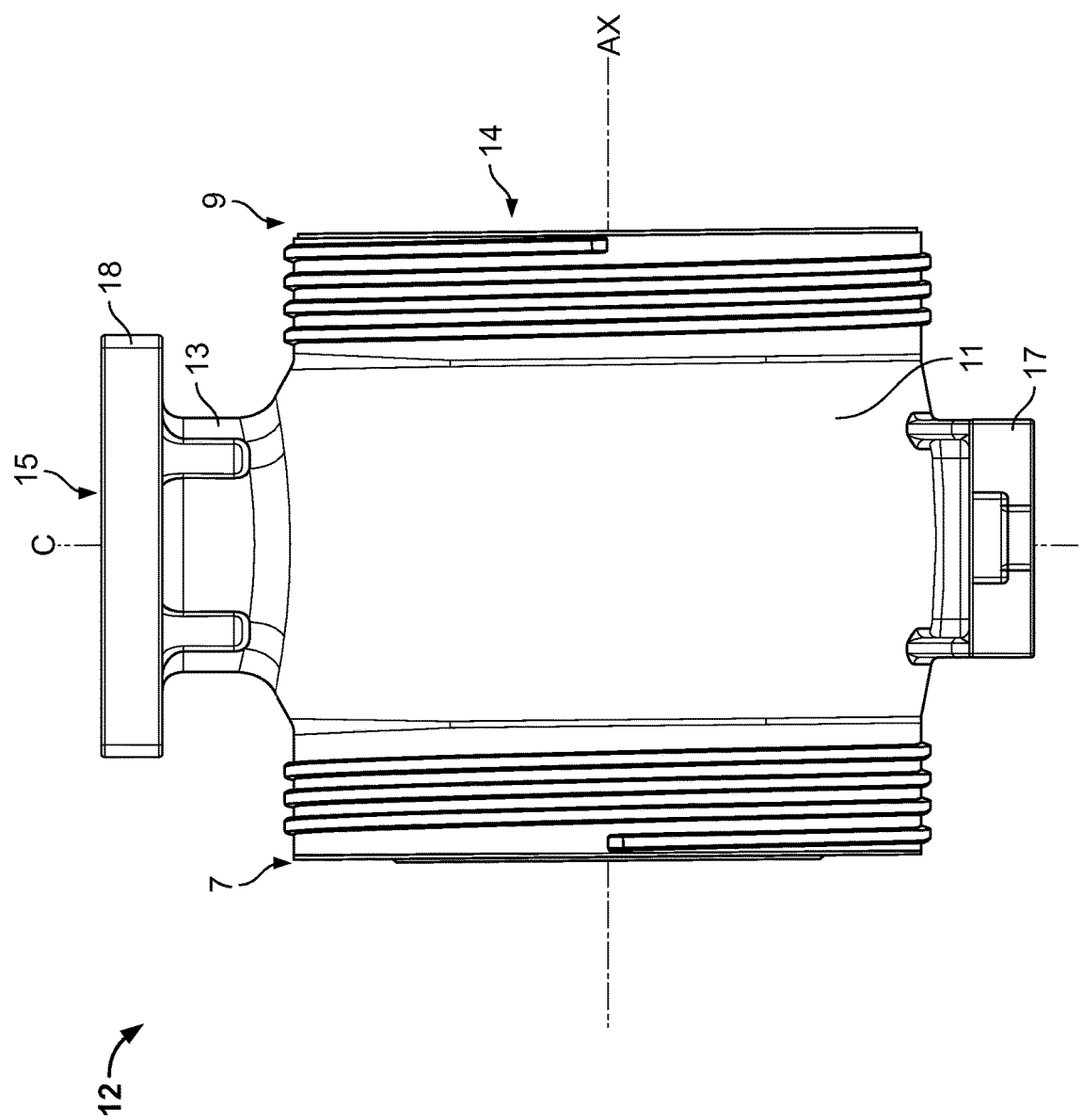

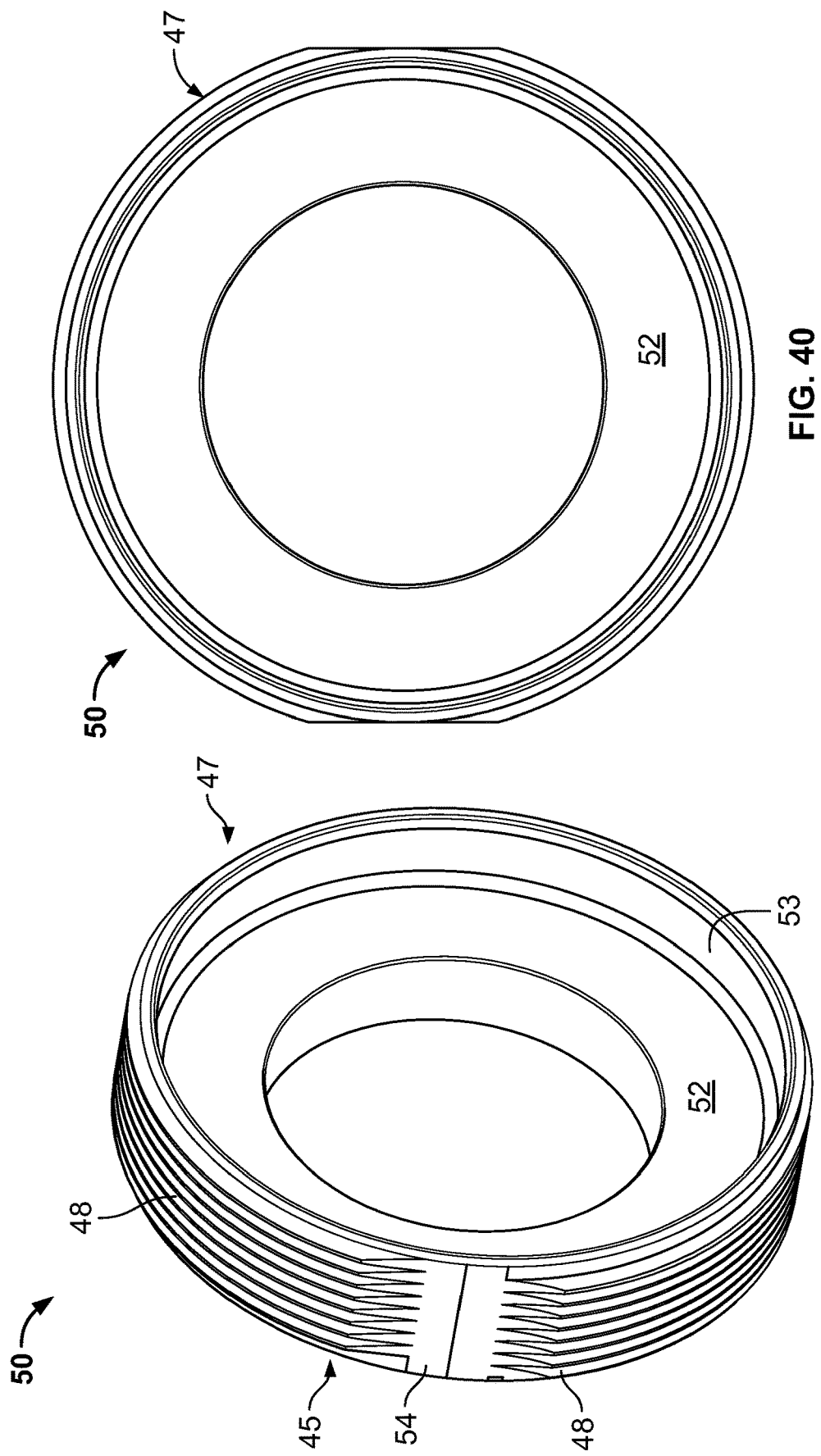

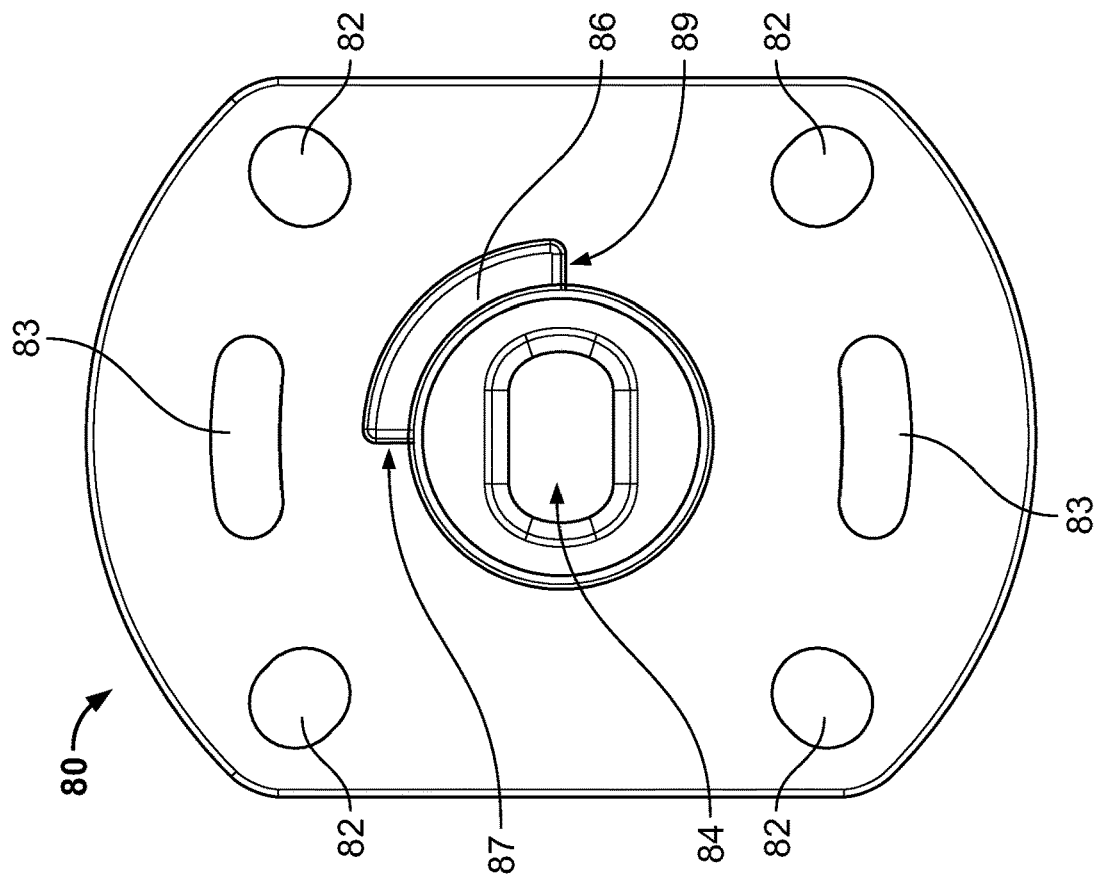
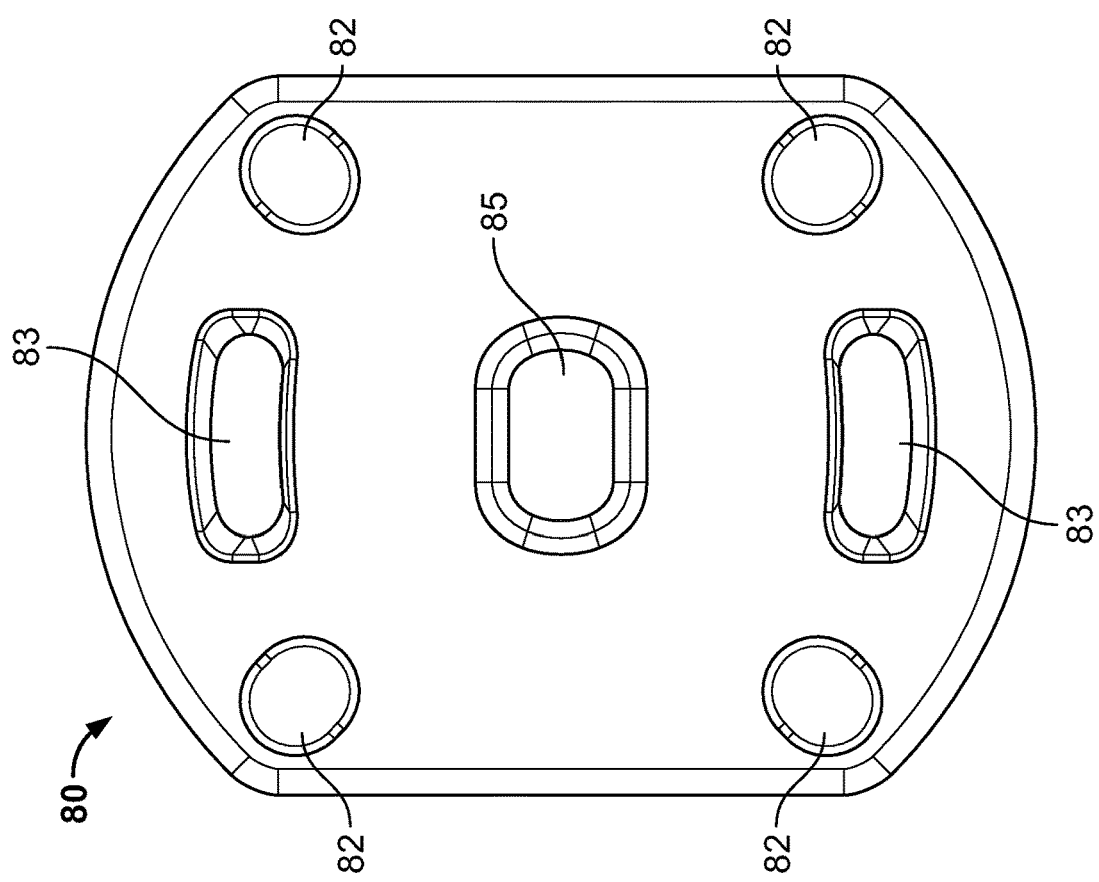

BALL VALVE

CROSS-REFERENCE TO RELATED APPLICATIONS

This application claims the benefit of U.S. Provisional Application entitled "Ball Valve," which was filed on Nov. 16, 2015, and assigned Ser. No. 62/255,849, the contents of which are herein incorporated by reference in their entirety.

FIELD OF THE DISCLOSURE

The present disclosure generally relates to flow control assemblies for fluid systems, and more particularly, to ball valve assemblies for fluid systems.

BACKGROUND OF THE DISCLOSURE

Ball valves can be used in applications that require the transmission of fluids. Ball valves can be one-quarter turn valves used in on-off applications, but can also be used to modulate flow. Ball valves can be unidirectional (flow in one direction) or bidirectional (flow in either direction). Two common types of ball valves are floating ball valves and trunnion ball valves. Ball valves can utilize different seat styles. Two common types of seats that are used in ball valves are crush seats and deflecting seats.

In general, crush seats can be designed with the intent that the initial preload on the seats will be significant enough to yield the seat material and form the seat to the ball. Essentially, the ball crushes the seats during assembly. After the seats are crushed, the seats generally do not return to their initial geometry, but a certain amount of contact stress can remain between the ball and the seat, thus generating a seal.

A second seat style is a deflecting seat. In general, deflecting seats can be designed to act like a spring. When preload is applied to a deflecting seat, the seat can deflect away from the load. Some material yield can still occur at the point of contact between the ball and the seat, but the yield can be less significant and more localized than on a crush seat. Additionally, as this yield (and any subsequent creep) occurs, the seat can maintain a load on the ball by continuing to spring back into the ball as the seat tries to return to its original un-deflected geometry.

Floating ball valves can be fabricated with a certain amount of preload in the seats. This preload can be used to first enact a seal between the ball and the upstream and downstream seats. As the difference in pressure between upstream and downstream increases, so does the load on the ball, thus forcing the ball downstream and enhancing the downstream seal. A floating ball valve can have a primary seal on the downstream seat and may not have a secondary seal. In general and depending on the preload applied during assembly, a floating ball valve may seal on the upstream seat as well.

Determining the appropriate seat preload on a floating ball valve can generally pose some challenges. Some seats should be loaded only enough to generate a seal at very low pressures. The ball can then be free to float downstream to increase sealing load at higher pressures. However, if seat load is too low, the valve may not be forgiving enough to seal in some applications. Additionally, if the seat load is too low, the market perception can be that the valve may not seal. If the seat load is too high, the ball may not be able to float downstream, resulting in an upstream and a downstream seal. In general, this can be undesirable in some existing floating ball valve designs because it can result in pressure trapped inside the cavity of the valve. The ball floating towards the downstream seat, and losing its seal on the upstream seat, can be the mechanism used to prevent trapping cavity pressure in a floating ball valve. Moreover, if the seat load is too high, an additional disadvantage is that the stem torque may increase, thereby causing the valve to be difficult to operate.

In general, trunnion ball valves can hold the ball rigidly along the axis of the stem (some deflection can still occur) via the stem and a second bearing surface, or shaft, on the bottom of the ball (the trunnion). These bearing surfaces may be integral to, or separate from the ball. The seats on a trunnion ball valve can be allowed to move along the central axis of the valve and can be positively displaced (e.g., spring loaded) towards the ball. The seats may, or may not, be installed in seat carriers that can also move along the central axis of the valve. As the difference in pressure between upstream and downstream increases, the upstream seat can apply an increasing load against the ball, thus enhancing the seal. In contrast to a floating ball valve, a trunnion ball valve generally has a primary seal on the upstream seat and can provide a secondary seal on the downstream seat.

With respect to thermoplastic ball valve seat sealing, some conventional thermoplastic ball valves are of a floating ball design, though there are some plastic trunnion ball valves. Conventional plastic ball valves (whether they employ a floating or a trunnion mount ball) can be built with adjustable seat retainers. The adjustable seal retainer can allow the preload on the seats (e.g., the load that exists in a static condition, prior to loading from differential pressure) to be adjusted (e.g., increased) in the field to attempt to create a seal between the ball and the seat. While some plastic ball valves can have one seal retainer (with the opposite end of the valve body having a fixed seat location—this end of the valve can be referred to as the closed or blocked end), some designs offer an adjustable seal retainer on both ends of the valve. FIG. 1 shows a view of a conventional floating ball valve with a single adjustable seal retainer.

Conventional adjustable seal retainers have been used for several reasons (e.g., manufacturing costs/tolerances; thermal expansion/contraction of valves; low stem torque expectations; seat creep and sealing window; deflection of valves due to mechanical loading; small seat sealing window). Regarding small seat sealing windows, it is noted that some conventional thermoplastic ball valves on the market utilize a crush seat. This type of seat can have a relatively small seal tolerance. There may be little adjustment between the point where a seal is generated, and the point at which stem torque becomes objectionable. Additionally, some crush seats may suffer from creep over time.

Some adjustable seal retainers can create challenges. These challenges can include: (i) balls forced off of stem center, and/or (ii) difficulty to establish correct seal retainer position. For example and with respect to balls forced off of stem center, when conventional adjustable seal retainers are used, they can be used on one end of the valve (e.g., with the other end being the blocked or closed end of the valve body). As a result, there may be one seal retainer location (and therefore one seat load) that allows for the center-line of the ball to correspond with the center-line of the stem. If the seal retainer is adjusted to a position other than this one location, the ball can be effectively pushed to a position that is off center from the stem center-line. This can result in the ball camming in relation to the stem bore when the valve is being rotated. When the ball cams, it can result in increased stem torque and backlash or slight reverse rotation in the handle.

Some disadvantages of such backlash in the handle can result in poor user experiences. For example, if the ball is in a closed position and backlash in the handle occurs, the valve can lose the seal between the ball and the seat. If the ball is in an open position and backlash in the handle occurs, there may not be a correct or fully aligned flow path through the ball.

Regarding the difficulty to establish correct seal retainer position, it is noted that determining the appropriate seal retainer position (and therefore seat load) on a conventional valve with an adjustable seal retainer can be difficult both for the valve manufacturer and for an end user rebuilding the valve. One indicator of seat load can be the stem torque. However, adjusting the seal retainer to achieve a specific seat load and confirming via stem torque can be difficult and can require a trial and error approach. Additionally, each time stem torque is checked the valve may first be rotated several times in order to break the edge of the newly compressed seat. This can further add to the difficulty of achieving consistent seat load in the factory and in the field. Some conventional valves with two adjustable seal retainers (instead of one) can be even more difficult to adjust correctly.

With respect to ball valve lockout mechanisms, it is noted that the occasional need to lock a ball valve in position is a relatively new practice in the plastic valve market. This locking capability can be used to attempt to keep a valve from being operated for commercial or for safety reasons. Commercial reasons may include maintaining a set process or preventing theft. Safety reasons can be "lock-out/tag-out" of a closed valve in order to allow maintenance to be safely performed on equipment downstream from the closed and locked valve.

Having a method to lock a valve in position (e.g., fully closed) can be common with metal valves. One locking mechanism on metal ball valves is a simple slide lock (see FIGS. 7-11). One disadvantage of this style lock is that it may be overcome by removing the nut that retains the handle (at which point the handle, slide plate, and lock can be removed). Some locking mechanisms that attempt to overcome this weakness have been manufactured for use on metal ball valves, but they can add cost to the valve (FIGS. 4-6 and 11 show some of these commercially available lock-outs). Some methods of locking a plastic valve in position have been brought to market. These methods can range from overly complicated, to overly cumbersome, to both. Some of these methods can include: (i) trigger style lockout (see FIG. 2); and (ii) handle enclosure lockout (see FIGS. 3A-3B).

With respect to trigger style lockouts, it is noted that a common lock out conventionally available on plastic ball valves can be a trigger style lock out. This lockout can employ a trigger on the handle of the valve and an engagement method between the trigger and the body of the valve. The trigger can employ a through hole for engagement by a padlock or hasp, thus allowing for a means of lockout (e.g., when a padlock or hasp is installed, the trigger may not be pulled). Some disadvantages of this design are that it may be cumbersome to operate and that similar to the metal slide plate, removal of the handle can allow the lock to be overcome.

With respect to the handle enclosure lockout, it is noted that the enclosure style lock-out can include the use of a housing, separate from the valve itself that wraps around the top, bottom and sides of the handle and can be locked close. This lockout generally works by preventing access to the valve handle. However, this lockout sometimes can be overcome by squeezing the lockout hard enough to deflect it into the handle (thus engaging the handle). Additionally, this lockout can sometimes be overcome by removing the handle.

An interest exists for improved ball valve assemblies and related methods of use. Some conventional assemblies/systems in this general field are described and disclosed in U.S. Pat. Nos. 5,323,805; 4,023,773; 6,695,285; 6,217,002; 4,411,407 and 3,380,708. These and other inefficiencies and opportunities for improvement are addressed and/or overcome by the assemblies, systems and methods of the present disclosure.

SUMMARY OF THE DISCLOSURE

The present disclosure provides for improved flow control assemblies for fluid systems. More particularly, the present disclosure provides for advantageous ball valve assemblies for fluid systems.

In exemplary embodiments, the present disclosure provides for improved ball valve assemblies and related features, systems and methods of use. Exemplary ball valve assemblies of the present disclosure offer many advantages over conventional assemblies including, without limitation, advantages in the sealing mechanisms of the ball valve assemblies, and advantages with the user interfaces of the ball valve assemblies (e.g., advantages with the lockout mechanisms).

Additional advantageous features, functions and applications of the disclosed assemblies, systems and methods of the present disclosure will be apparent from the description which follows, particularly when read in conjunction with the appended figures. References listed in this disclosure are hereby incorporated by reference in their entireties.

BRIEF DESCRIPTION OF THE DRAWINGS

Features and aspects of embodiments are described below with reference to the accompanying drawings, in which elements are not necessarily depicted to scale.

Exemplary embodiments of the present disclosure are further described with reference to the appended figures. It is to be noted that the various features, steps and combinations of features/steps described below and illustrated in the figures can be arranged and organized differently to result in embodiments which are still within the scope of the present disclosure. To assist those of ordinary skill in the art in making and using the disclosed assemblies, systems and methods, reference is made to the appended figures, wherein:

FIG. 21 is a front side view of an exemplary body member of the assembly of FIG. 12;

FIG. 39 is a side perspective view of the seal retainer of FIG. 38;

FIG. 40 is a side view of the seal retainer of FIG. 38;

FIG. 44 is a top view of the lock plate of FIG. 43;

FIG. 45 is a bottom view of the lock plate of FIG. 43;

DETAILED DESCRIPTION OF DISCLOSURE

Figure 1:
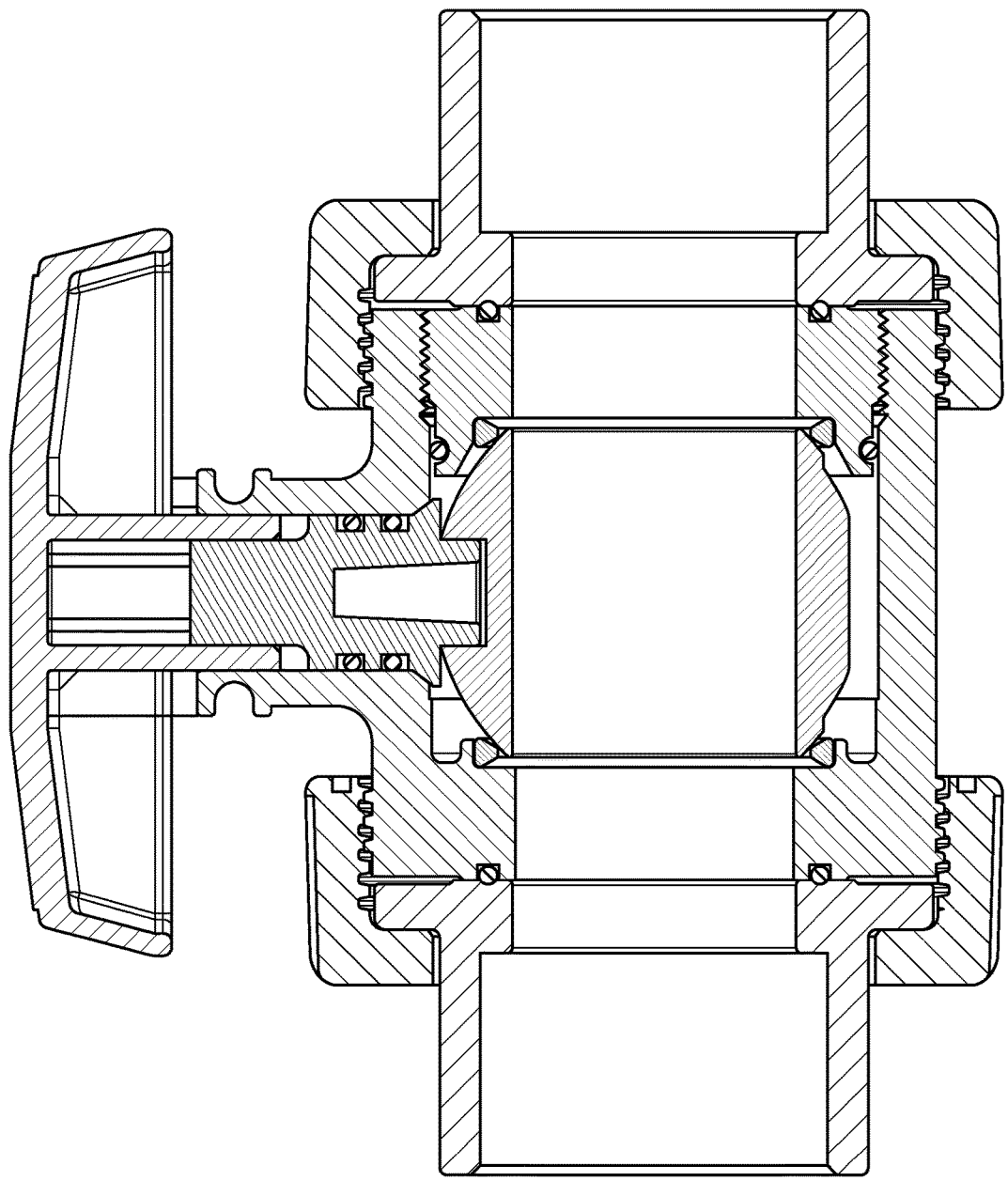
FIG. 1 is a cross-sectional side view of a conventional ball valve assembly.
Figure 2:
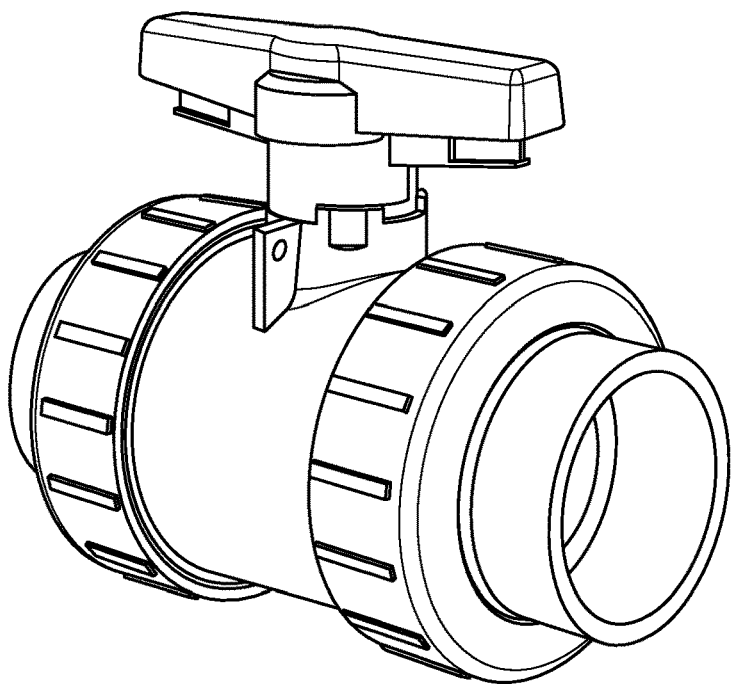
FIGS. 2-11 depict some conventional lockout mechanisms for valves.
Figure 3A:
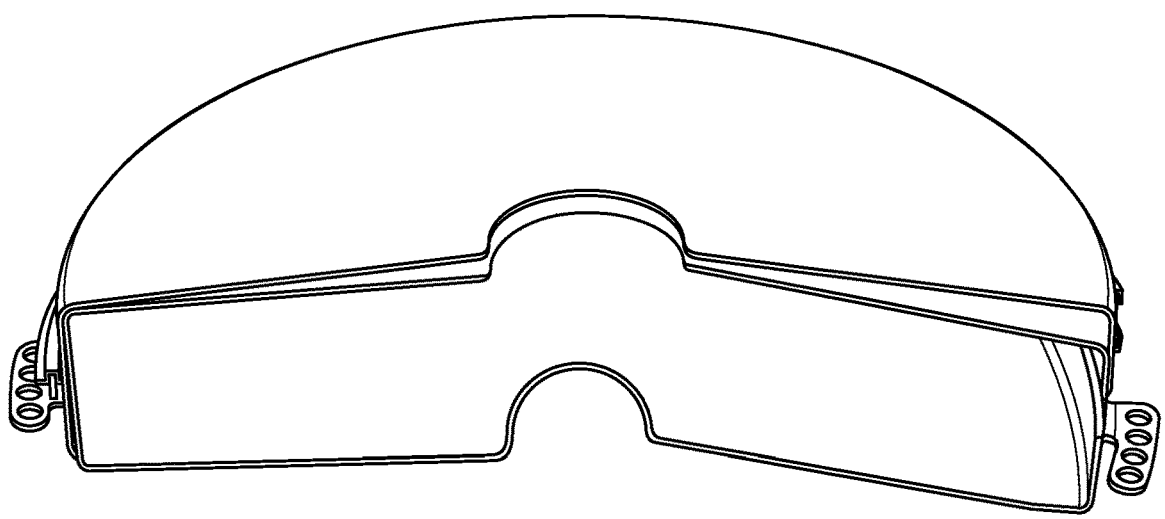
Figure 3B:
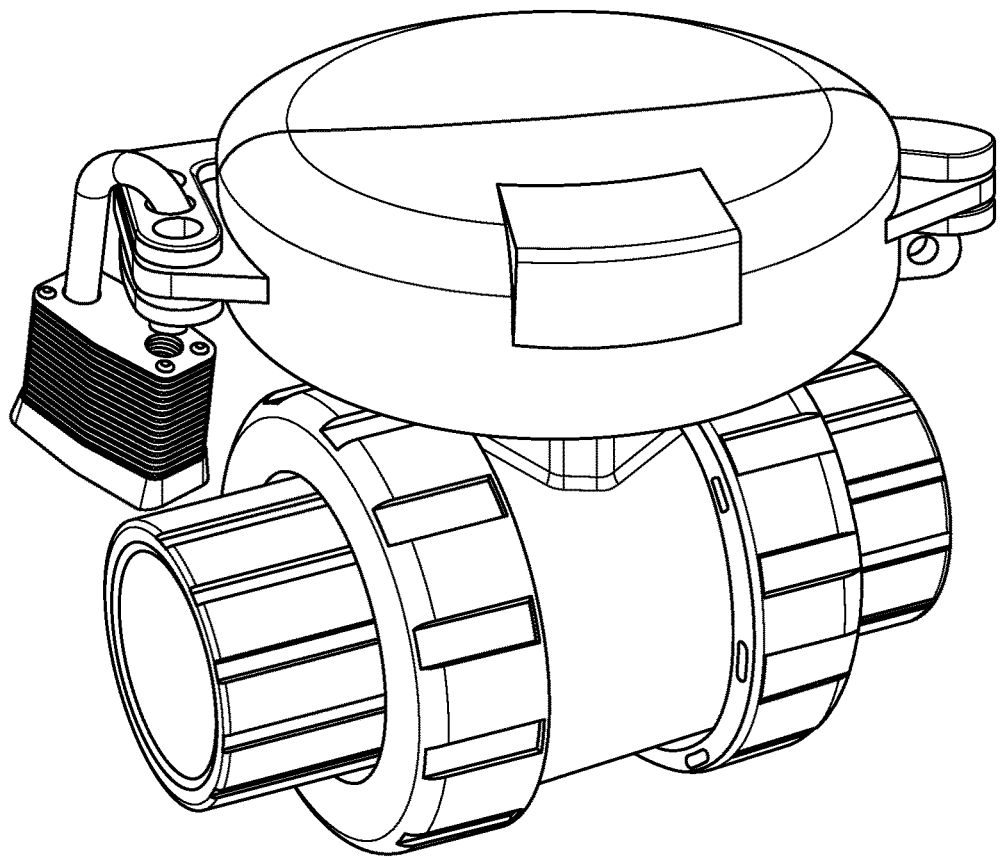
Figure 4:
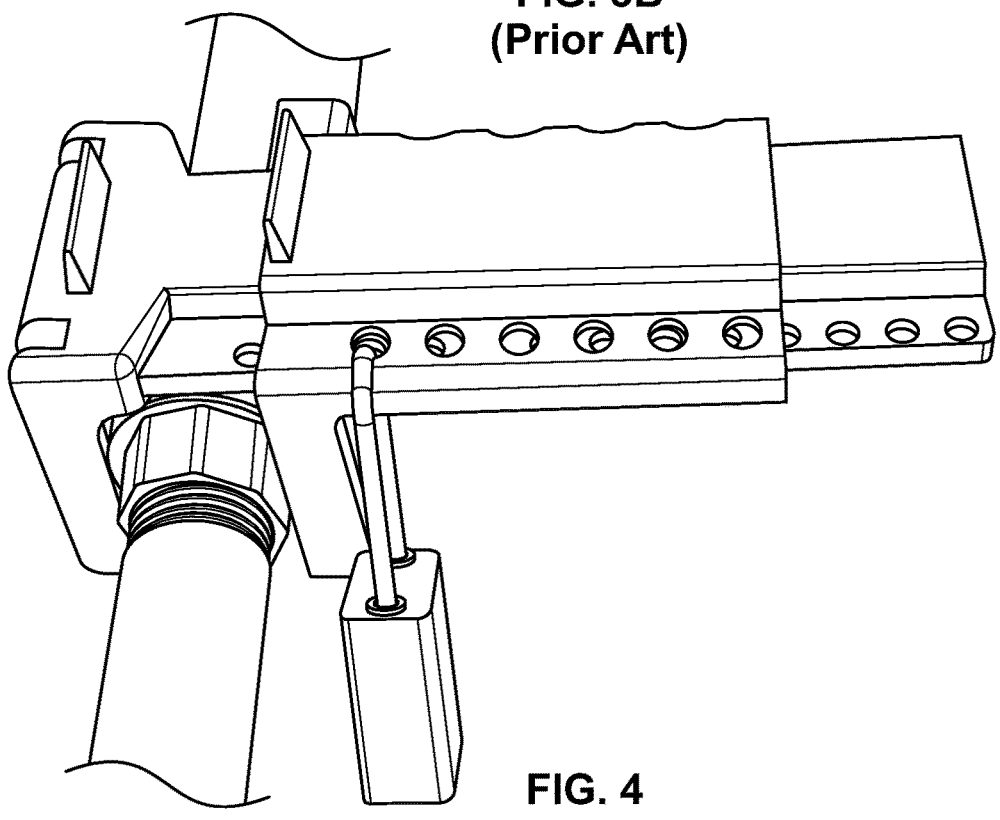
Figure 5:
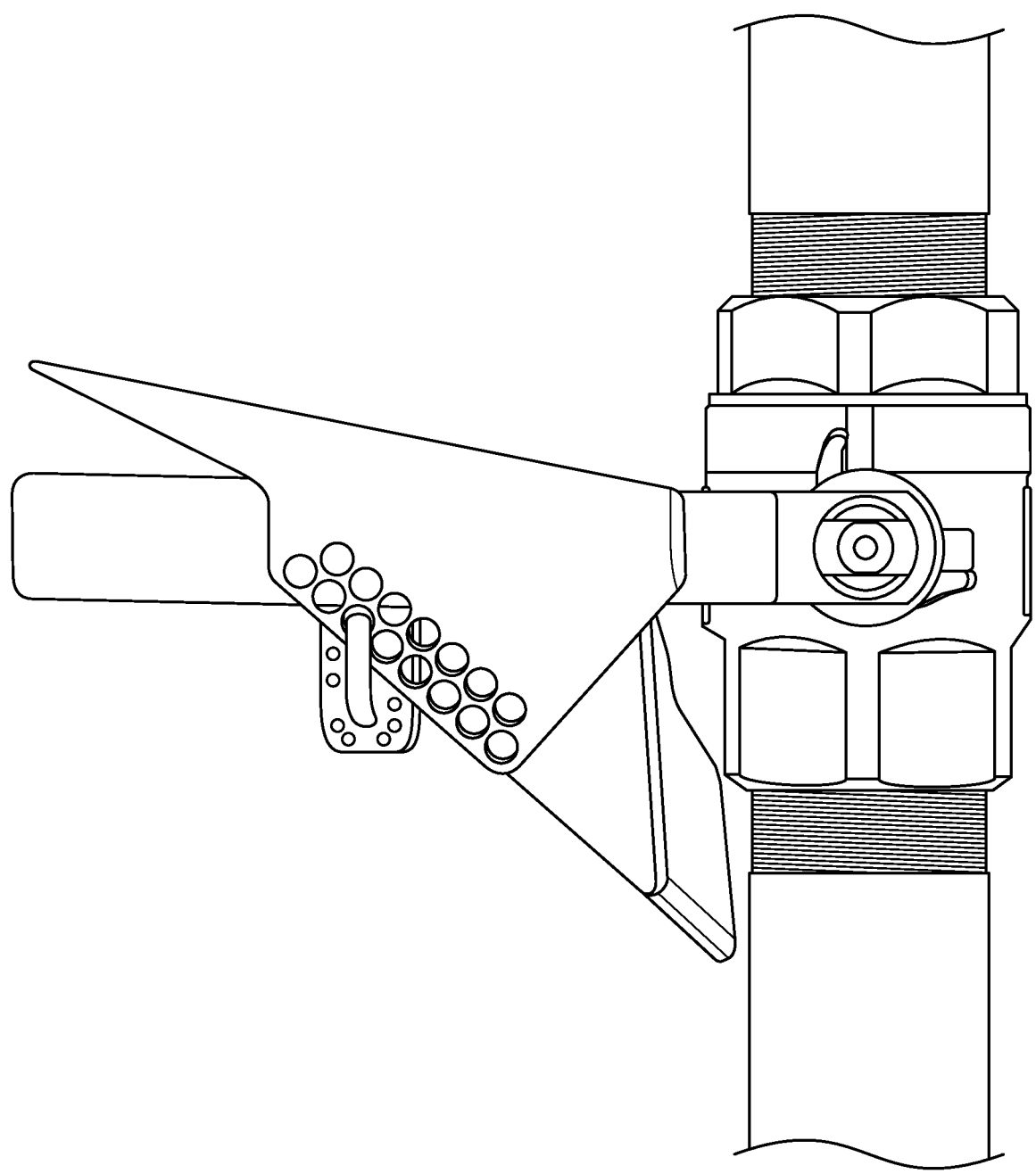
Figure 6:
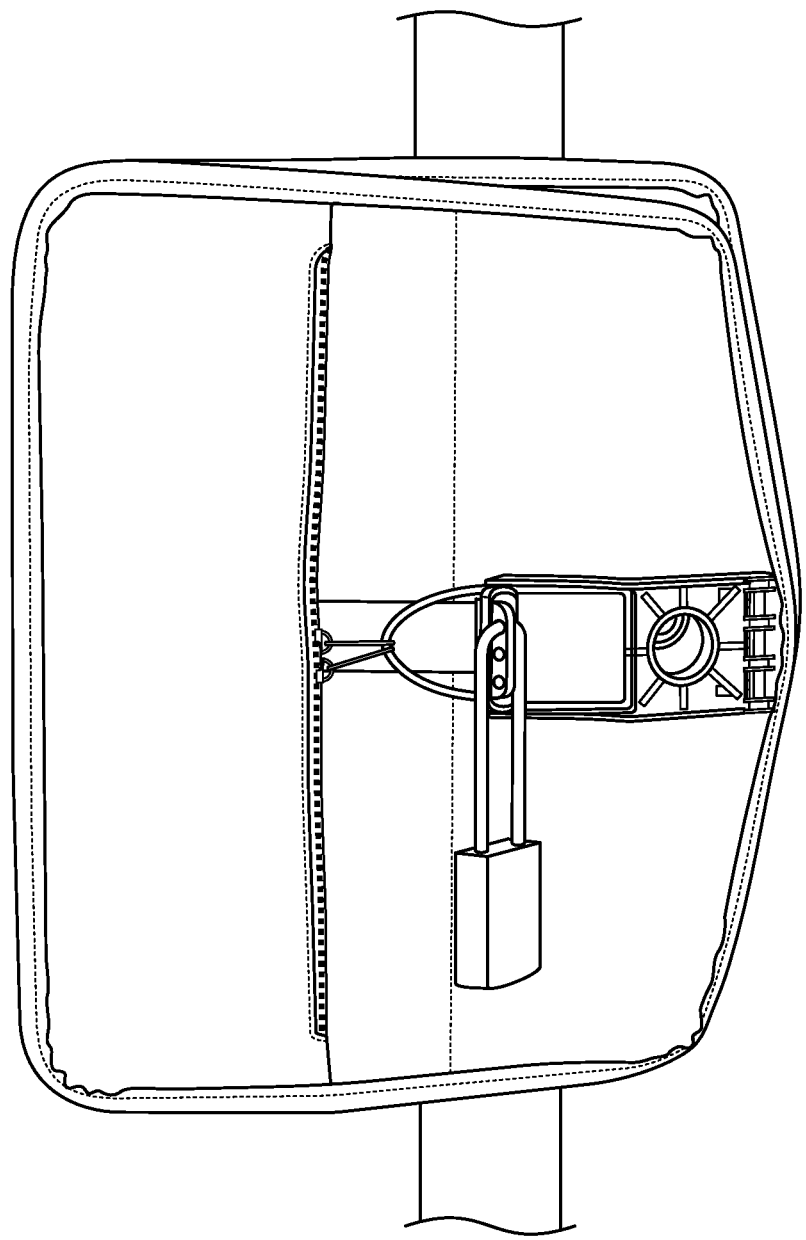
Figure 7:
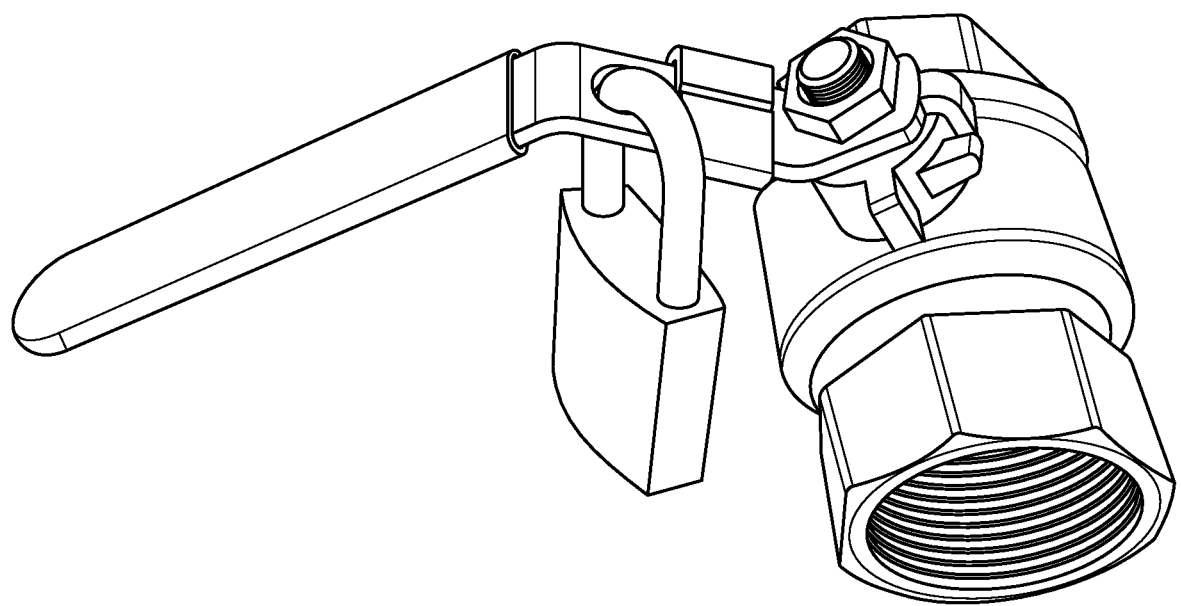
Figure 8:
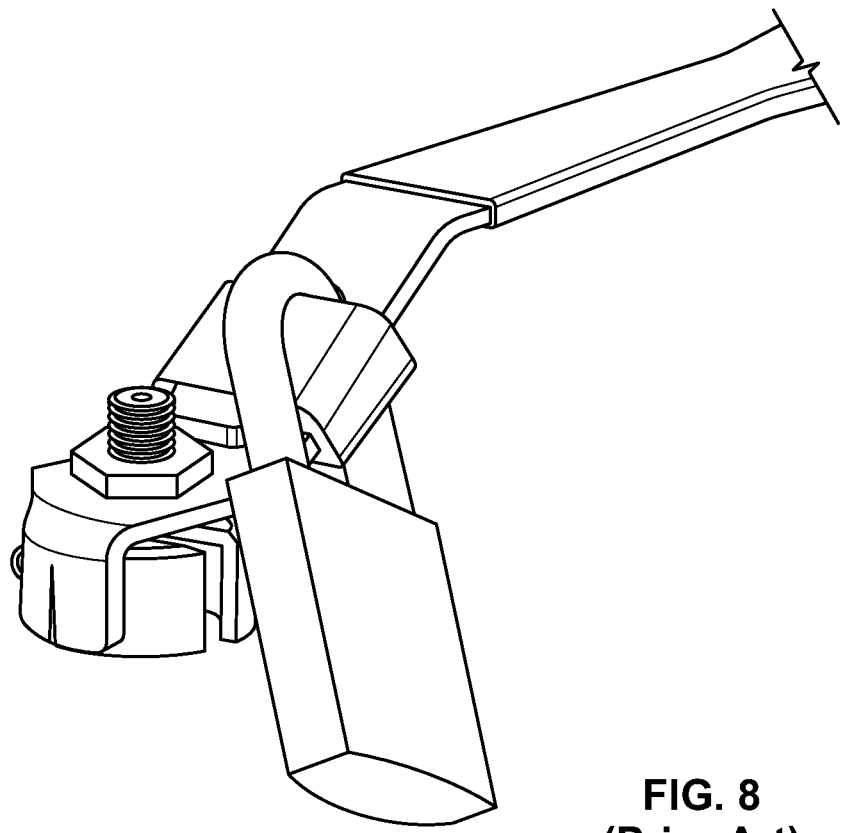
Figure 9:
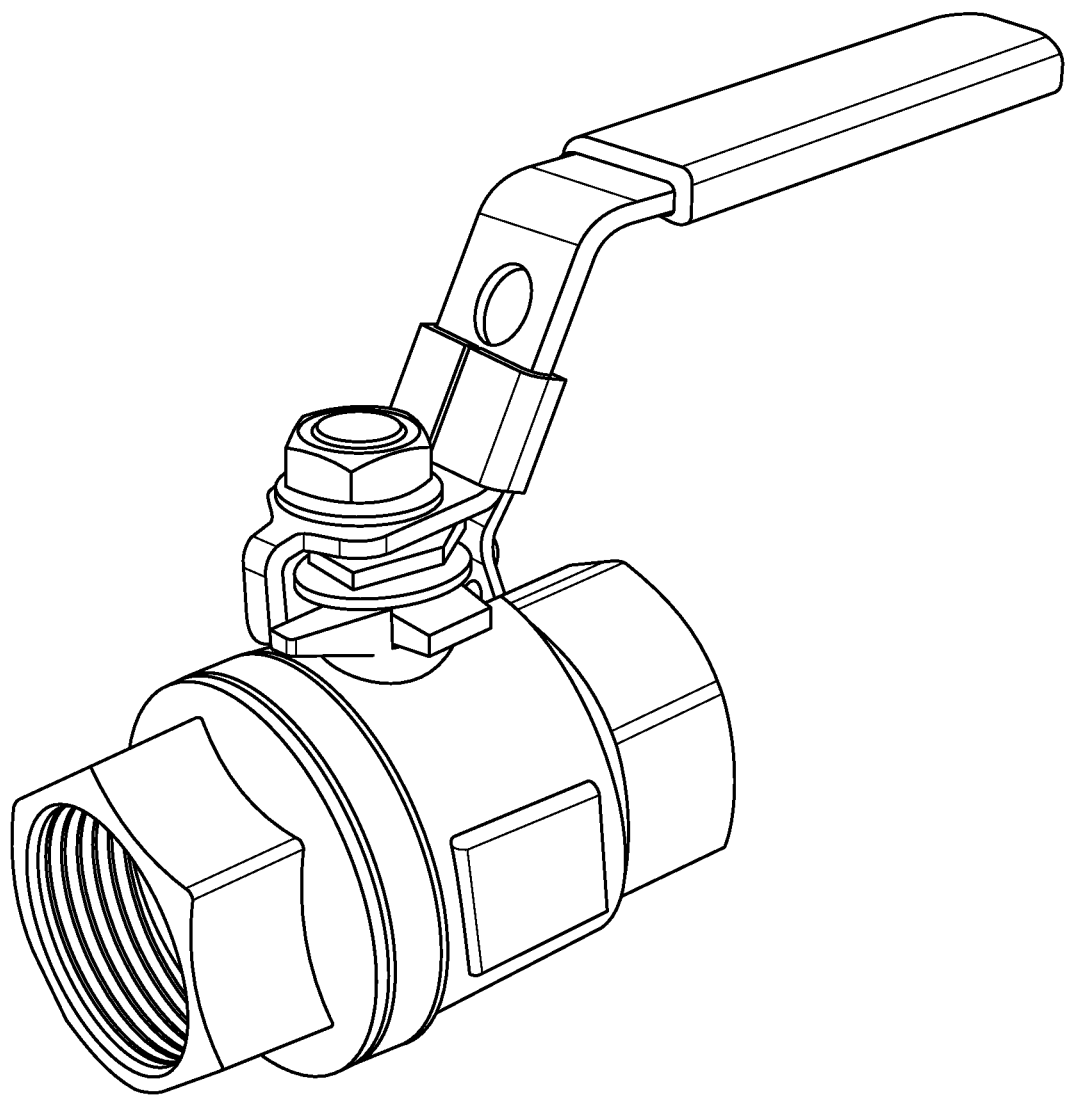
Figure 10:
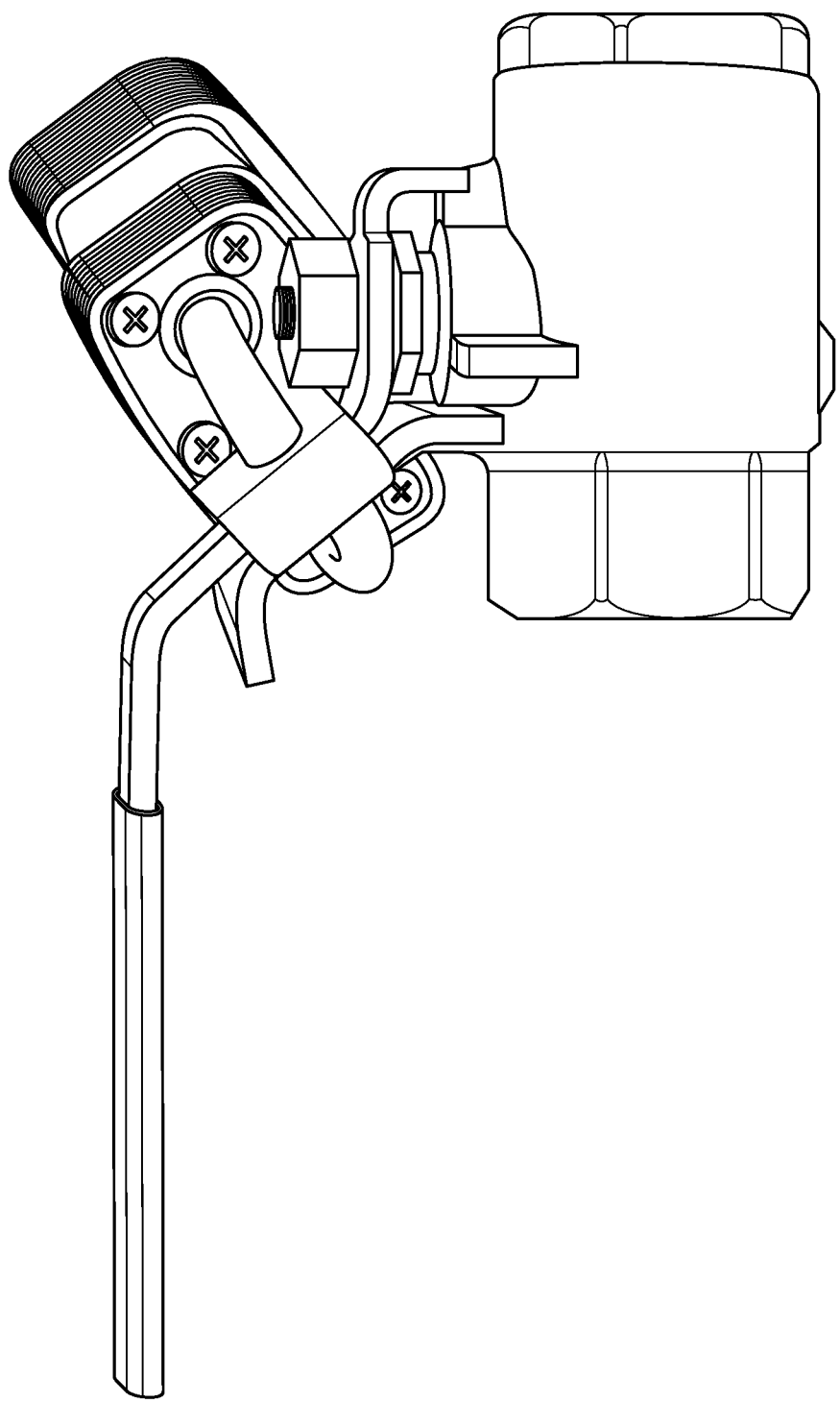
Figure 11:
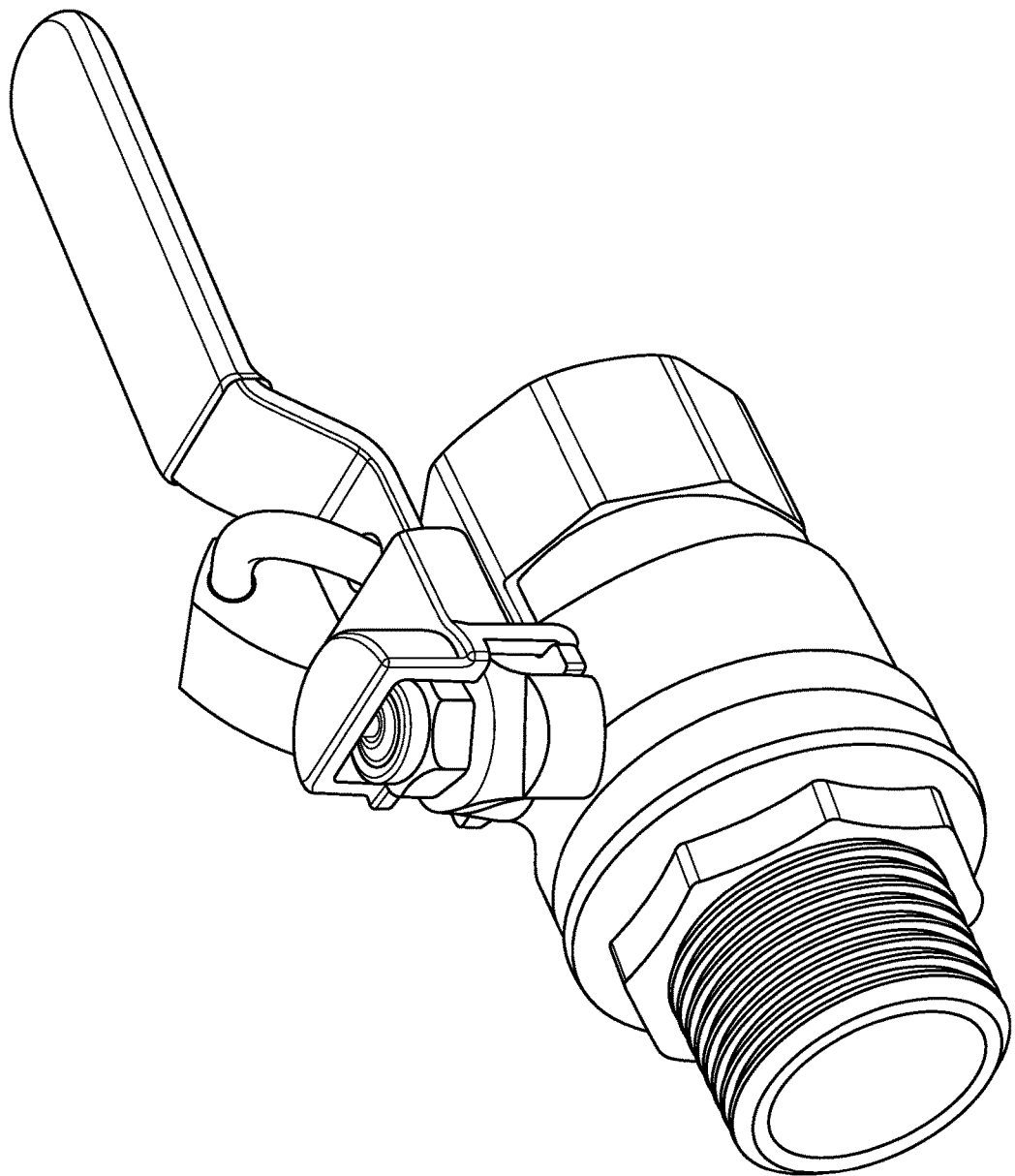

The exemplary embodiments disclosed herein are illustrative of advantageous ball valve assemblies, and systems of the present disclosure and methods/techniques thereof. It should be understood, however, that the disclosed embodiments are merely exemplary of the present disclosure, which may be embodied in various forms. Therefore, details disclosed herein with reference to exemplary ball valve assemblies/fabrication methods and associated processes/techniques of assembly and use are not to be interpreted as limiting, but merely as the basis for teaching one skilled in the art how to make and use the advantageous ball valve assemblies/systems of the present disclosure.

The present disclosure provides for improved flow control assemblies for fluid systems. More particularly, the present disclosure provides for advantageous ball valve assemblies for fluid systems.

In exemplary embodiments, the present disclosure provides for improved ball valve assemblies and related features, systems and methods of use. Exemplary ball valve assemblies of the present disclosure offer many advantages over conventional assemblies including, without limitation, advantages in the sealing mechanisms of the ball valve assemblies, and advantages with the user interfaces of the ball valve assemblies (e.g., advantages with the lockout mechanisms).

Referring now to the drawings, like parts are marked throughout the specification and drawings with the same reference numerals, respectively. Drawing figures are not necessarily to scale and in certain views, parts may have been exaggerated for purposes of clarity.

Referring now to FIGS. 12-20B, there is illustrated a ball valve assembly 10 according to exemplary embodiments of the present disclosure. Exemplary ball valve assembly 10 can include body member 12, ball member 16, stem member 20, first seat member 30, second seat member 32, first seat carrier 40, second seat carrier 42, seal retainer 50, first end connector 60, second end connector 62, first assembly fastener member 70 and second assembly fastener member 72. Exemplary assembly 10 also includes lock plate 80 and handle 90. In general, assembled ball valve assembly 10 can be utilized in fluid systems as a flow control assembly. Exemplary ball valve assembly 10 takes the form of a true union assembly 10, although the present disclosure is not limited thereto. Rather, assembly 10 can take a variety of forms (e.g., unibody, etc.).

As discussed further below, exemplary ball valve assembly 10 offers many advantages over conventional assemblies including, without limitation, advantages in the sealing mechanisms of assembly 10, and advantages with the user interfaces of the assembly 10 (e.g., advantages with the lockout mechanisms associated with lock plate 80). In particular and without limitation, it is noted that first seat carrier 40, second seat carrier 42, the sealing mechanisms associated with carriers 40, 42, and lock plate 80 are advantageous components/features that contribute to some of the benefits of assembly 10 over conventional assemblies.

In certain embodiments and as shown in FIGS. 12, 13 and 21-27, the body member 12 can be the largest component of assembly 10, and is the component configured to retain system pressure of assembly 10. In an exemplary form, the body member 12 includes two cylinders 11, 13. The larger cylinder 11 defines the main body bore 14 and provides a location/housing for the ball member 16, seats 30, 32, seat carriers 40, 42 and seal retainer 50. Cylinder 11 of body member 12 extends from a first end 7 to a second end 9.

The second, smaller cylinder 13 is the neck of the body 12 and defines a neck bore 15 for the stem 20 and stem seals. In an exemplary embodiment, the body 12 has an integral mounting pad 17 at the bottom of cylinder 11 of the body 12. This pad 17 can be utilized for mounting the assembly 10 to a panel or the like. Exemplary body 12 also has a mounting flange 18 on top of and extending from the cylindrical neck 13 of the body 12. This flange 18 can be used for mounting actuators on non-handle operated assemblies 10. This mounting flange 18 can also be utilized in conjunction with the lock plate 80 to provide position indication, and can provide the ability to lock the assembly 10 (e.g., ball 16) in position, as discussed further below.

Figure 16:
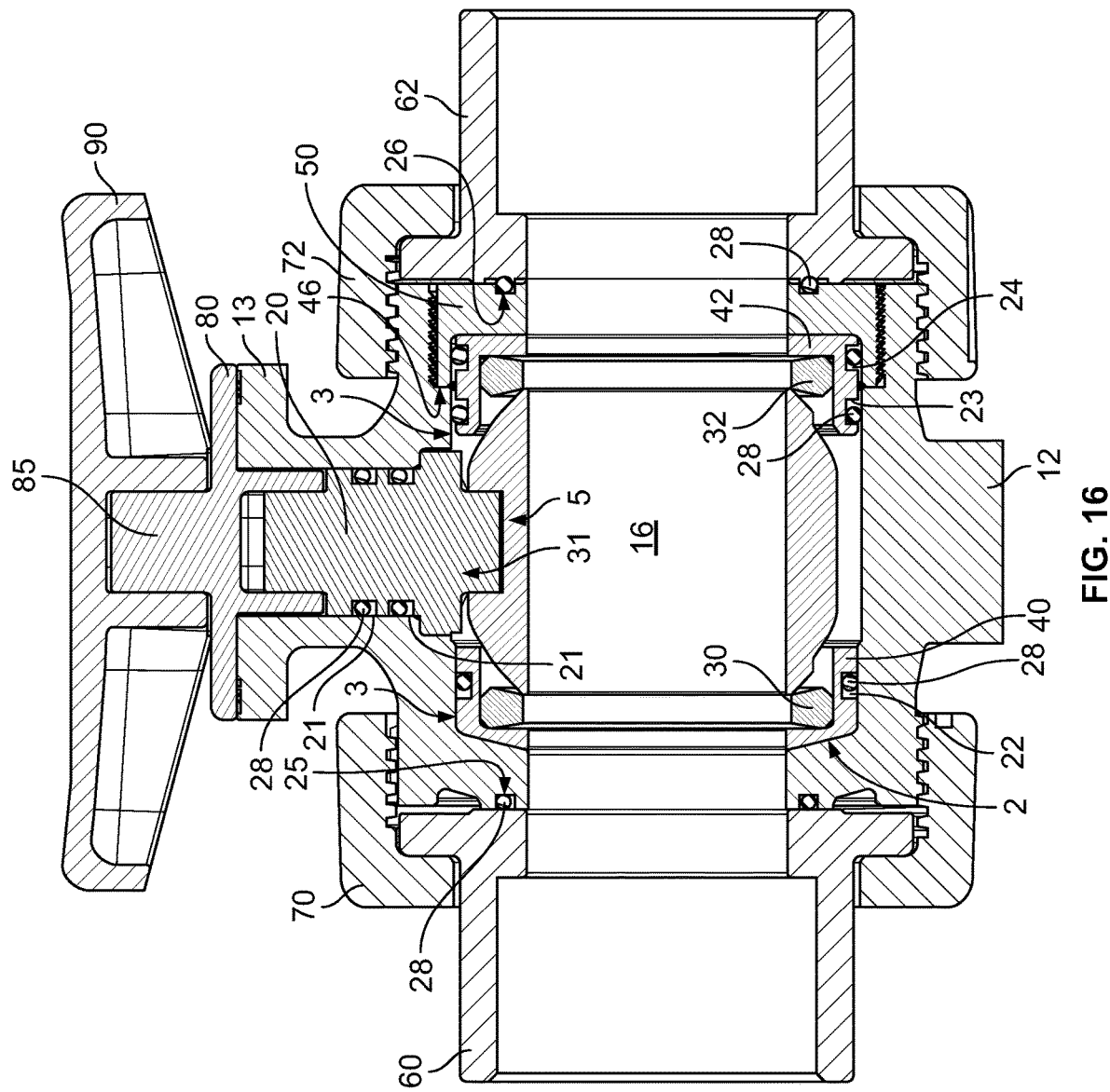
FIGS. 16, 16A and 16B are cross-sectional views of the ball valve assembly taken along the line A-A of FIG. 15.
Figure 16A:
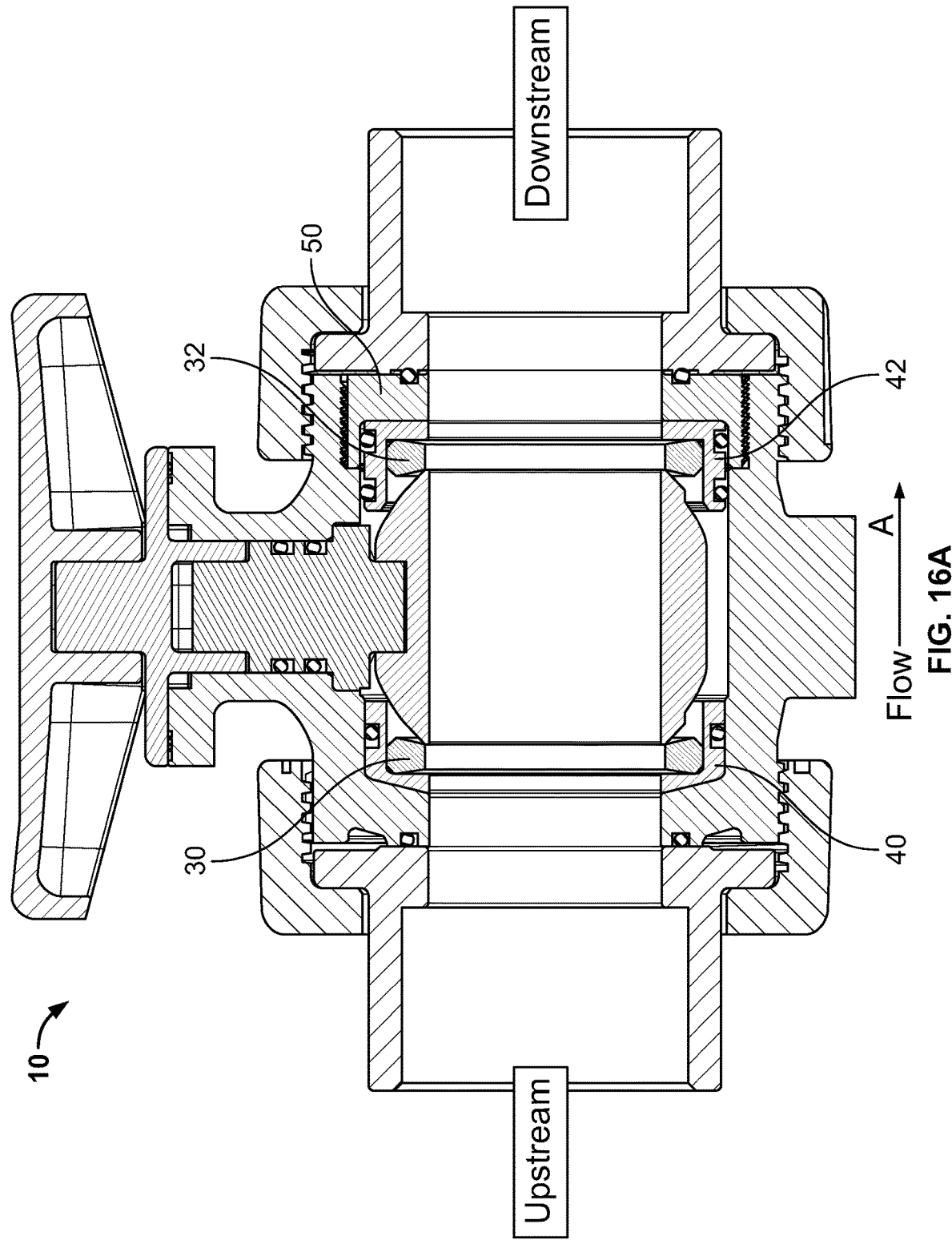
Figure 16B:
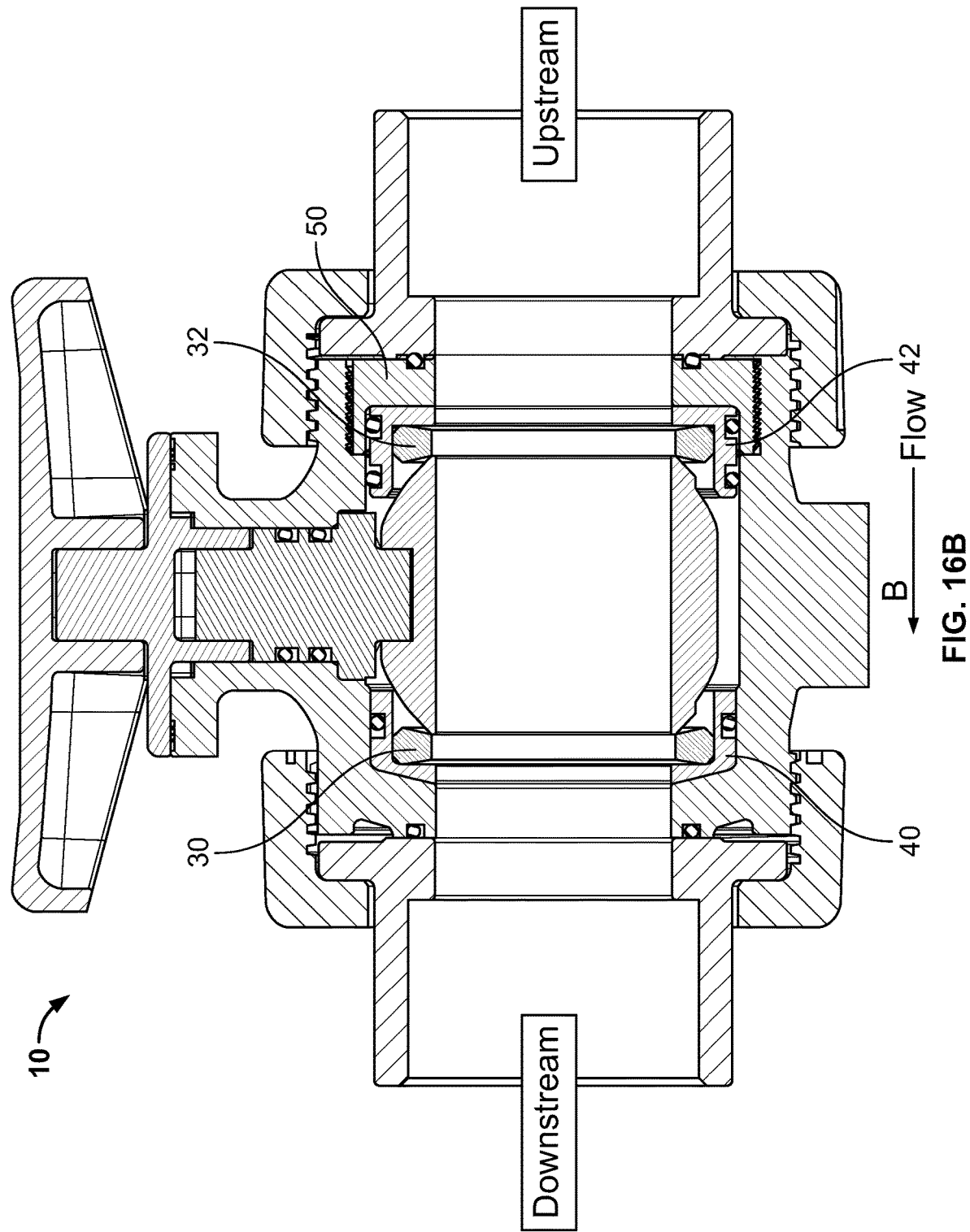
Figure 17:
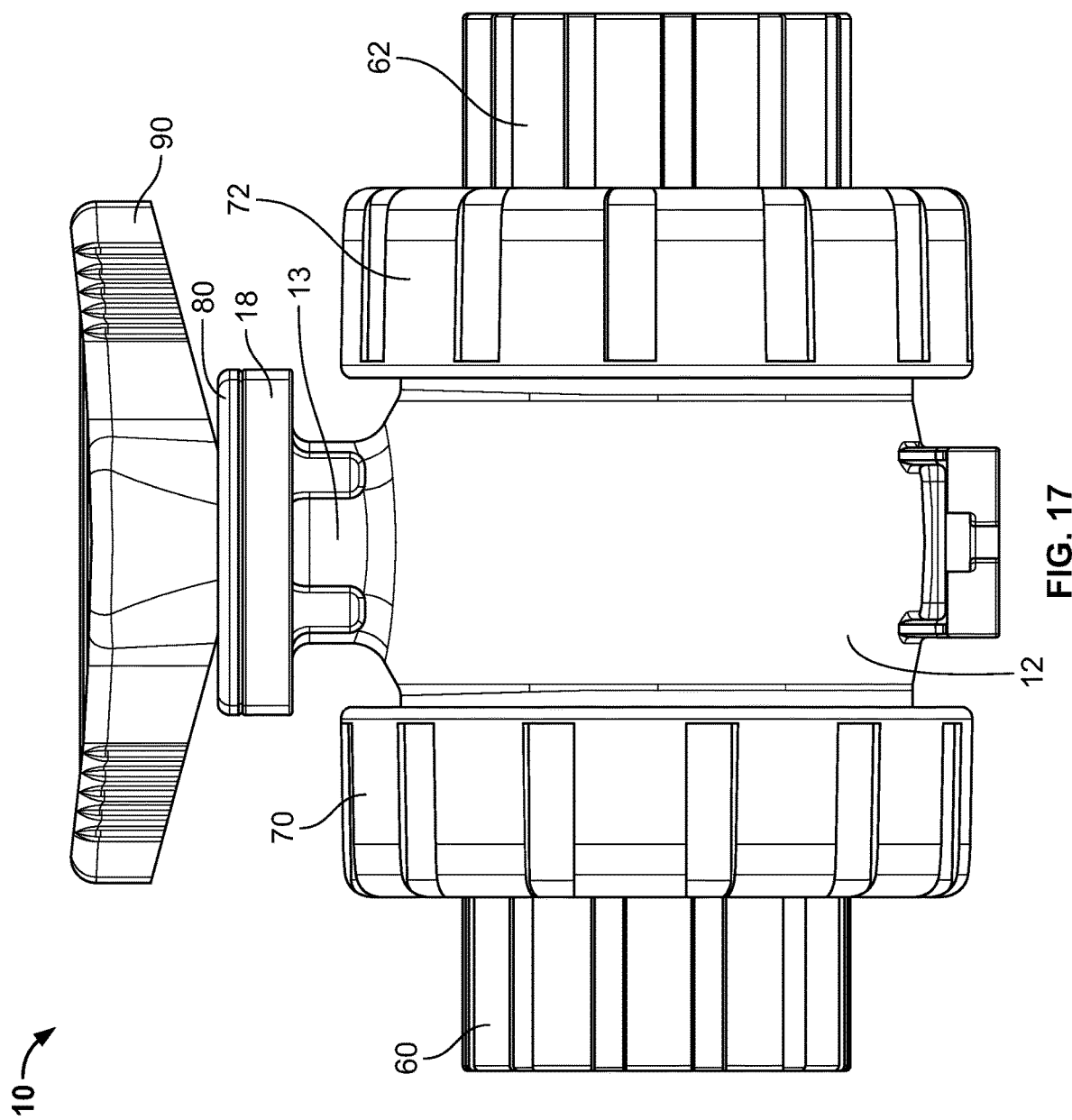
FIG. 17 is a side view of the ball valve assembly of FIG. 14.
Figure 18:
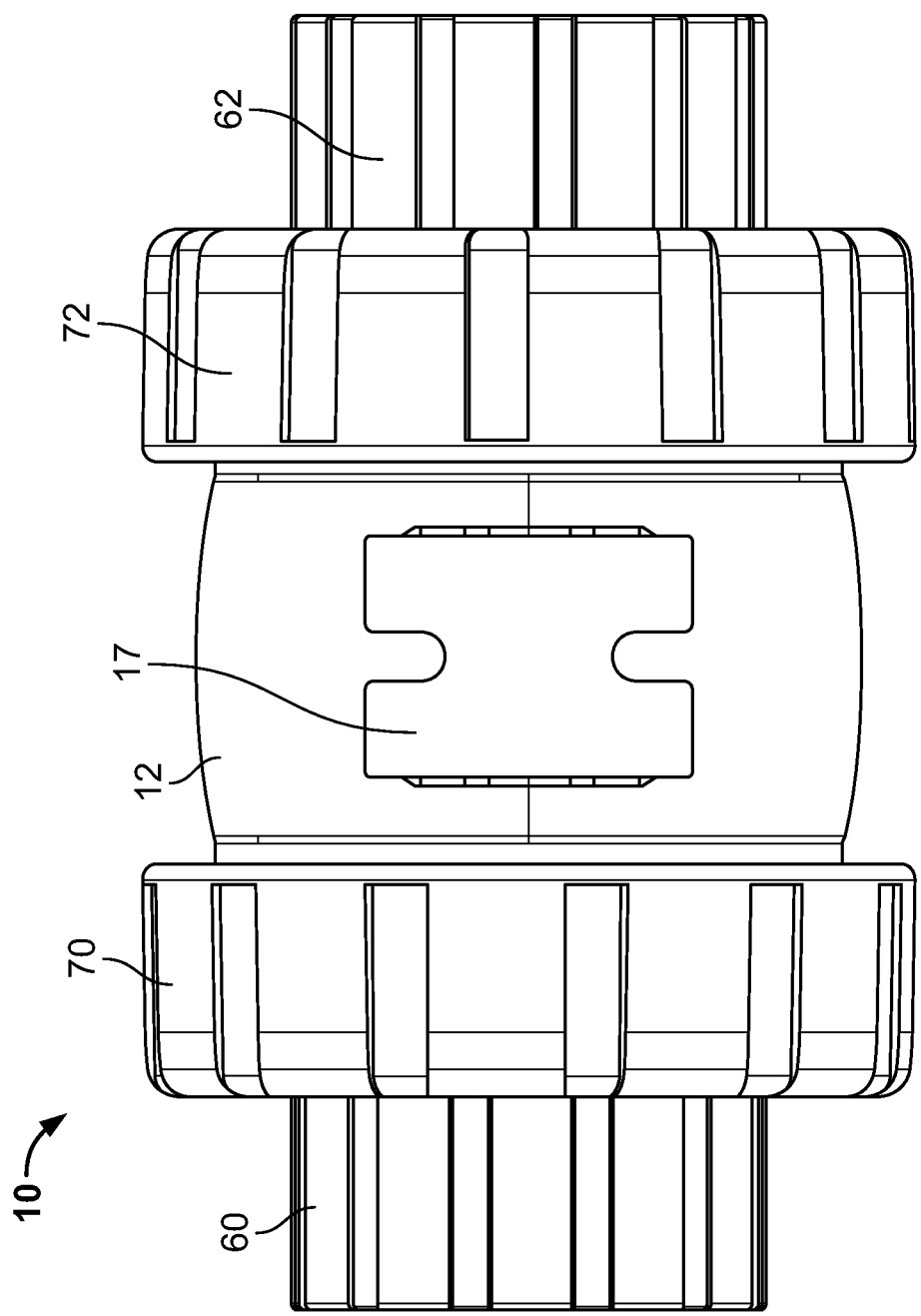
FIG. 18 is a bottom view of the ball valve assembly of FIG. 14.

Exemplary stem member 20 is a substantially cylindrical component that provides an interface between the outside of the body member 12 and the ball member 16. In an embodiment and as shown in FIG. 16, the stem member 20 has one or more O-ring grooves 21 (e.g., two O-ring grooves 21). When installed in the body member 12, gasketing material 28 (e.g., O-rings) positioned within these O-ring grooves 21 provide a seal between the stem member 20 and the neck 13 of the body 12 (e.g., a piston seal and/or a face seal and/or a shoulder seal). Exemplary engagement between the ball 16 and stem 20 is slotted or the like, although the present disclosure is not limited thereto. It is noted that such ball 16 and stem 20 engagement could be a suitable geometry/engagement that allows the ball 16 to shift downstream under load.

Figure 20A:
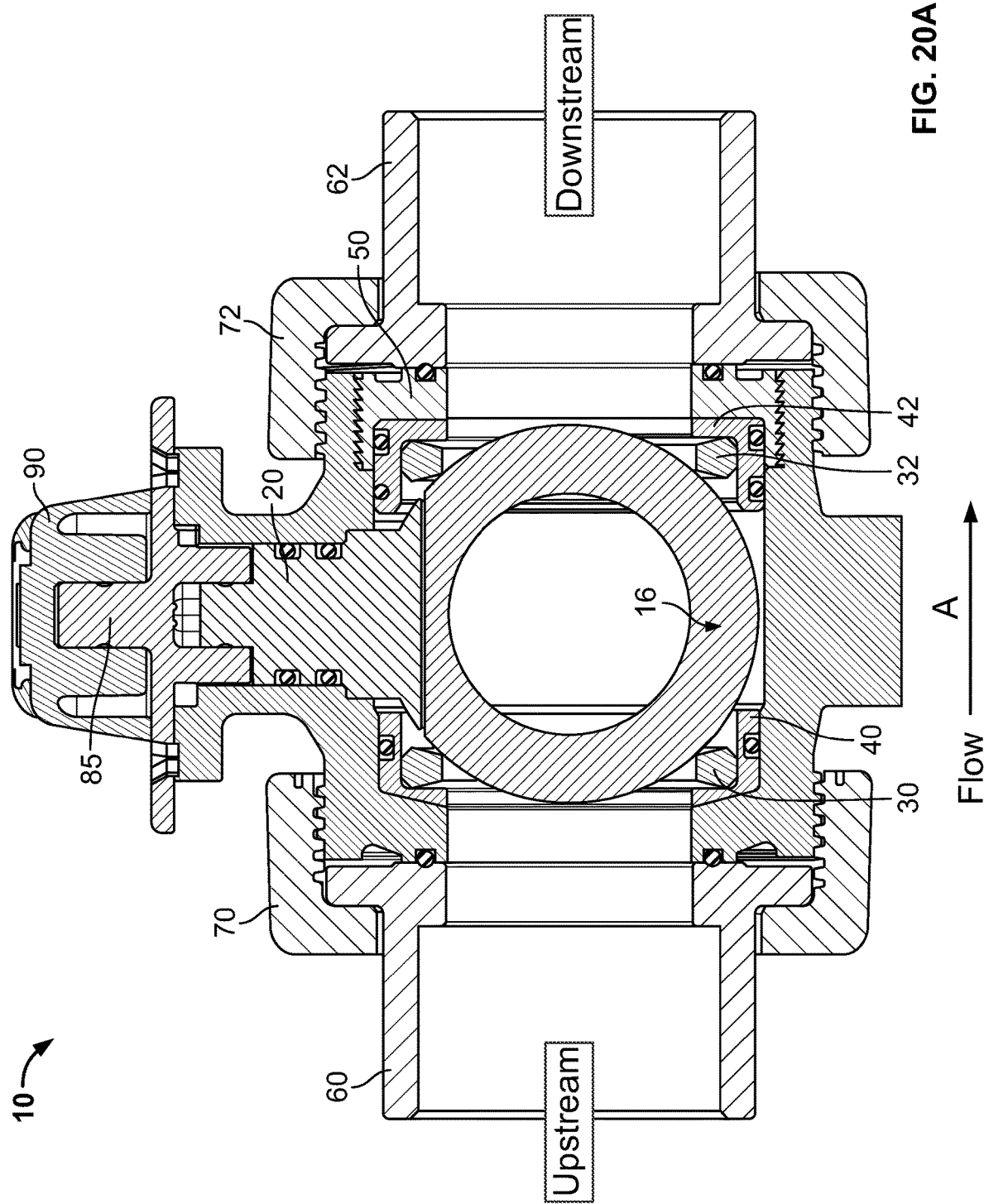
FIGS. 20A and 20B are cross-sectional views of the ball valve assembly of FIG. 19.

When the ball 16 is positioned in the closed position as shown in FIG. 20A, the floating ball valve assembly 10 is configured to seal by allowing the ball 16 (and seats 30, 32 and carriers 40, 42) to float or move downstream (e.g., in the direction of Arrow A in FIG. 20A) due to the load applied via upstream pressure (e.g., in reaction to an upstream load or applied pressure).

Figure 20B:
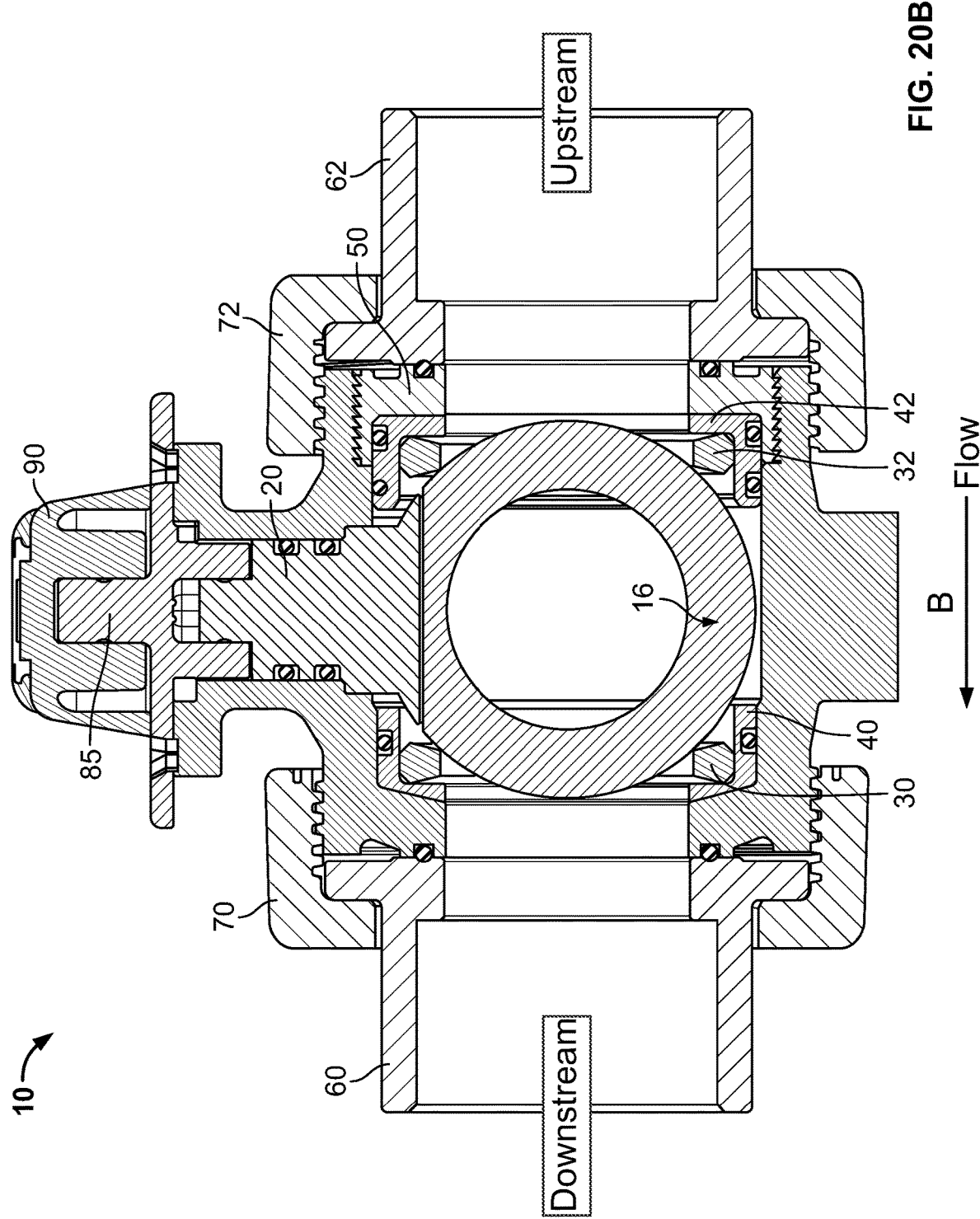
Figure 22:
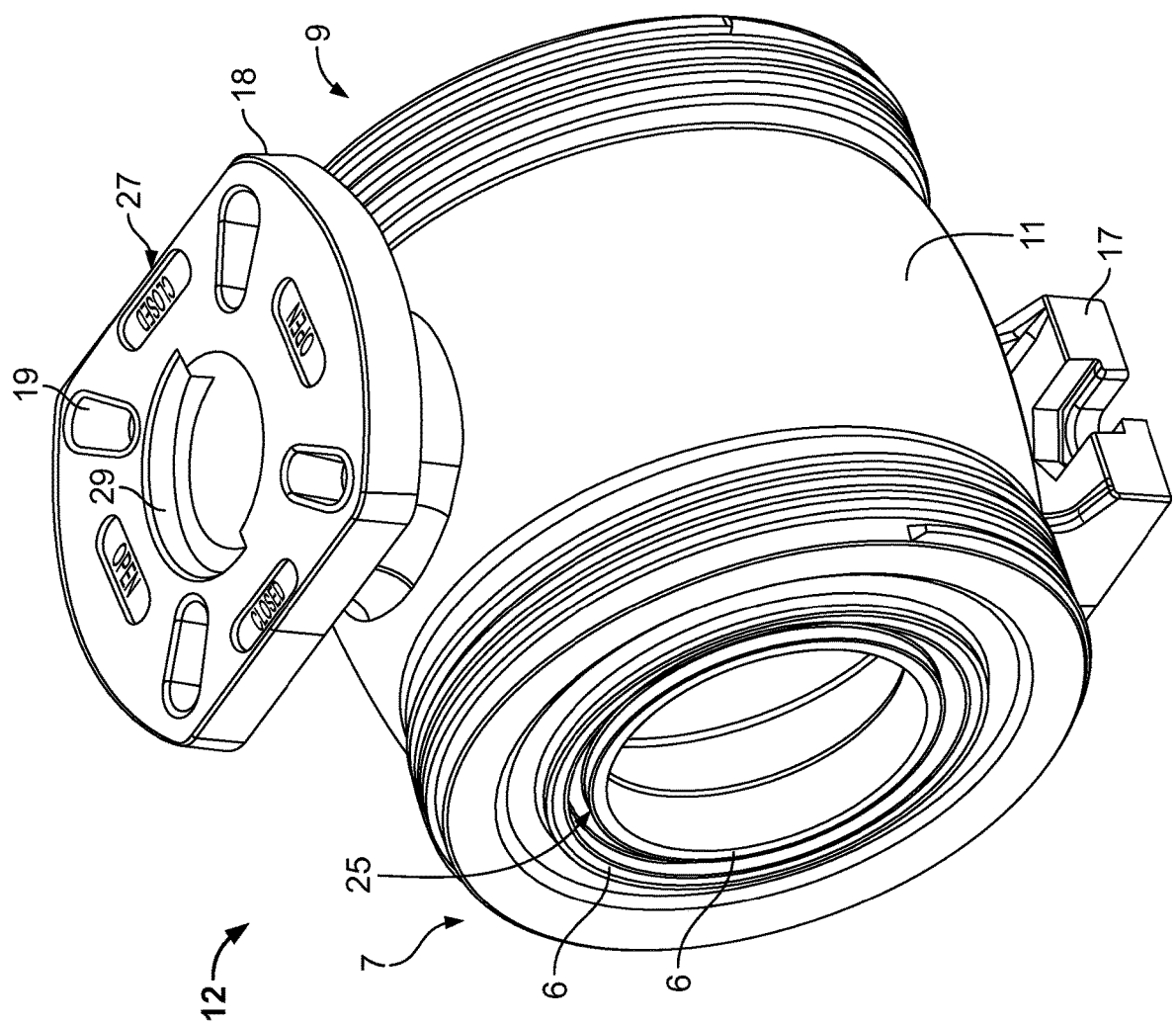
FIGS. 22-23 are side perspective views of the body member of FIG. 21.
Figure 23:
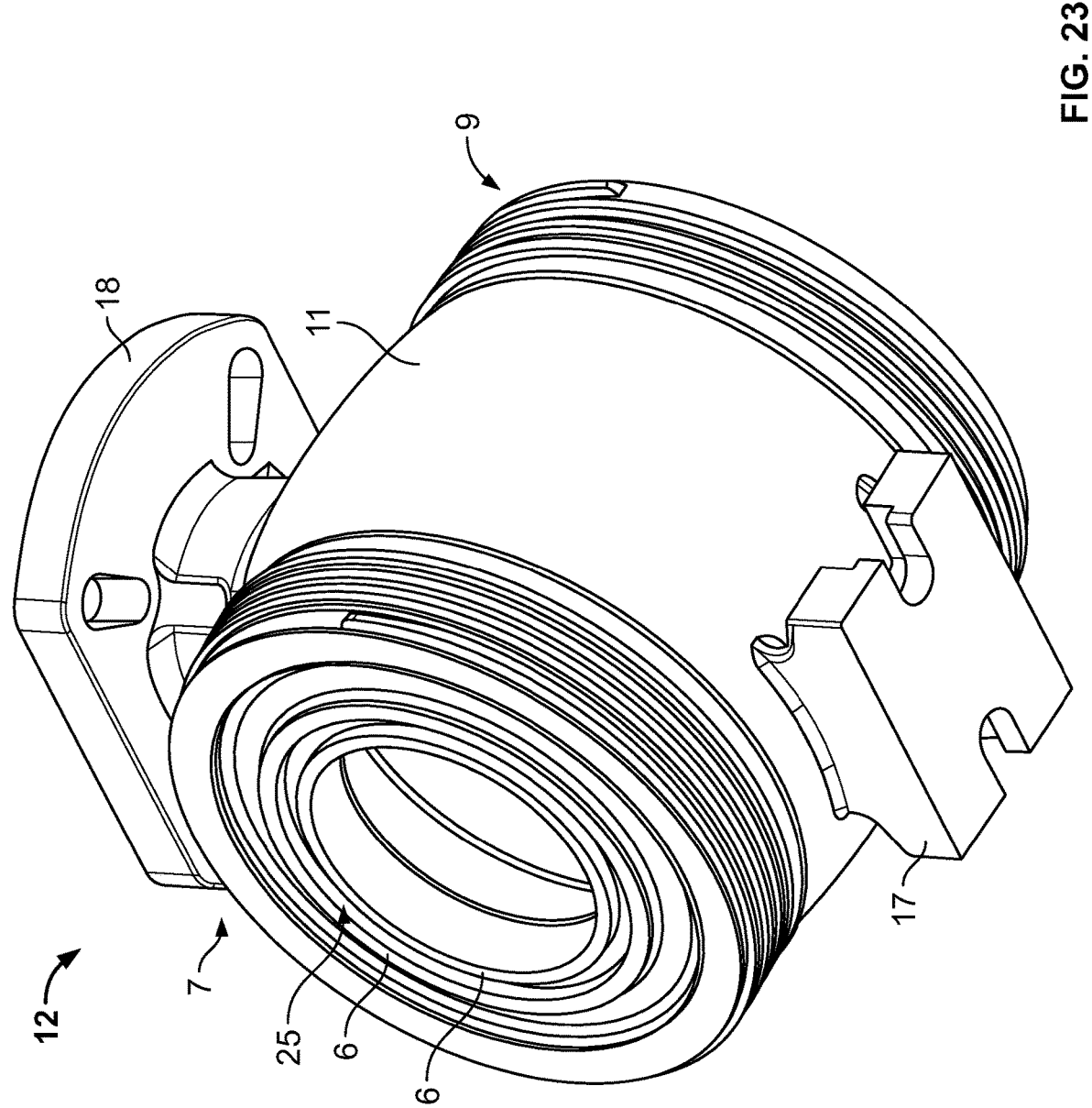
Figure 24:
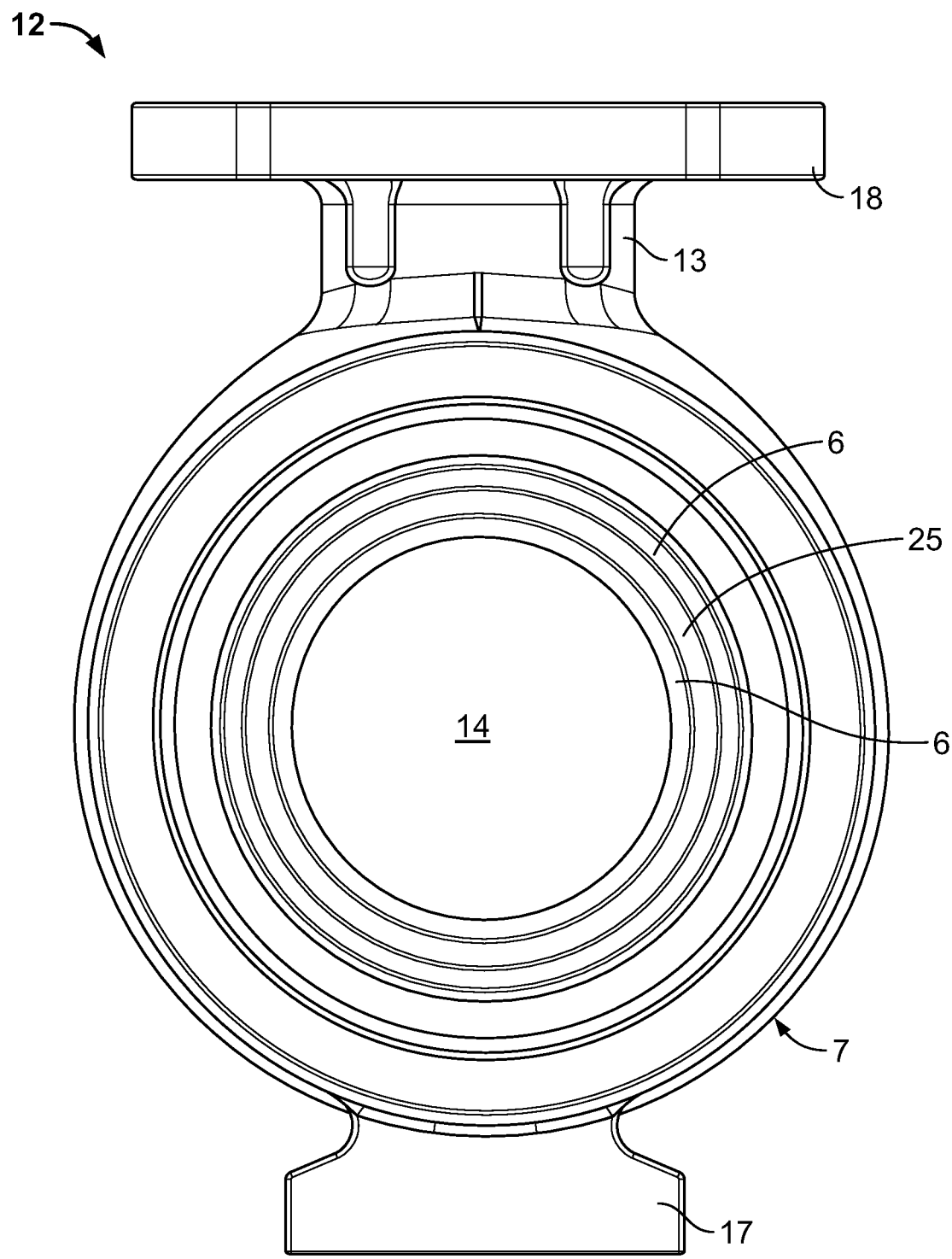
FIG. 24 is a side view of the body member of FIG. 21.

Similarly, when the ball 16 is positioned in the closed position as shown in FIG. 20B, the floating ball valve assembly 10 is configured to seal by allowing the ball 16 (and seats 30, 32 and carriers 40, 42) to float or move downstream (e.g., in the direction of Arrow B in FIG. 20B) due to the load applied via upstream pressure (e.g., in reaction to an upstream load or applied pressure).

The ball 16 is positioned inside body 12, and is engaged by seats 30, 32 and is engaged by the stem 20. The engagement between the ball 16 and the seats 30, 32 can facilitate that the ball 16 remains in line with the central longitudinal axis AX of the body bore 14 of valve body 12 (FIG. 21).

The engagement between the ball 16 and stem 20 can define the rotational position of the ball 16 in relation to the center point of the ball 16. The engagement between the ball 16 and the stem 20 can also facilitate that the ball 16 is centered on the central stem axis C (FIG. 21) of the neck bore 15 of valve body 12 (e.g., axis C of stem 20 positioned in bore 15) when the ball 16 is in the open position (FIG. 16), and that the ball 16 can float or move along central longitudinal axis AX when the ball 16 is in the closed position (FIGS. 20A and 20B). Exemplary central stem axis C of neck bore is transverse or perpendicular to central longitudinal axis AX of body bore 14.

Figure 12:
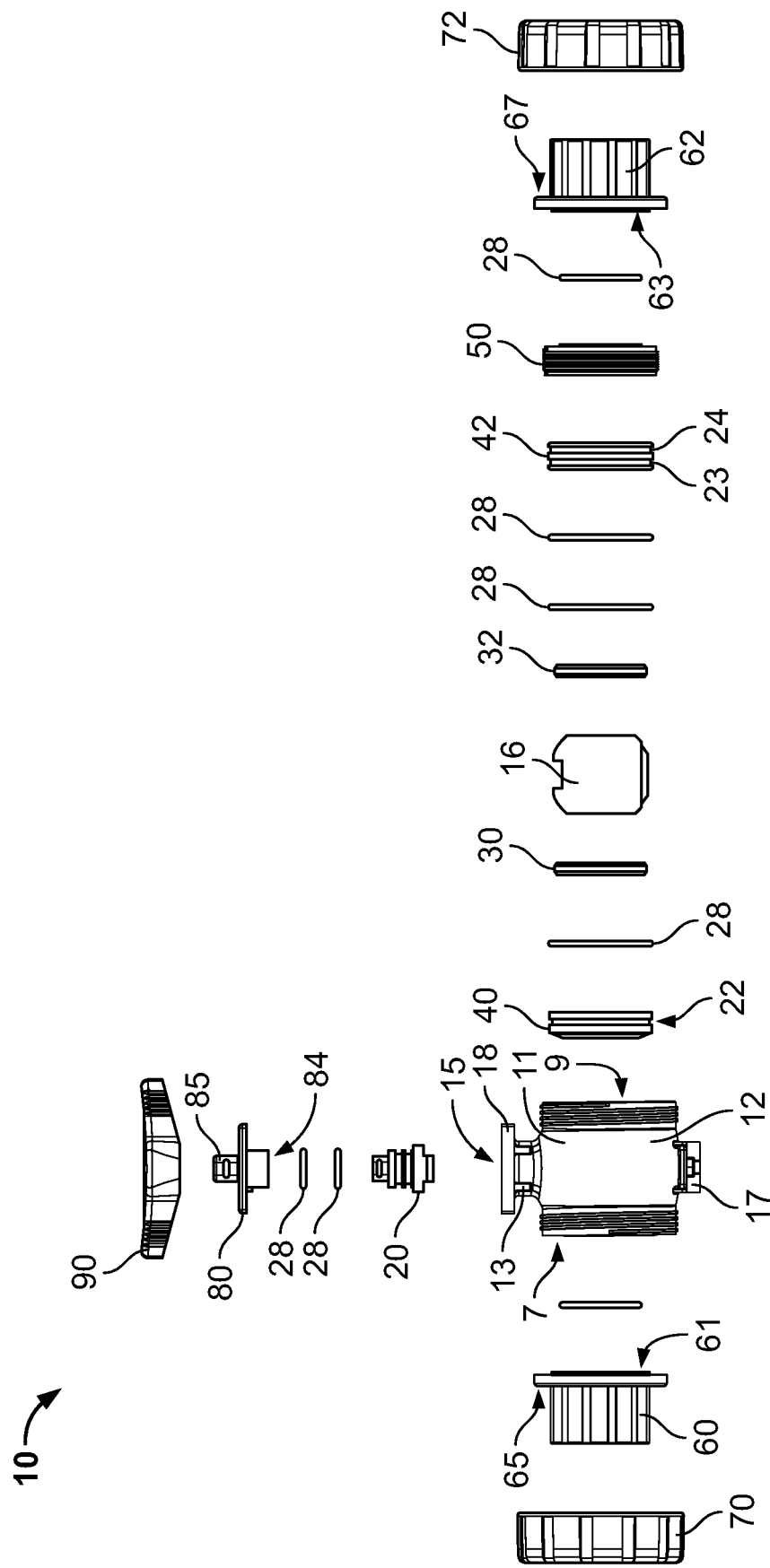
FIG. 12 is an exploded side view of a ball valve assembly according to an exemplary embodiment of the present disclosure, prior to assembly.
Figure 13:
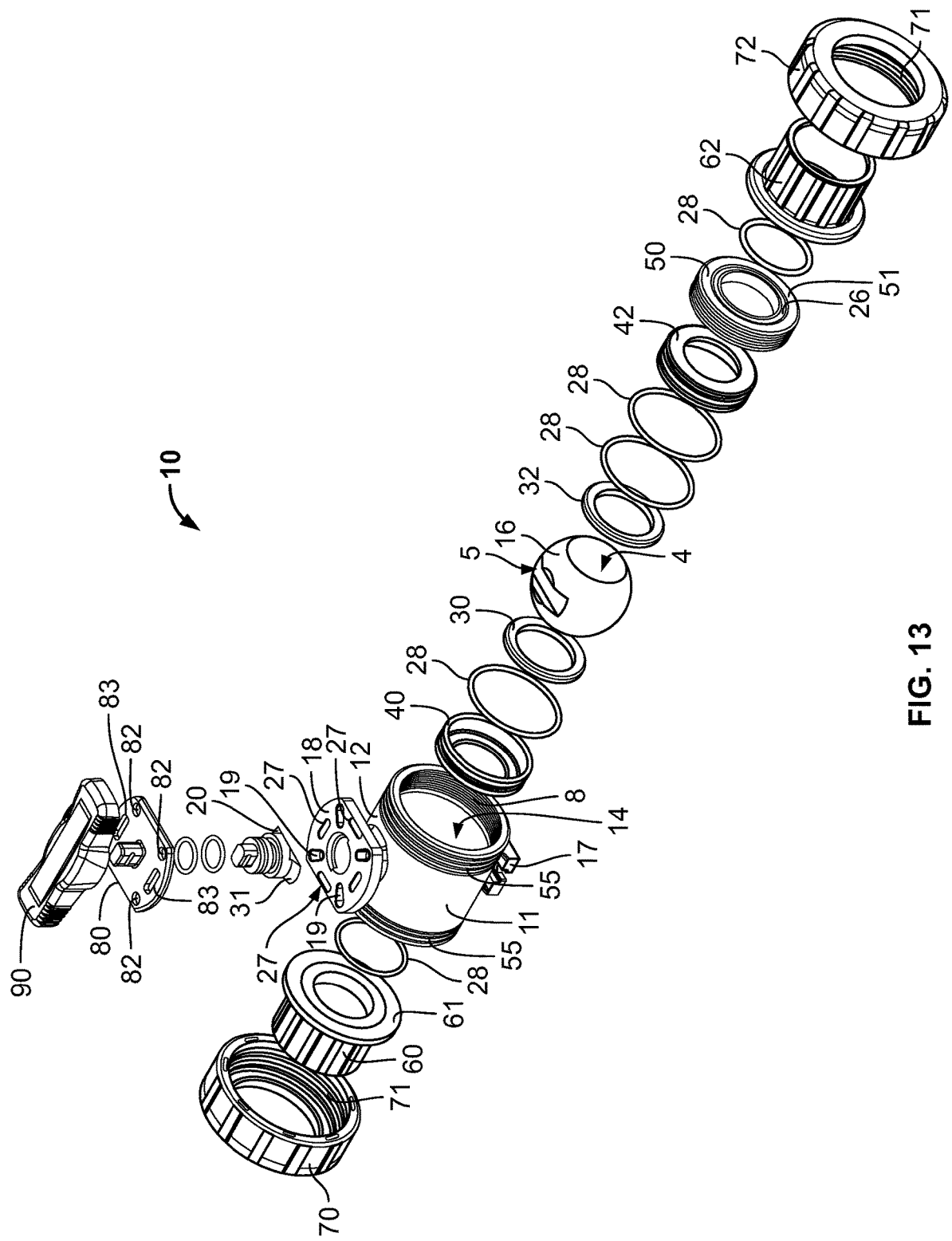
FIG. 13 is an exploded side perspective view of the ball valve assembly of FIG. 12.

As shown in FIGS. 12, 13 and 16, the exemplary engagement between the stem 20 and the ball 16 is via a female slot 5 on the outside diameter of the ball 16 (e.g., on top of ball 16). This slot 5 can be perpendicular to the bore 4 of the ball 16. The slot 5 can be engaged via a male protrusion 31 on the stem 20. As shown in FIG. 16, when the ball 16 is in the open position, the engagement between the sidewalls of the slot 5 and the protrusion 31 on the stem 20 can force the ball 16 to be centered on the stem axis C (e.g., ball 16 will not substantially move along axis AX in such position). As shown in FIGS. 20A and 20B, when the ball 16 is in the closed position, the ball 16 can be free to float or move along the longitudinal axis AX of the valve body 12 (e.g., with slot 5 moving relative to protrusion 31—FIG. 13).

The first and second seat members 30, 32 of assembly 10 are configured to create a seal between the ball 16 and the seat carriers 40, 42. In exemplary embodiments, each seat 30, 32 is substantially cylindrical/circular with a through hole, and defines a substantially diamond-shaped cross-sectional profile revolved about a center axis, although the present disclosure is not limited thereto. Rather, it is noted that each seat 30, 32 can take a variety of shapes, forms and/or designs. In general, each exemplary seat 30, 32 is designed to deflect under load and return substantially to its original geometry when the load is removed.

Figure 26:
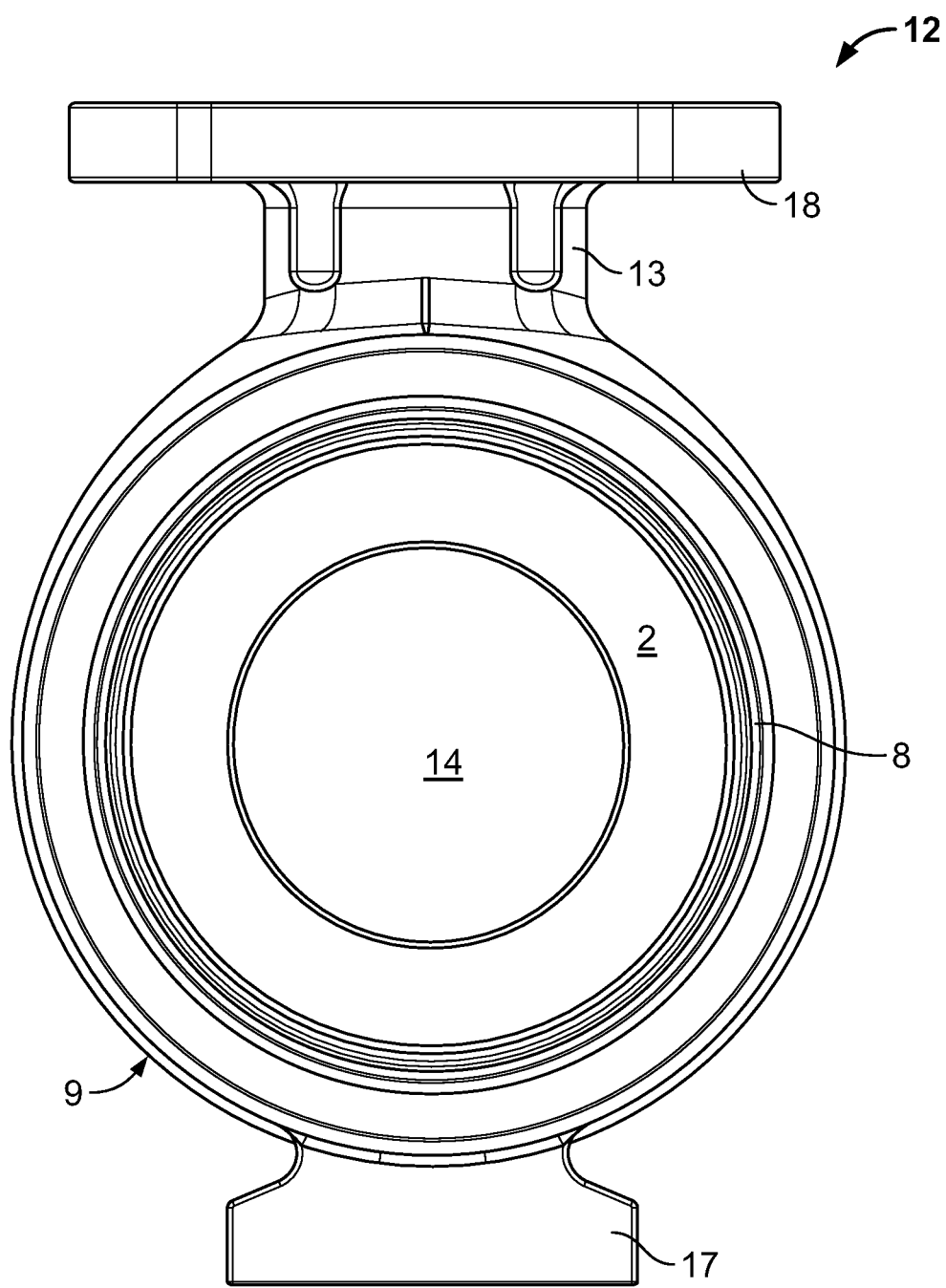
FIG. 26 is a side view of the body member of FIG. 21.
Figure 28:
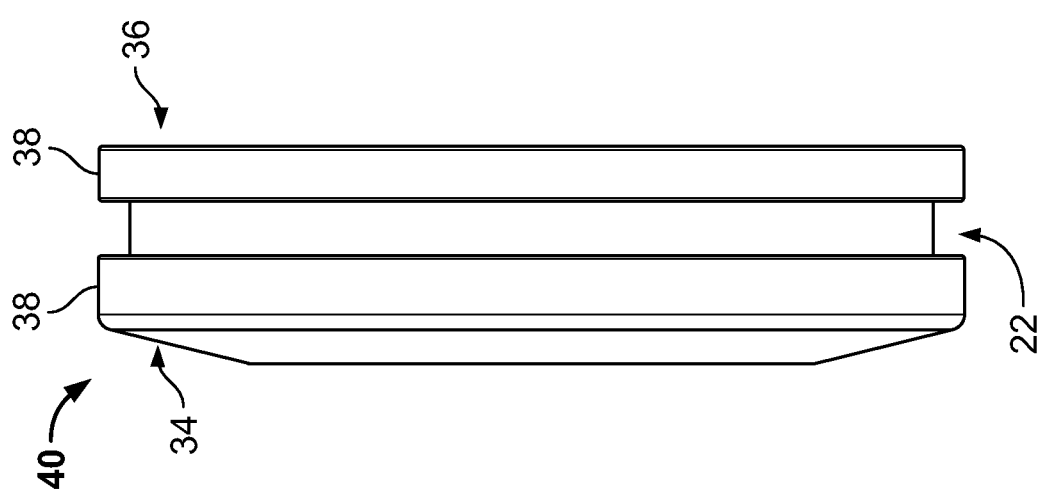
FIG. 28 is a side view of an exemplary first seat carrier of the assembly of FIG. 12.
Figure 30:
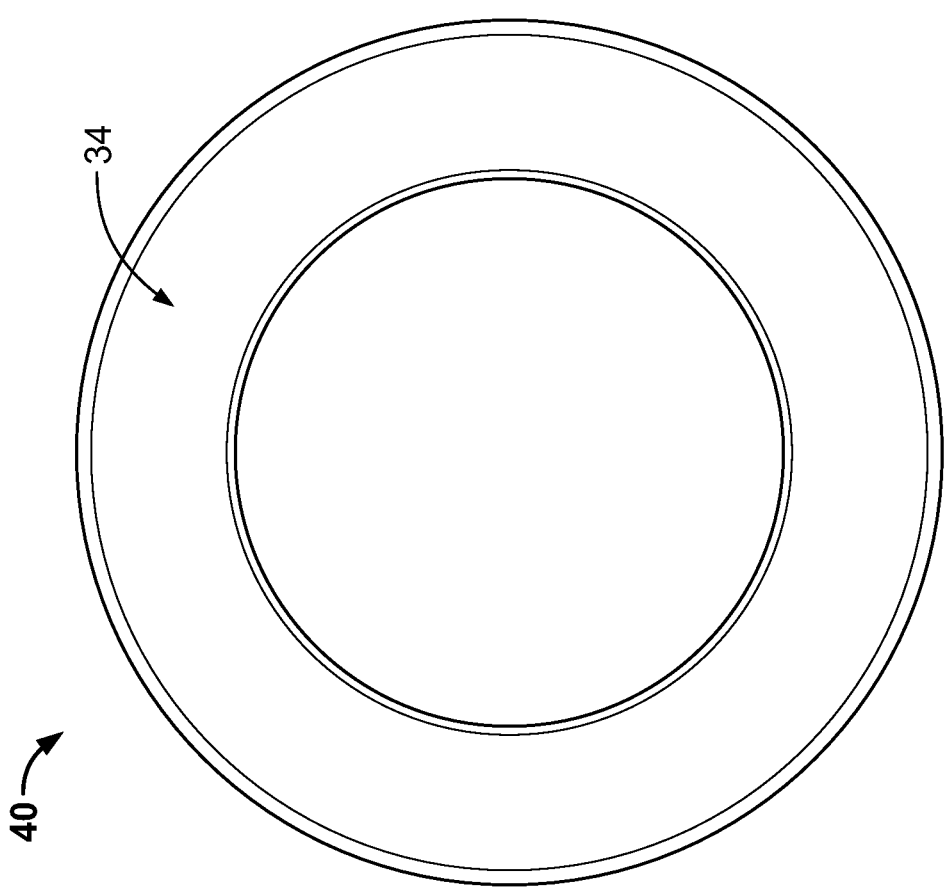
FIG. 30 is a side view of the first seat carrier of FIG. 28.
Figure 32:
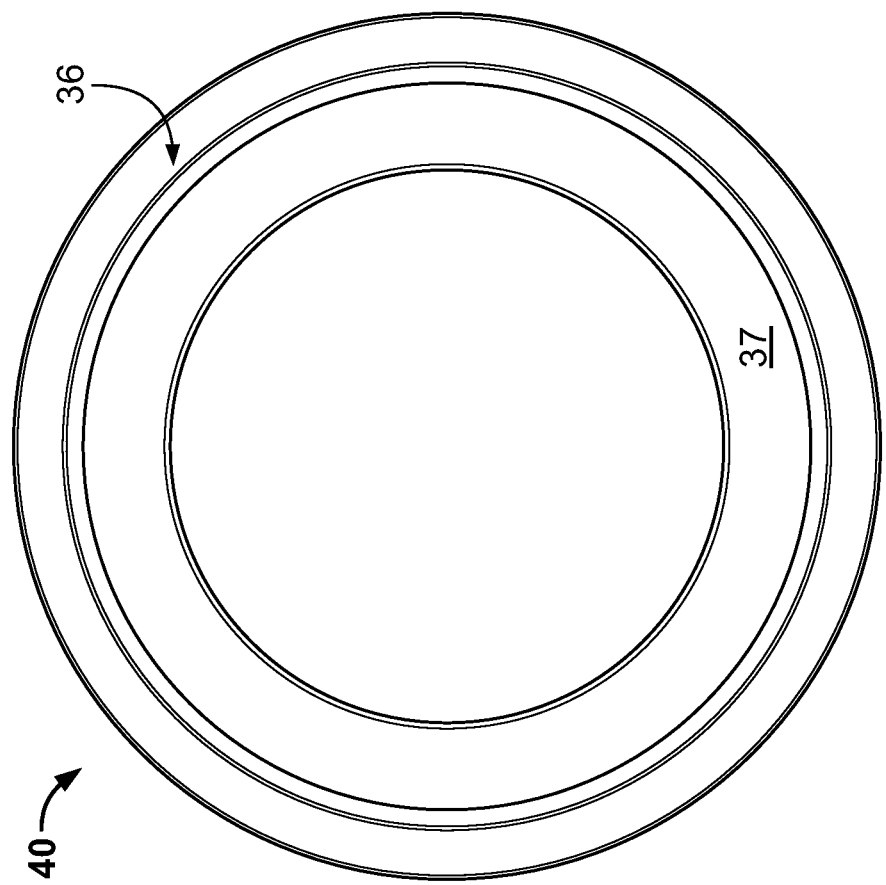
FIG. 32 is a side view of the first seat carrier of FIG. 28.
Figure 31:
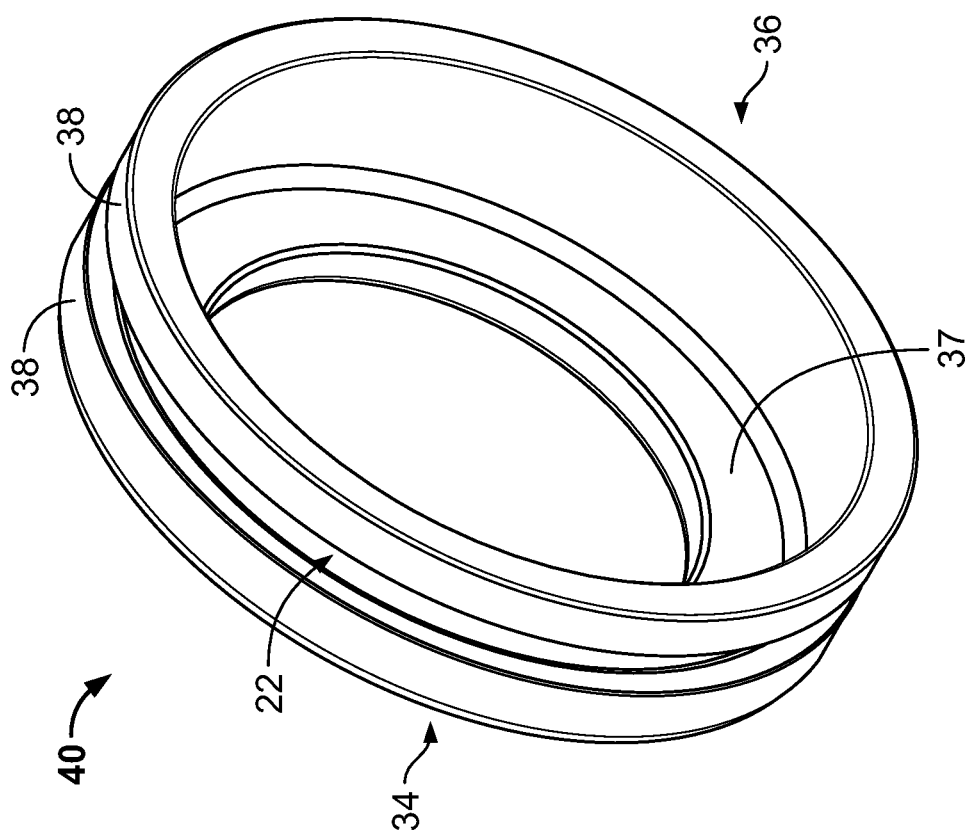
FIG. 31 is a side perspective view of the first seat carrier of FIG. 28.

As shown in FIGS. 16 and 28-32, exemplary first seat carrier 40 is substantially cylindrical with a through hole, and extends from an outer end 34 to an inner end 36. First seat carrier 40 is configured and dimensioned to house and retain the first seat member 30, and provides a seal to the body member 12. For example and as shown in FIGS. 16 and 31 and 32, first seat carrier 40 can include an inner wall 37 configured to house, engage and/or abut against the outer end of seat 30 to house and retain the first seat member 30 within carrier 40. Exemplary body 12 includes inner wall 2 (e.g., angled or spherical inner wall 2) configured to house, engage and/or abut against the outer end 34 (e.g., angled or spherical outer end 34) of carrier 40 to house and retain the carrier 40 within body 12 (FIGS. 16, 26 and 28).

In an embodiment and as depicted in FIGS. 16 and 28, the first seat carrier 40 is sealed on its outside diameter ("OD") or outer surface 38 via gasketing material 28 (e.g., O-ring 28) positioned within a groove 22 of outer surface 38 of carrier 40, with the O-ring 28 in groove 22 providing a piston seal against the inner diameter ("ID") or inner surface 3 of bore 14 of the body member 12.

It is noted that the first seat carrier 40 can also utilize a face seal or some other sealing mechanism or combination of sealing mechanisms to provide a seal against the body 12. Such seal could be separate from, or integral to first seat carrier 40. For example, such seal could be integral to body 12 or some other component of assembly 10.

In exemplary embodiments and as dictated by differential pressure, the first seat carrier 40 and seat 30 floats or moves downstream, in the direction of Arrow A in FIG. 20A, when the ball 16 of valve assembly 10 is closed (when the direction of Arrow A in FIG. 20A represents the flow direction). FIG. 20A depicts the ball 16 of valve assembly 10 in the closed position. As such, when the ball 16 is in the closed position and the direction of Arrow A represents the flow direction, the first seat carrier 40, seat 30 and ball 16 are free to float or move along the longitudinal axis AX of the valve body 12 in the direction of Arrow A.

In other embodiments and as dictated by differential pressure, the first seat carrier 40 and seat 30 floats or moves downstream, in the direction of Arrow B in FIG. 20B, when the ball 16 of valve assembly 10 is closed (when the direction of Arrow B in FIG. 20B represents the flow direction). FIG. 20B depicts the ball 16 of valve assembly 10 in the closed position. As such, when the ball 16 is in the closed position and the direction of Arrow B represents the flow direction, the first seat carrier 40, seat 30 and ball 16 are free to float or move along the longitudinal axis AX of the valve body 12 in the direction of Arrow B.

Figure 34:
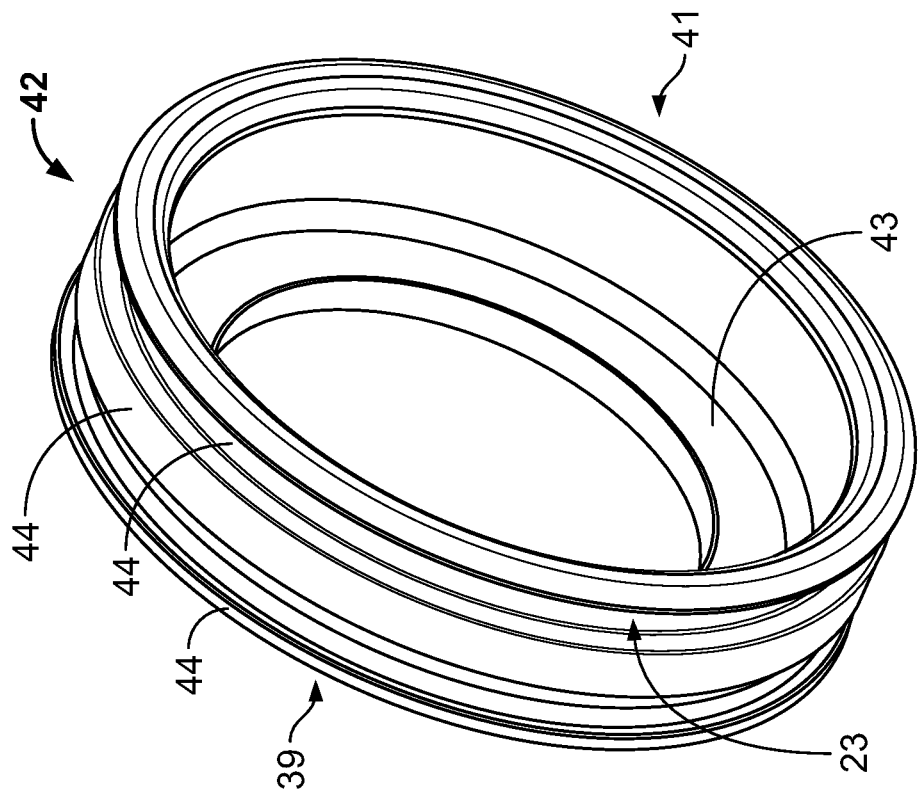
FIG. 34 is a side perspective view of the second seat carrier of FIG. 33.
Figure 33:
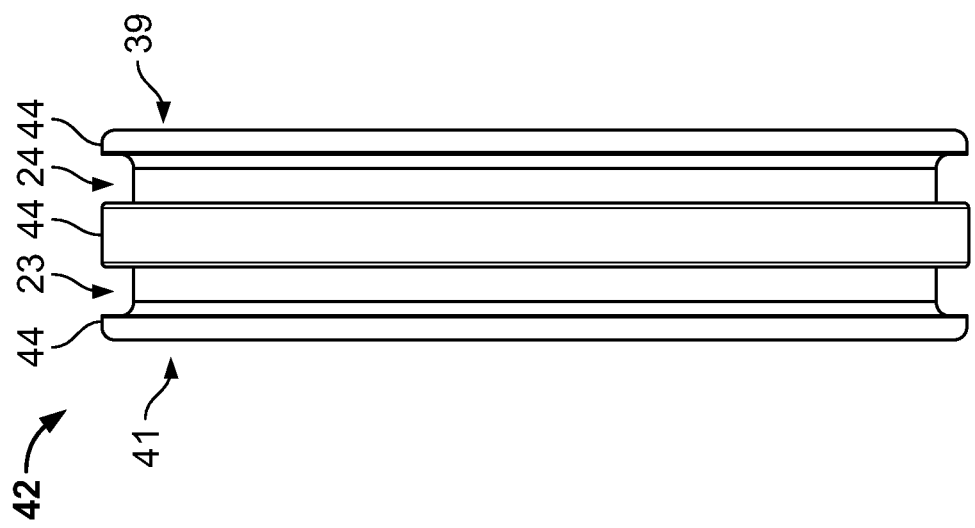
FIG. 33 is a side view of an exemplary second seat carrier of the assembly of FIG. 12.
Figure 36:
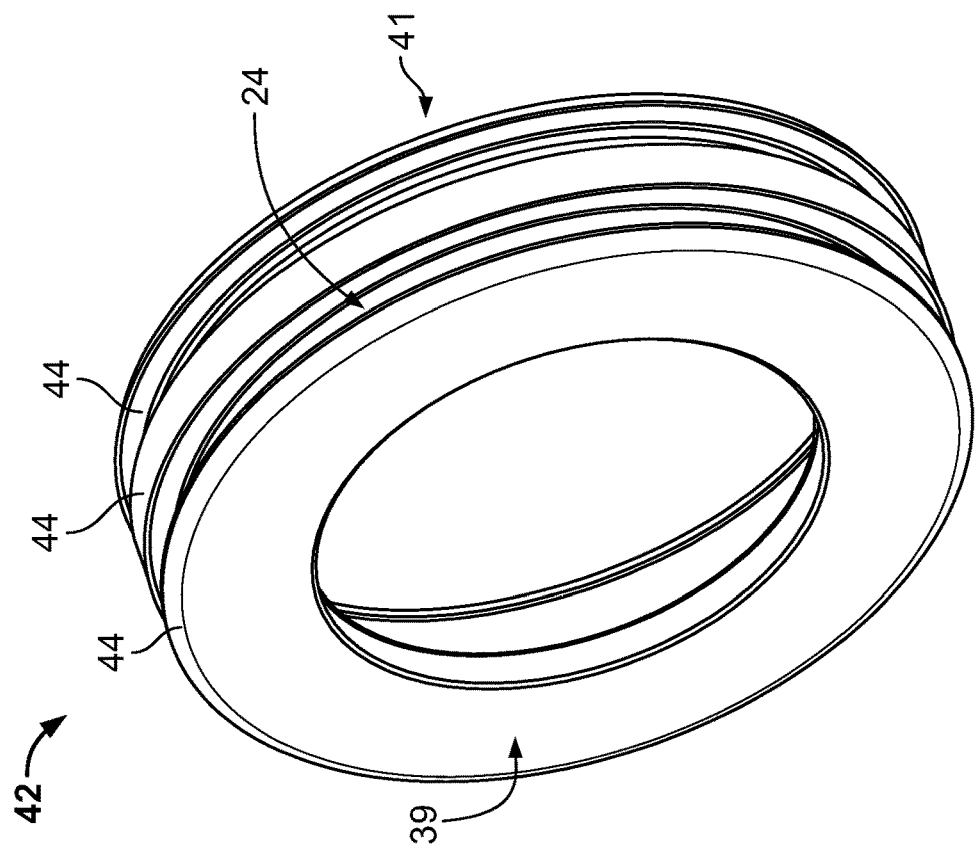
FIG. 36 is a side perspective view of the second seat carrier of FIG. 33.
Figure 35:
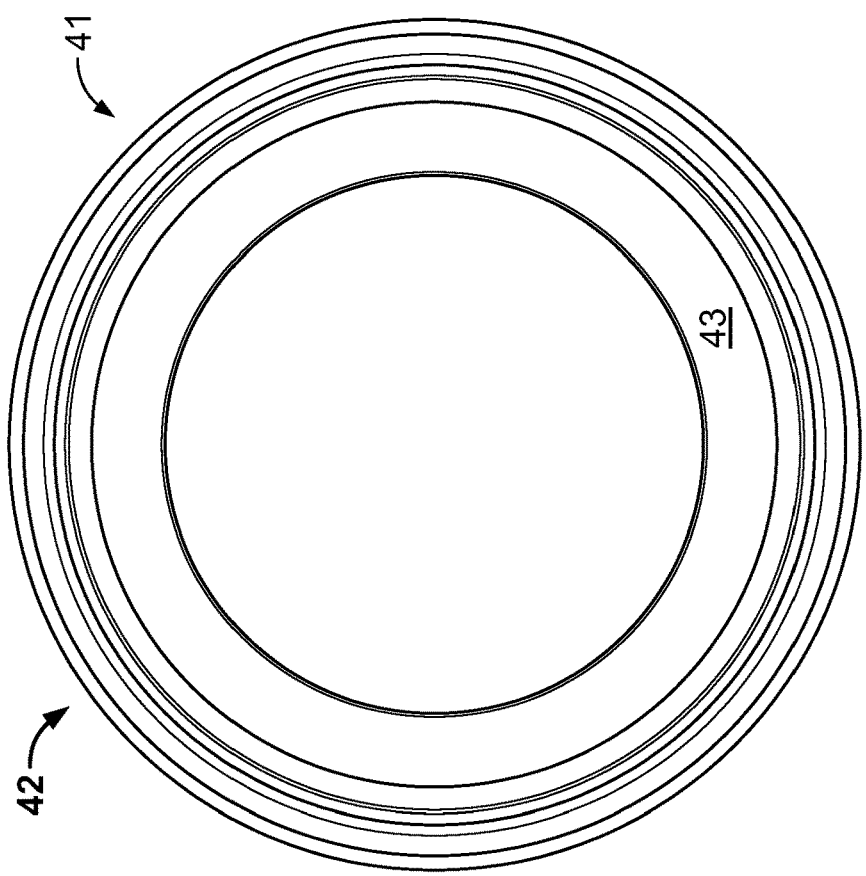
FIG. 35 is a side view of the second seat carrier of FIG. 33.

As shown in FIGS. 16 and 33-37, exemplary second seat carrier 42 is substantially cylindrical with a through hole, and extends from an outer end 39 to an inner end 41. Second seat carrier 42 is configured and dimensioned to house and retain the second seat member 32, and provides a seal to the body member 12, and also provides a seal to the seal retainer 50 (thus preventing bypass between the body 12 and the seal retainer 50). For example and as shown in FIGS. 16 and 34-35, second seat carrier 42 can include an inner wall 43 configured to house, engage and/or abut against the outer end of seat 32 to house and retain the second seat member 32 within carrier 42. As discussed further below, exemplary seal retainer 50 includes inner wall 52 (e.g., planar inner wall 52) configured to house, engage and/or abut against the outer end 39 (e.g., planar outer end 39) of carrier 42 to house and retain the carrier 42 within seal retainer 50 (FIGS. 16, 33 and 40).

In an embodiment and as depicted in FIGS. 16 and 33, the second seat carrier 42 is sealed on its OD or outer surface 44 via gasketing material 28 (e.g., O-rings 28) positioned within grooves 23, 24 of outer surface 44 of carrier 42, with the O-ring 28 in groove 23 providing a piston seal against the ID or inner surface 3 of bore 14 of the body member 12, and with the O-ring 28 in groove 24 providing a piston seal against the ID or inner surface 53 of the seal retainer 50.

It is noted that the example embodiment has two O-rings 28 on second seat carrier 42 in order to prevent bypass between body 12 and seal retainer 50. However, this could be sealed via other methods. It is also noted that the second seat carrier 42 can also utilize a face seal or some other sealing mechanism or combination of sealing mechanisms to provide a seal against the body 12 and/or retainer 50. Such seals could be separate from, or integral to second seat carrier 42. Such seals could be integral to body 12 or to retainer 50 of assembly 10.

In exemplary embodiments and as dictated by differential pressure, the second seat carrier 42 and seat 32 floats or moves downstream, in the direction of Arrow A in FIG. 20A, when ball 16 of the valve assembly 10 is closed (when the direction of Arrow A in FIG. 20A represents the flow direction). Again, FIG. 20A depicts the ball 16 of valve assembly 10 in the closed position. As such, when the ball 16 is in the closed position and the direction of Arrow A represents the flow direction, the second seat carrier 42, seat 32 and ball 16 are free to float or move along the axis AX of the valve body 12 in the direction of Arrow A.

In other embodiments and as dictated by differential pressure, the second seat carrier 42 and seat 32 floats or moves downstream, in the direction of Arrow B in FIG. 20B, when the ball 16 of valve assembly 10 is closed (when the direction of Arrow B in FIG. 20B represents the flow direction). As such, when the ball 16 is in the closed position and the direction of Arrow B represents the flow direction, the second seat carrier 42, seat 32 and ball 16 are free to float or move along the axis AX of the valve body 12 in the direction of Arrow B.

In certain embodiments and as shown in FIGS. 16 and 38-42, seal retainer 50 is substantially circular/cylindrical with a through hole, and extends from an outer end 45 to an inner end 47. Exemplary seal retainer 50 is configured to mount to the second end 9 of the body 12 and to retain the internal components (e.g., ball 16, carriers 40, 42, seats 30, 32) within bore 14 of body 12 of the valve assembly 10.

As noted, seal retainer 50 includes inner wall or counterbore 52 configured to house, engage and/or abut against the outer end 39 of carrier 42 to house and retain at least a portion of the carrier 42 within seal retainer 50. Second seat carrier 42 provides a seal to the seal retainer 50 via gasketing material 28 in groove 24, thus preventing bypass between the body 12 and the seal retainer 50 (e.g., with O-ring 28 in groove 24 providing a piston seal against inner surface 53 of seal retainer 50).

As discussed further below and as shown in FIGS. 12, 13, 16 and 41, an engagement surface 63 of end connector 62 engages abutment surface 51 of seal retainer 50, with gasketing material 28 (e.g., O-ring 28) positioned within groove 26 of abutment surface 51 of seal retainer 50, and with the O-ring 28 in groove 26 providing a face seal of engagement surface 63 of end connector 62 against abutment surface 51 of seal retainer 50.

Figure 25:
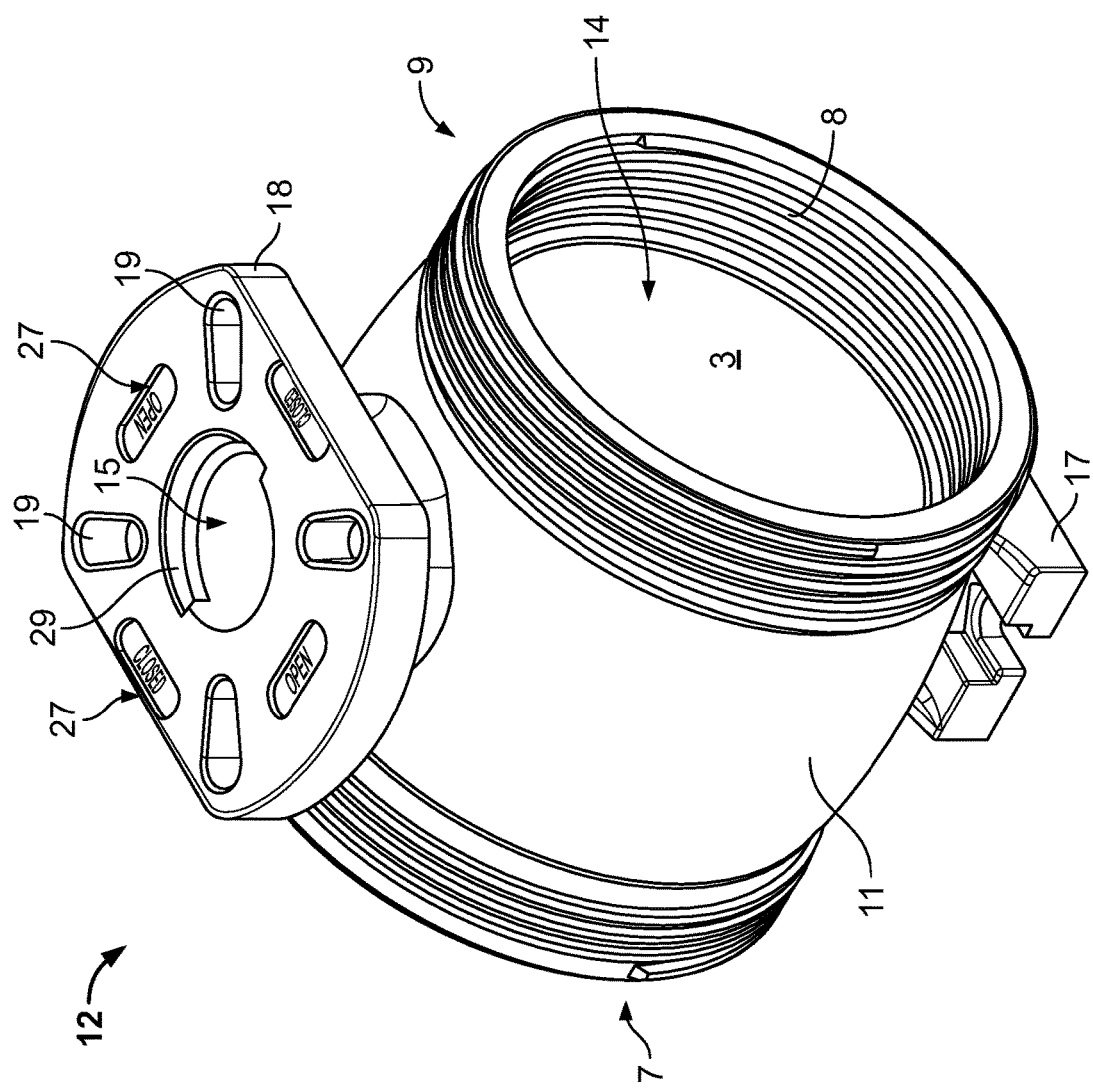
FIG. 25 is a side perspective view of the body member of FIG. 21.

In an embodiment and as depicted in FIGS. 16 and 25, the inner surface 3 of second end 9 of body 12 includes threads 8 that extend from the second end 9 to an abutment wall 46 of body 12 positioned a distance from second end 9.

Figure 38:
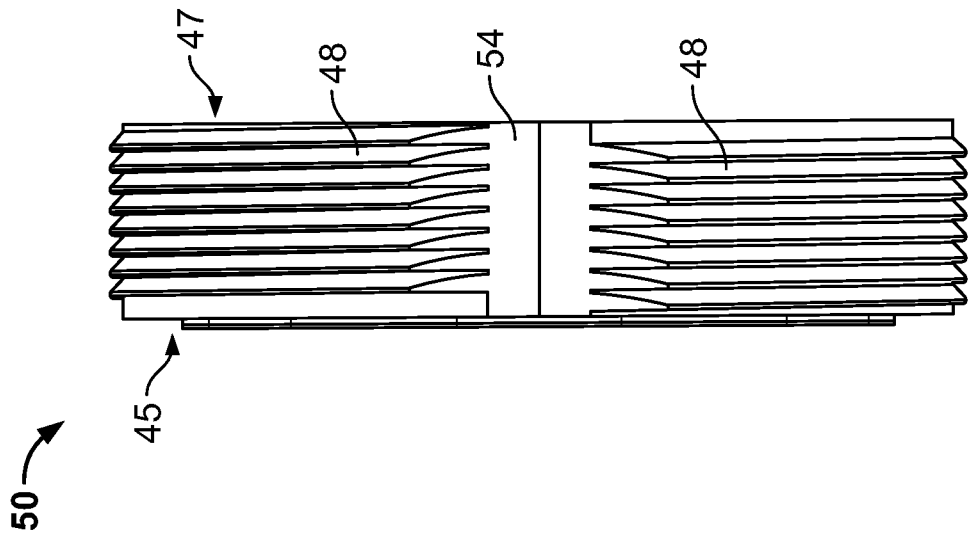
FIG. 38 is a side view of an exemplary seal retainer of the assembly of FIG. 12.
Figure 37:
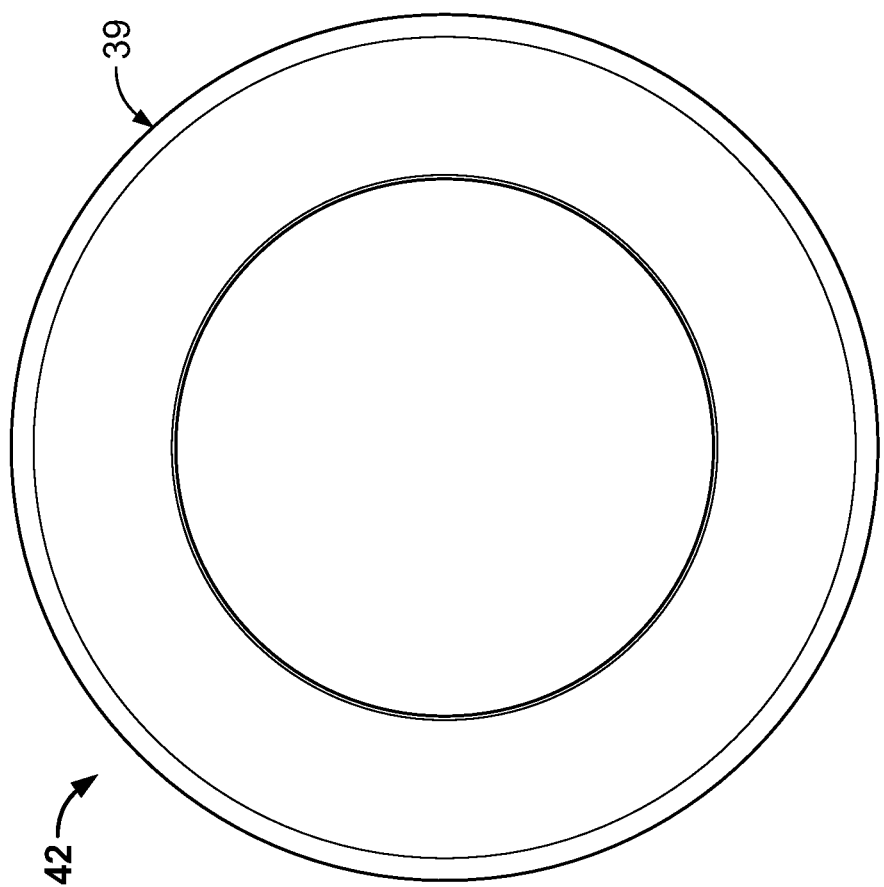
FIG. 37 is a side view of the second seat carrier of FIG. 33.
Figure 42:
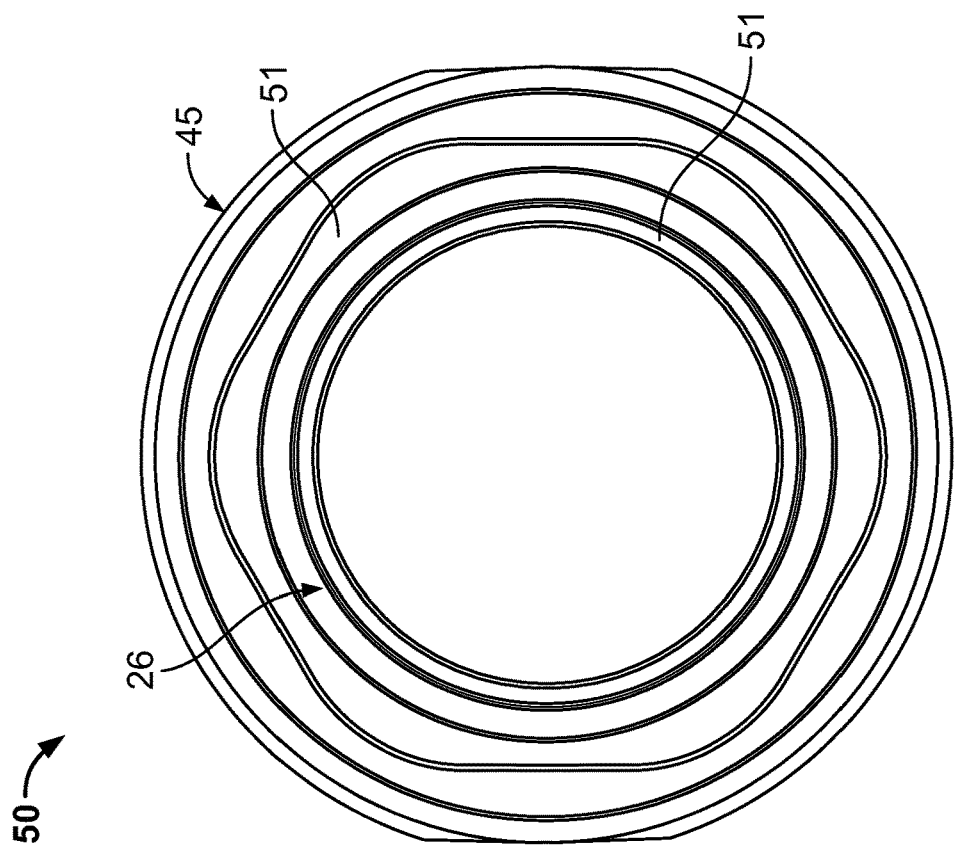
FIG. 42 is a side view of the seal retainer of FIG. 38.
Figure 41:
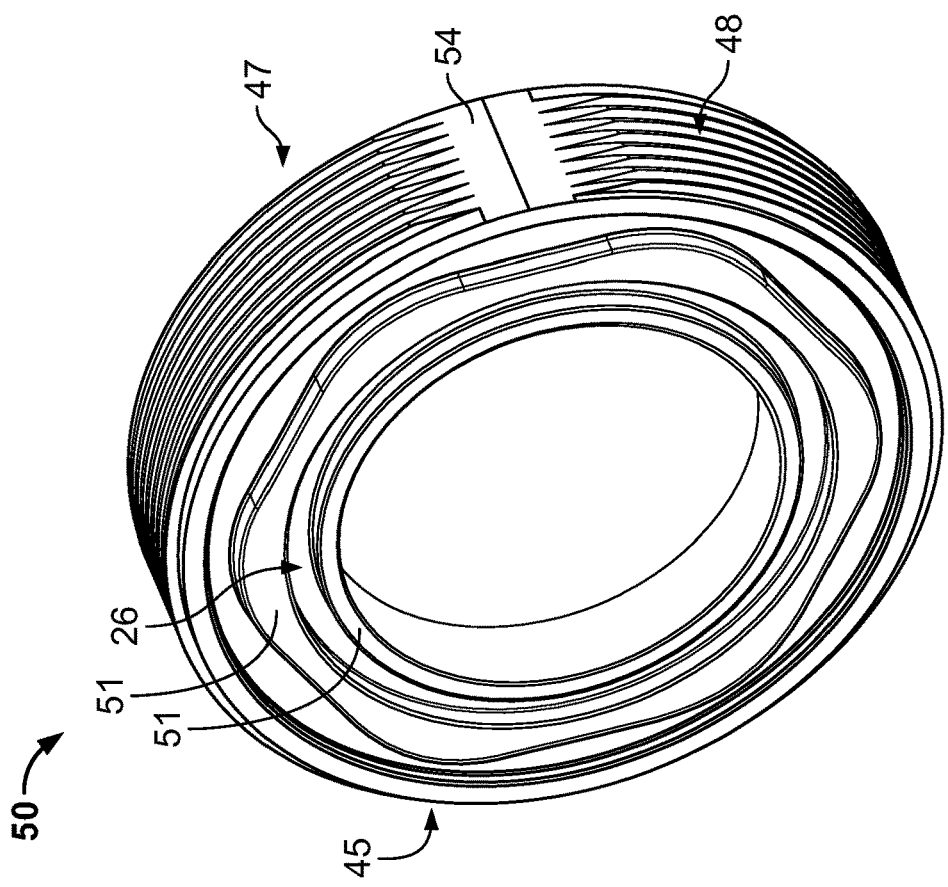
FIG. 41 is a side perspective view of the seal retainer of FIG. 38.
Figure 43:
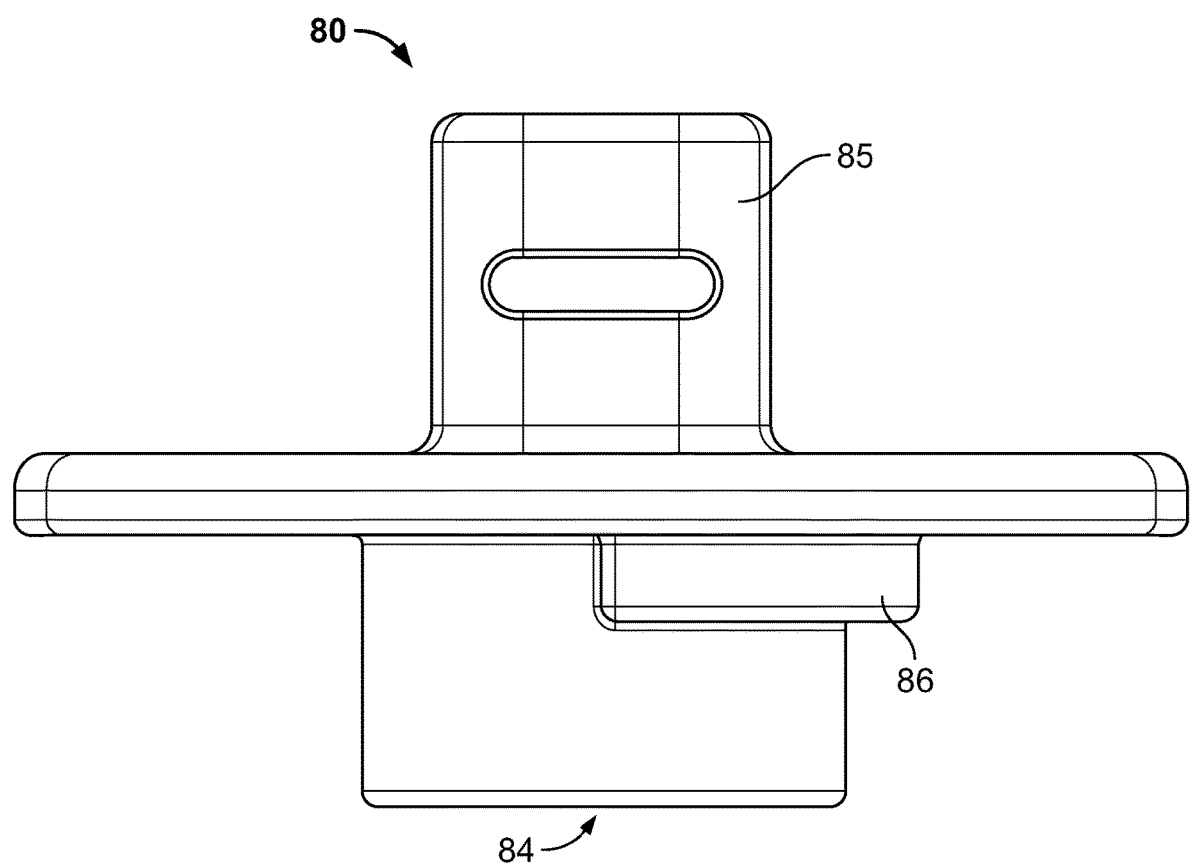
FIG. 43 is a side view of an exemplary lock plate of the assembly of FIG. 12.

As shown in FIGS. 16 and 38, exemplary seal retainer 50 is threaded with threads 48 on its OD or outer surface 54, with the threads 48 of seal retainer 50 configured to engage threads 8 of body 12 until inner end 47 of seal retainer 50 abuts or engages the abutment wall 46 of body 12.

In certain embodiments, the depth the seal retainer 50 is driven to or positioned within second end 9 and relative to the body member 12 dictates how much preload is applied to the seats 30, 32. In an embodiment, the inner end 47 of seal retainer 50 is driven/mounted/threaded to a hard stop against abutment wall 46 of body 12 (e.g., via engagement of threads 8, 48), and may not require adjustment.

While exemplary seal retainer 50 is shown as threaded with threads 48, it is noted that retainer 50 could have a suitable geometry without threads that engages body 12 and that can retain load (e.g., including retainer 50 welded to or integrally formed with body 12). For example, if retainer 50 is integrally formed with body 12, the ball 16, stem 20, seat carriers 40, 42 and seats 30, 32 can be assembled together, and then body 12 with integral retainer 50 can be formed around such fabrication of ball 16, stem 20, seat carriers 40, 42 and seats 30, 32 assembled together.

It is also noted that seal retainer 50 could also not include threads and be retained by a fastener 72 (or 70) or the like.

In other embodiments, seal retainer 50 could also be positioned on first end 7 of body 12. In such cases where assembly 10 includes retainers 50 on both sides 7, 9 of body 12, then first seat carrier 40 and first end 7 of body 12 could be configured, dimensioned and adapted to operate and function similarly to second seat carrier 42 and similarly to second end 9 of body 12.

It is noted that the example embodiment provides that the seal retainer 50 can be driven to a hard stop against abutment wall 46, however, it is noted that retainer 50 could remain adjustable. For example, if retainer 50 is desired to be adjustable, retainer 50 could be driven or moved to a predefined location or position along threads 8 between second end 9 and wall 46, or it could be further tightened against wall 46 to create appropriate/desired seat load on seats 30, 32.

As discussed further below and as shown in FIGS. 12, 13, 14A, 16, 27 and 43-47, exemplary lock plate 80 is configured to couple the handle 90 to the stem 20, to provide stops at the full open and the full closed positions, and to provide a means of locking the valve assembly 10 (e.g., ball 16) in position. In an exemplary embodiment, the lock plate 80 includes windows 83 therethrough (e.g., two windows 83 positioned 180° apart on plate 80) configured to indicate valve assembly 10 (e.g., ball 16) position (e.g., Open or Closed). It is noted that lock plate 80 can be used on other valve types, and it may not be exclusive to floating ball valves.

As shown in FIGS. 12, 13, 16 and 48, exemplary handle 90 is configured to provide a means of operating the valve assembly 10 (e.g., operating/moving ball 16). In an embodiment, the handle 90 includes a socket 91 that is designed to engage the protrusion 85 of lock plate 80. Exemplary handle can take the form of a "T" design or shape, although the present disclosure is not limited thereto. Rather, handle 90 can take a variety of shapes/forms (e.g., lever design or other shapes/styles). In alternate embodiments, it is noted that the handle 90 can engage the stem 20 directly (e.g., and not via plate 80).

In other embodiments, it is noted that handle 90 and lock plate 80 can be integral with one another (e.g., as an integrally formed or molded one-piece component that includes handle 90 and plate 80). Exemplary one-piece handle 90 and plate 80 can be configured to couple to stem 20 (e.g., via socket 84, as discussed further below).

As depicted in FIGS. 12, 13 and 16, exemplary end connectors 60, 62 are configured to provide a means of connecting the valve assembly 10 to a pipe line or the like. End connectors 60, 62 can provide socket (for solvent welding or socket fusion) or threaded connections. Exemplary end connectors 60, 62 are substantially circular/cylindrical with a through hole.

As shown in FIGS. 12, 13 and 16, the engagement surfaces 61, 63 of the end connectors 60, 62 are configured to engage a face seal on the body member 12 and seal retainer 50, respectively, to generate a seal between the end connector 60 and first end 7 of body 12, and between the end connector 62 and seal retainer 50. More particularly and in certain embodiments, engagement surface 61 of end connector 60 engages outer surface 6 of first end 7 of body 12 (FIG. 22), with an O-ring 28 positioned within groove 25 of outer surface 6 of first end 7 of body 12 (FIG. 16), with the O-ring 28 in groove 25 providing a face seal of engagement surface 61 against outer surface 6 of first end 7 of body 12 (FIGS. 12 and 16).

Similarly, engagement surface 63 of end connector 62 engages abutment surface 51 of seal retainer 50, with an O-ring 28 positioned within groove 26 of abutment surface 51 of seal retainer 50, with the O-ring 28 in groove 26 providing a face seal of engagement surface 63 against abutment surface 51 of seal retainer 50.

As shown in FIGS. 12, 13 and 16, exemplary assembly fasteners 70, 72 are configured to retain the end connectors 60, 62 on the body 12 of the valve assembly 10. Assembly fasteners 70, 72 can be substantially circular/cylindrical with a through hole.

As depicted in FIG. 13, each exemplary assembly fastener 70, 72 has an internal thread 71 that engages an external thread 55 on the body 12. As each assembly fastener 70, 72 is tightened onto the body 12 of valve assembly 10, assembly fasteners 70, 72 engage the shoulder surfaces 65, 67 on the OD of end connectors 60, 62, respectively (FIG. 12), and this engagement forces the end connector 60 against the face seal of outer surface 6 of first end 7 of body 12, and forces the end connector 62 against the face seal of abutment surface 51 of seal retainer 50 (and against second end 9).

Exemplary valve assembly 10 is a floating ball valve assembly 10. However, instead of utilizing seats that are fixed in relation to the seal retainer and the valve body, the exemplary assembly 10 advantageously utilizes seats 30, 32 that are installed in seat carriers 40, 42.

The seat carriers 40, 42 (and seats 30, 32) are allowed to float, move or translate along the horizontal axis AX of the valve assembly 10. As noted, carriers 40, 42 are sealed within the valve assembly 10 via piston seals between the OD of the seat carriers 40, 42 and the ID of the valve body 12 and seal retainer 50.

When the valve assembly 10 (e.g., ball 16) is closed, the initial seal is generated via preload on the seats 30, 32 established at assembly. As the differential pressure acts on the pressure area of the ball 16, the ball 16 is forced to float or move downstream (e.g., along axis AX in the direction A in FIG. 20A, or direction B in FIG. 20B) and the ball 16 applies additional load on the downstream seat (e.g., 30 or 32), thus increasing the contact stress on the downstream seat and improving the seal between the ball 16 and the downstream seat.

The differential pressure acting on the ball 16 is the difference in pressure between the upstream and the downstream. The area on the ball 16 on which the differential pressure acts is the projected area inside the seal between the ball 16 and the respective seat 30, 32. The projected area can be adjusted in the design by adjusting the seal location between the ball 16 and the respective seat 30, 32.

One advantageous improvement of assembly 10 can be realized at the upstream seat (e.g., 30 or 32) and seat carrier (e.g., 40 or 42). In some conventional floating ball valves, sometimes as the ball floats downstream it can move away from the upstream seat and, at some level of differential pressure, the seal between the upstream seat and the ball can be lost.

By utilizing a floating seat carrier (e.g., 40, 42) on the upstream seat (e.g., 30 or 32), the upstream seat carrier and the upstream seat are allowed to float or move downstream (e.g., along axis AX in the direction A in FIG. 20A, or direction B in FIG. 20B) along with the ball 16, thus allowing assembly 10 to retain both a downstream and an upstream seal (e.g., effectively a primary and a secondary seal).

The upstream seat carrier (e.g., 40 or 42) is motivated to float or move downstream due to differential pressure acting on the pressure area of the seat carrier. The differential pressure acting on the upstream seat carrier is the difference in pressure between the upstream and the central cavity of the valve body 12. In the event of a failure to seal at the downstream seat (e.g., seat 30 or 32), this differential pressure is equal to the difference in pressure between the upstream cavity and the downstream. The upstream pressure area of the seat carrier can be defined as the difference in the projected area of the body ID or seal retainer ID and the projected area inside the seal between the ball 16 and the seat (the ball pressure area).

It is noted that seat carriers 40, 42 can be designed such that each provides two different pressure areas (e.g., the pressure area on the first end 7 side of the carrier 40 could be different than the pressure area on the valve cavity side of the carrier 40; the pressure area on the second end 9 side of the carrier 42 could be different than the pressure area on the valve cavity side of the carrier 42).

In addition to applying load to (and thereby improving) the upstream seal, the load created by the upstream seat carrier (e.g., 40 or 42) is transferred into the ball 16, thus further increasing the load on the downstream seat (e.g., seat 30 or 32), and thereby further improving the downstream seal. This additional load is above and beyond what is achievable with existing floating ball valves. This additional load can be especially beneficial at low (e.g., less than 2 psi) line pressures where the force applied to the differential area of the ball 16 (and thereby to the downstream seat) is relatively small.

In some embodiments, as the differential pressure acts on the pressure area of the ball 16, the ball 16 is forced to float or move downstream (e.g., direction A in FIG. 20A, or direction B in FIG. 20B) and apply additional load on the extreme downstream seat (e.g., seat 32 for direction A, or seat 30 for direction B), thus increasing the contact stress on the extreme downstream seat and improving the seal between the ball 16 and the extreme downstream seat 30 or 32.

Thus and in certain embodiments, when the ball member 16 is rotated to a fully closed position and when the downstream direction is configured to flow from the first end 7 to the second end 9 of the body member 12 (e.g., direction of arrow A in FIG. 20A), then: (i) the ball member 16 is configured to move along the central longitudinal axis AX in the downstream direction and apply a downstream load against the second seat 32 in reaction to the upstream load or applied pressure, with the downstream load increasing sealing contact stress between the ball member 16 and the second seat 32, and (ii) the first seat carrier 40 and the first seat 30 are configured to move along the central longitudinal axis AX in the downstream direction and apply an additional downstream load against the ball member 16 in reaction to the upstream load or applied pressure, the additional downstream load increasing sealing contact stress between the ball member 16 and the first seat 30 and between the ball member 16 and the second seat 32.

Similarly, when the ball member 16 is rotated to a fully closed position and when the downstream direction is configured to flow from the second end 9 to the first end 7 of the body member 16 (e.g., direction of arrow B in FIG. 20B), then: (i) the ball member 16 is configured to move along the central longitudinal axis AX in the downstream direction and apply a downstream load against the first seat 30 in reaction to the upstream load or applied pressure, the downstream load increasing sealing contact stress between the ball member 16 and the first seat 30, and (ii) the second seat carrier 42 and the second seat 32 are configured to move along the central longitudinal axis AX in the downstream direction and apply an additional downstream load against the ball member 16 in reaction to the upstream load or applied pressure, the additional downstream load increasing sealing contact stress between the ball member 16 and the second seat 32 and between the ball member 16 and the first seat 30.

Due to the additional load that the seat carriers 40, 42 can apply to the downstream seal, the required preload on the seats 30, 32 is reduced. Since the preload on the seats 30, 32 is reduced, the tendency for the seats 30, 32 to creep over time is minimized or eliminated. This can be especially realized on valve assemblies utilizing deflecting seats instead of crush seats. By minimizing seat 30, 32 creep, the need to adjust the seal retainer 50 is also minimized or eliminated. This allows the valve assembly 10 to be designed such that the seal retainer 50 can be installed against a hard stop (e.g., wall 46), or is installed to a set position (e.g., along threads 8). This can significantly improve manufacturability and serviceability of the valve assembly 10.

Moreover, since the preload on the seats 30, 32 can be reduced, this thereby reduces stem torque, which thereby facilitates easier and more user-friendly operation of assembly 10.

Additionally, with the seal retainer 50 designed to be located at a single position (e.g., non-adjustable), the valve assembly 10 can be designed to have the ball 16 centered in relation to the stem 20 (e.g., axis C) when in the open position (FIG. 16). This allows the valve assembly 10 to operate more smoothly and substantially eliminates the "camming" action that can result from a ball 16 that is forced off-center. This effect can be further enhanced by designing the seat carriers 40, 42 such that, when the valve 10 is open, they do not apply additional load to the ball 16.

In addition to the significant benefits that the floating seat carriers 40, 42 provide for maintaining and improving upstream and downstream seals, the floating seat carriers 40, 42 also provide for a means of relieving cavity pressure. In a closed valve with both upstream and downstream seals, cavity pressure can potentially increase to a level greater than upstream or downstream pressure. There can be several causes for this phenomenon, but some common causes are temperature changes and chemical reactions inside the valve cavity. When cavity pressure increases, it is important that the valve assembly 10 have a means of relieving this pressure past the seats 30, 32. If the valve remains sealed at the upstream and downstream seats 30, 32, and does not relieve the pressure, there is the potential for the cavity pressure to cause the valve 10 to suffer catastrophic failure. By utilizing floating seat carriers 40, 42, an increase in cavity pressure changes the loading on the upstream seat carrier (and, therefore, the upstream seat). By manipulating the pressure areas on the seat carrier 40, 42, the valve 10 can be designed to relieve body cavity pressure upstream when cavity pressure is equal to, greater than, or even less than upstream line pressure.

Exemplary ball valve assembly 10 also offers several improvements to the user interface. One notable improvement can result from the addition of the lock plate 80. Exemplary lock plate 80 is configured to provide a means of locking the valve assembly 10 (e.g., ball 16) in position. Lock plate 80 can also be configured to provide a means of indicating the position of the ball 16 of valve assembly 10 (e.g., Open or Closed). Lock plate can also be configured to provide a means of coupling the handle 90 to the stem 20.

Figure 14:
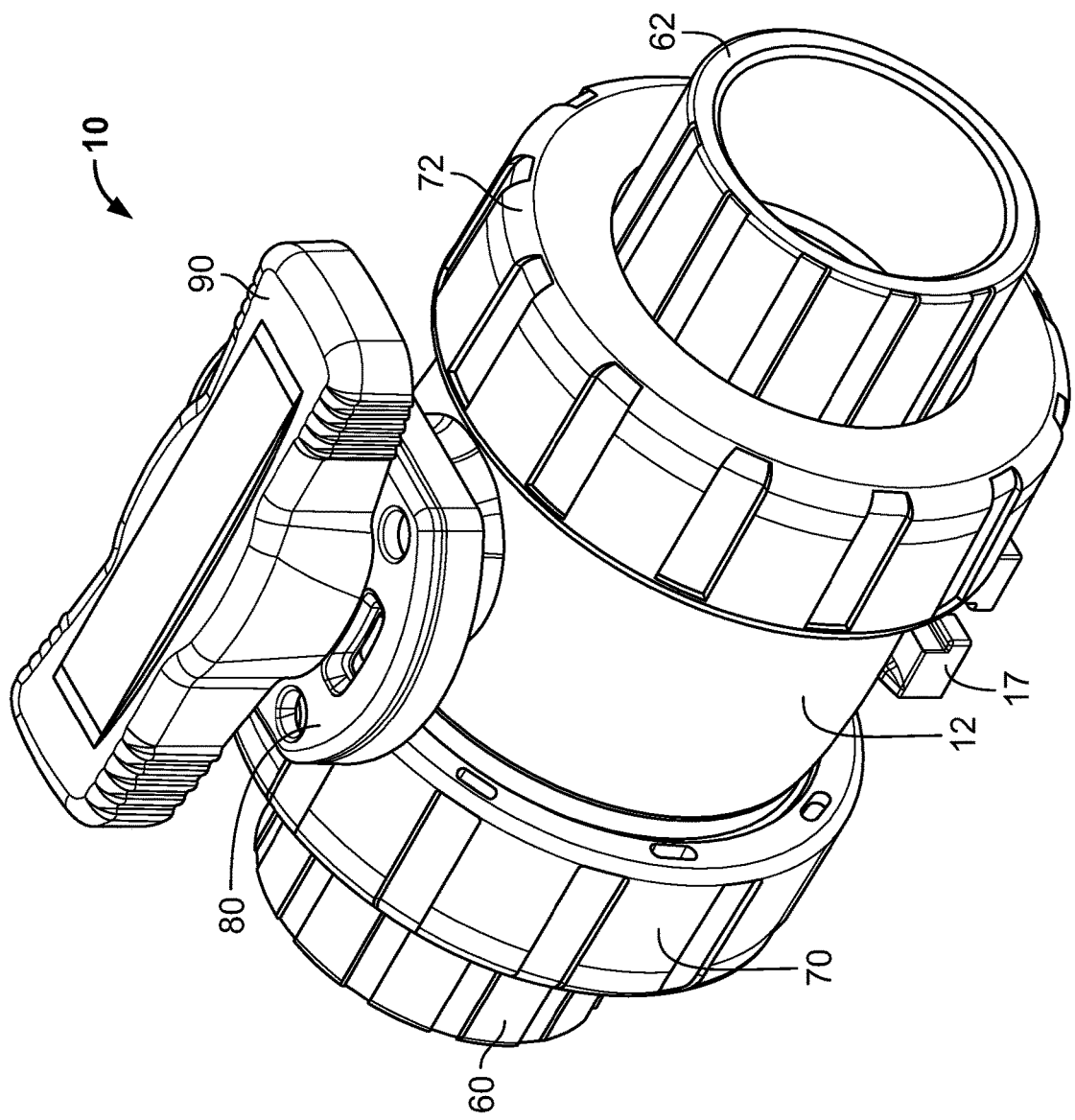
FIGS. 14 and 14A are side perspective views of the ball valve assembly of FIG. 12, after assembly.
Figure 14A:
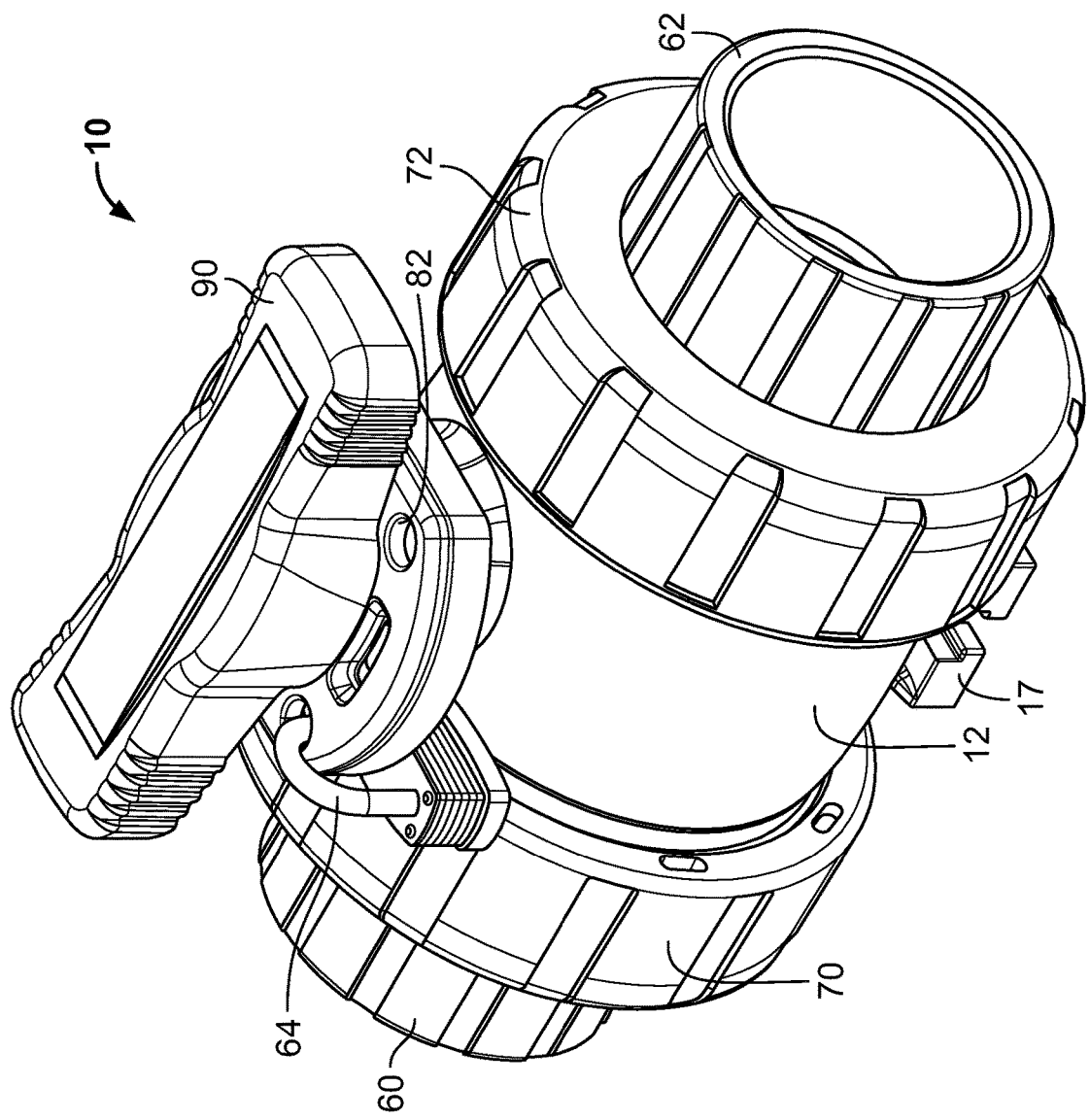
Figure 19:
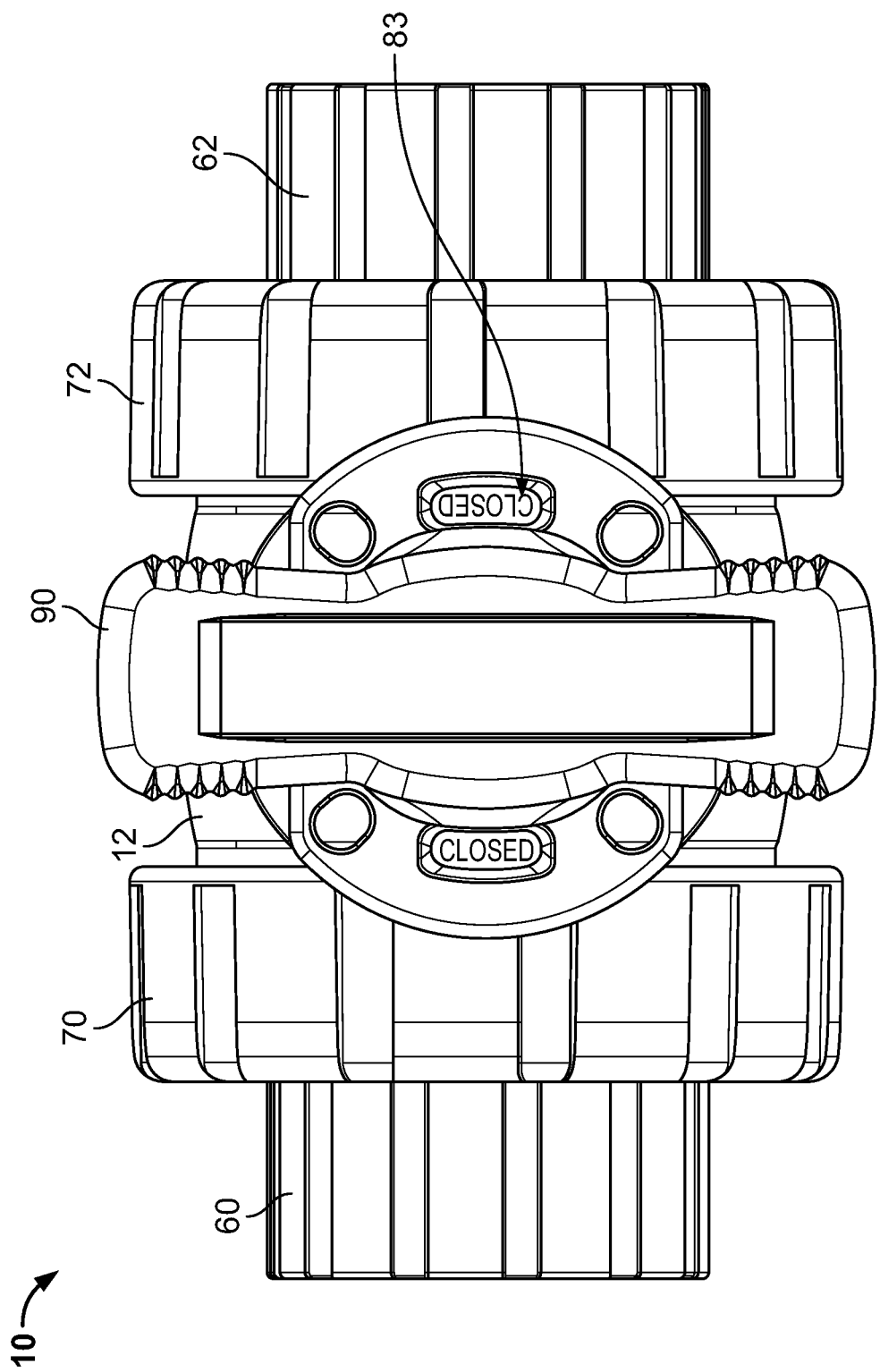
FIG. 19 is another top view of the ball valve assembly of FIG. 12.
Figure 27:
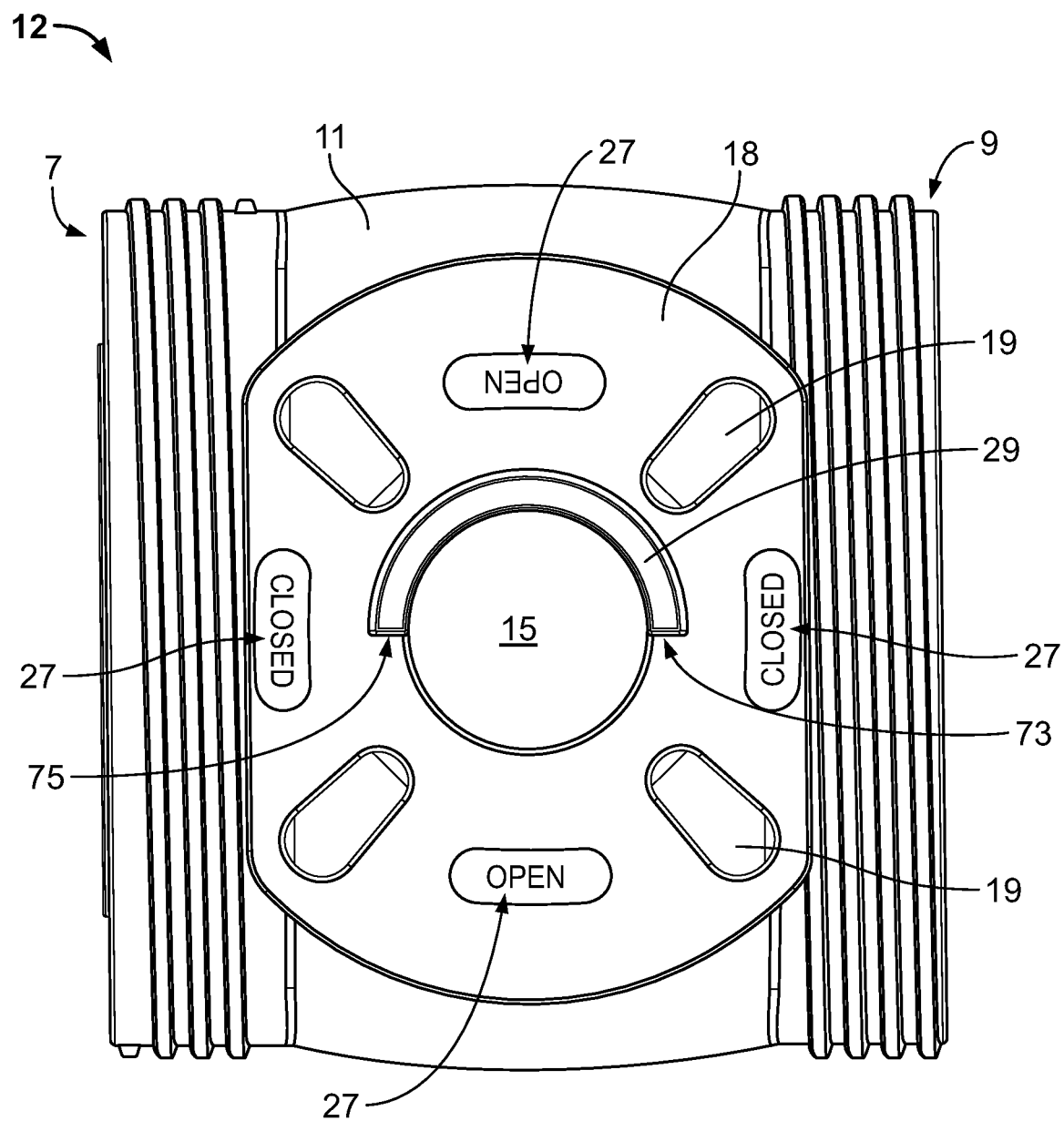
FIG. 27 is a top view of the body member of FIG. 21.
Figure 29:
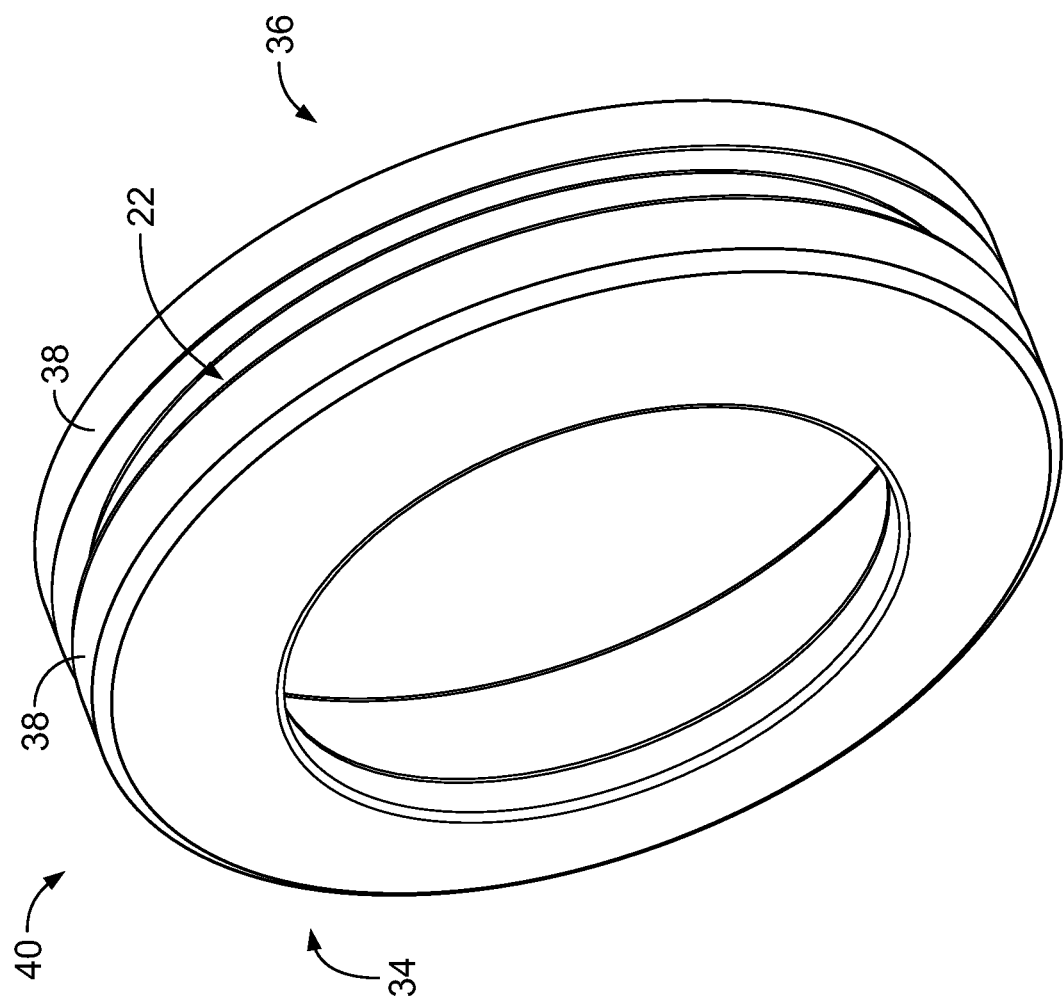
FIG. 29 is a side perspective view of the first seat carrier of FIG. 28.

In exemplary embodiments and as shown in FIGS. 14A and 44-47, the lock plate 80 is configured to provide a means of locking the ball 16 of valve assembly 10 via holes 82 (e.g., four holes 82) therethrough. Holes 82 can run parallel (or other suitable direction) to the axis C of the stem 20. As the valve assembly 10 is rotated to a fully open position (FIGS. 15 and 16) or fully closed position (FIGS. 19 and 20A/20B), these holes 82 are configured to align with a respective hole or aperture 19 in the top flange 18 of the valve body 12 (FIGS. 14A, 19 and 27). When in these positions (e.g., fully open or fully closed) and as shown in FIG. 14A, a padlock or hasp 64 can be installed through the aligned holes 82 of lock plate 80 and the holes 19 of body 12 to prevent the lock plate 80 from rotating. Since the lock plate 80 engages the stem 20 (which engages the ball 16), the lock plate 80 can effectively lock the ball 16 of valve assembly 10 in position. The fit or engagement between the lock plate 80 and the stem 20, and the fit or engagement between the lock plate 80 and stem bore 15 of the body 12 can be tight enough to prevent the lock plate 80 from being removed when a lock or hasp 64 is installed. When no lock 64 is installed, the lock plate 80 can be pulled directly away from the top of the valve body 12, with a minimum of rotation, in order to be removed. When a lock/hasp 64 is installed, the lock/hasp 64 acts as a hinge, forcing the lock plate 80 to attempt to rotate, and thus preventing removal of the lock plate 80 thereby preventing operation of the valve assembly 10.

Holes 82 can be provided on plate 80 in an industry standard bolt pattern, or other suitable bolt patterns or the like. Holes 82 can take a variety of suitable shapes/forms (e.g., round, oblong, square, etc.). Holes 82 can be provided in various different/differing sizes to accommodate different lock 64 sizes/shapes. Plate 80 can include multiple hole 82 locations for locking the valve 10 (e.g., ball 16) in intermediate positions (e.g., between fully open and fully closed). In some embodiments, plate 80/holes 82 could be configured to only lock in one position (e.g., only fully closed or only fully open).

In other embodiments, it is noted that lock 64 could be mounted through a hole in the neck 13 of body 12, thereby engaging the stem 20, handle 90 and/or an alternate piece/component, thereby preventing rotation of the stem 20/ball 16.

Figure 15:
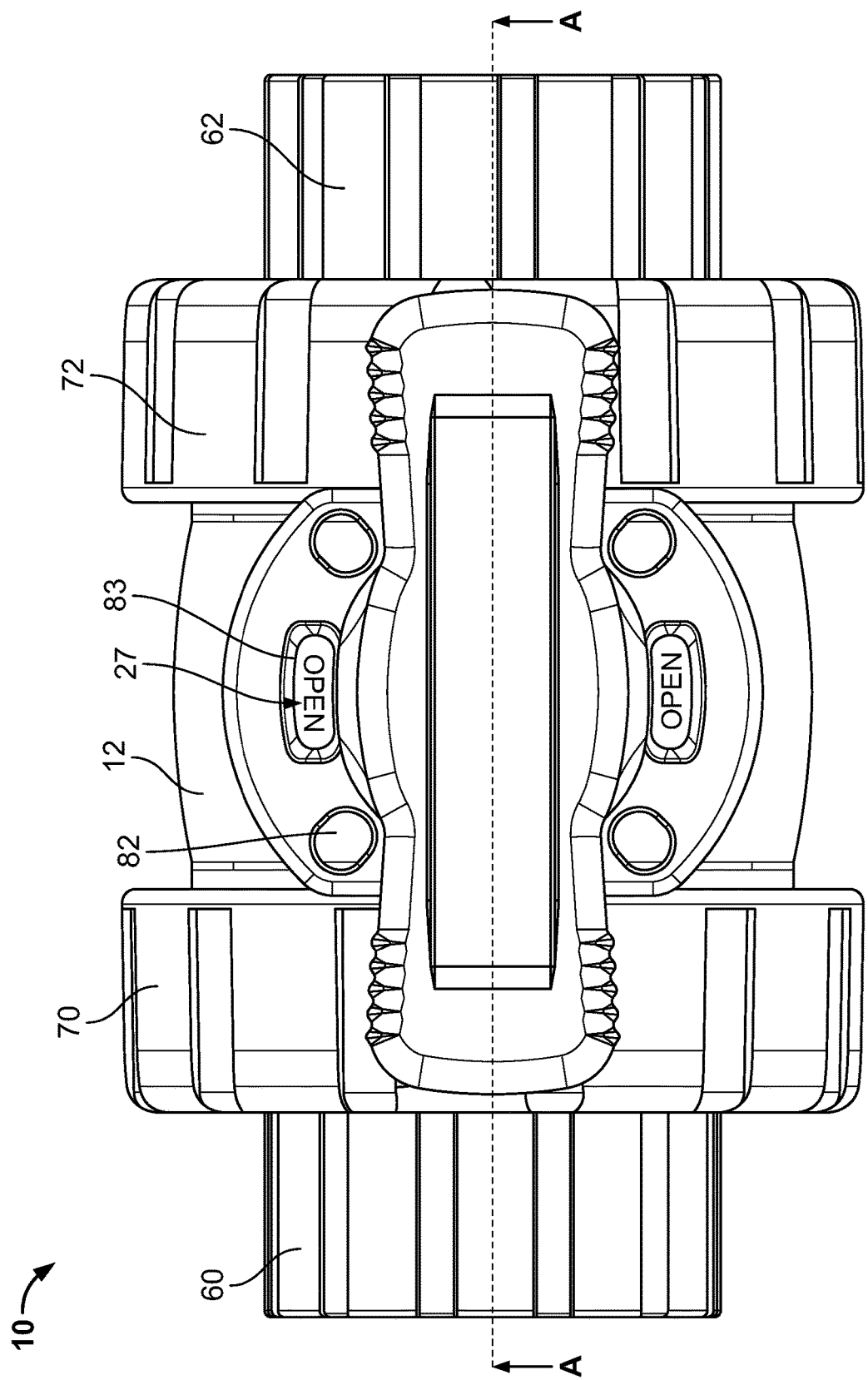
FIG. 15 is a top view of the ball valve assembly of FIG. 14.

As depicted in FIGS. 15, 19 and 44-47, exemplary lock plate 80 can provide a means of position indication of ball 16 by means of the two slots or windows 83 that are positioned therethrough in the face portion of lock plate 80. When the ball 16 of valve assembly 10 is in the fully open position (FIG. 15) or the fully closed position (FIG. 19), these windows 83 expose text 27 or the like that is on the mounting flange 18 of the valve body 12 (FIGS. 15, 19 and 27). This text 27 can indicate that the valve assembly 10 is "Open" or "Closed." This feature can be especially valuable on valve assemblies 10 that have had the handle 90 removed, as the handle 90 can be used to indicate valve position. Text 27 or other indicators (e.g., position indication markings) can provide degrees, percent open, or other variant between open and closed. Windows 83 can be fully cut out of plate 80 (e.g., windows 83 could have three or less sides, instead of four sides).

Figure 46:
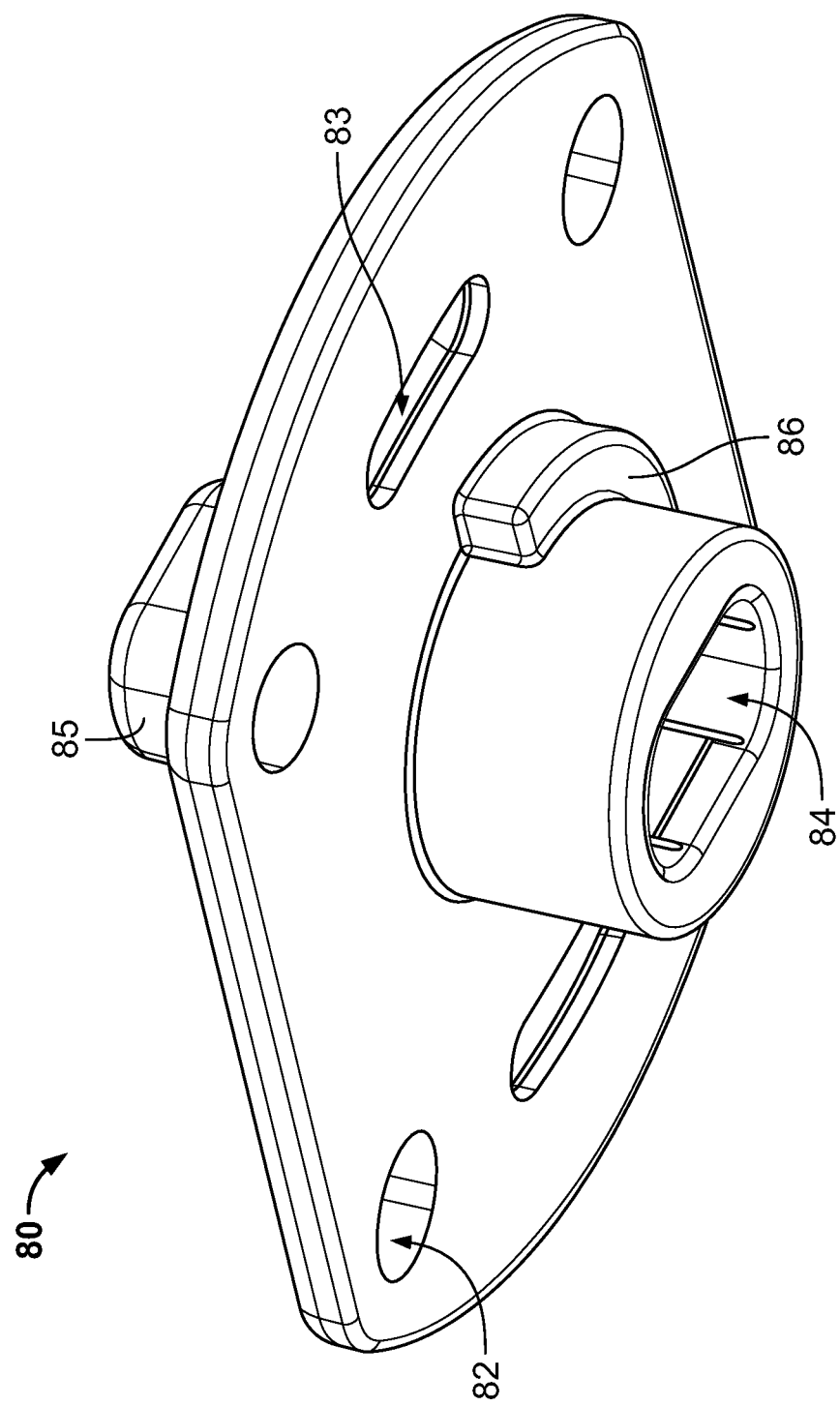
FIG. 46 is a bottom perspective view of the lock plate of FIG. 43.
Figure 47:
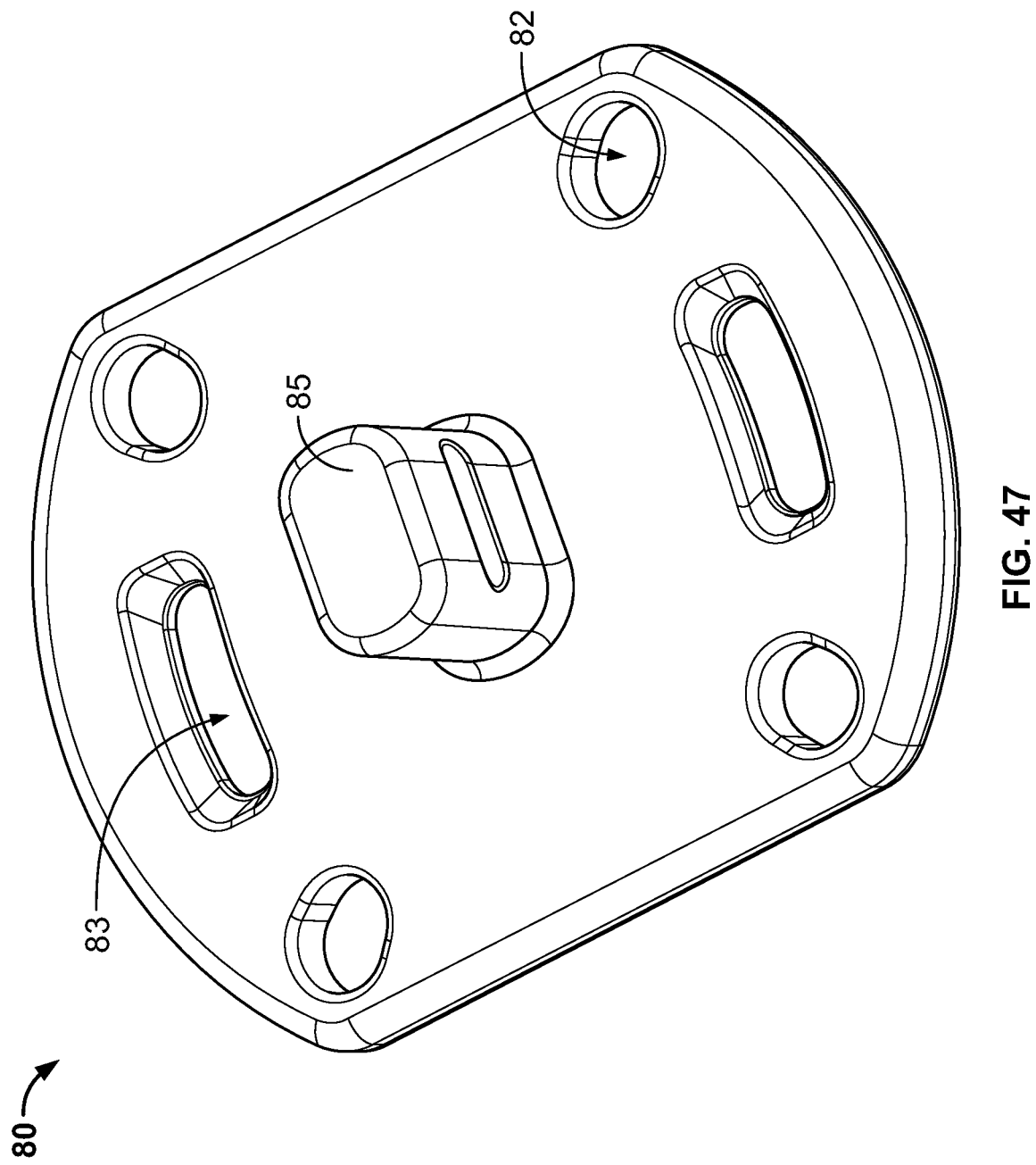
FIG. 47 is a top perspective view of the lock plate of FIG. 43.
Figure 48:
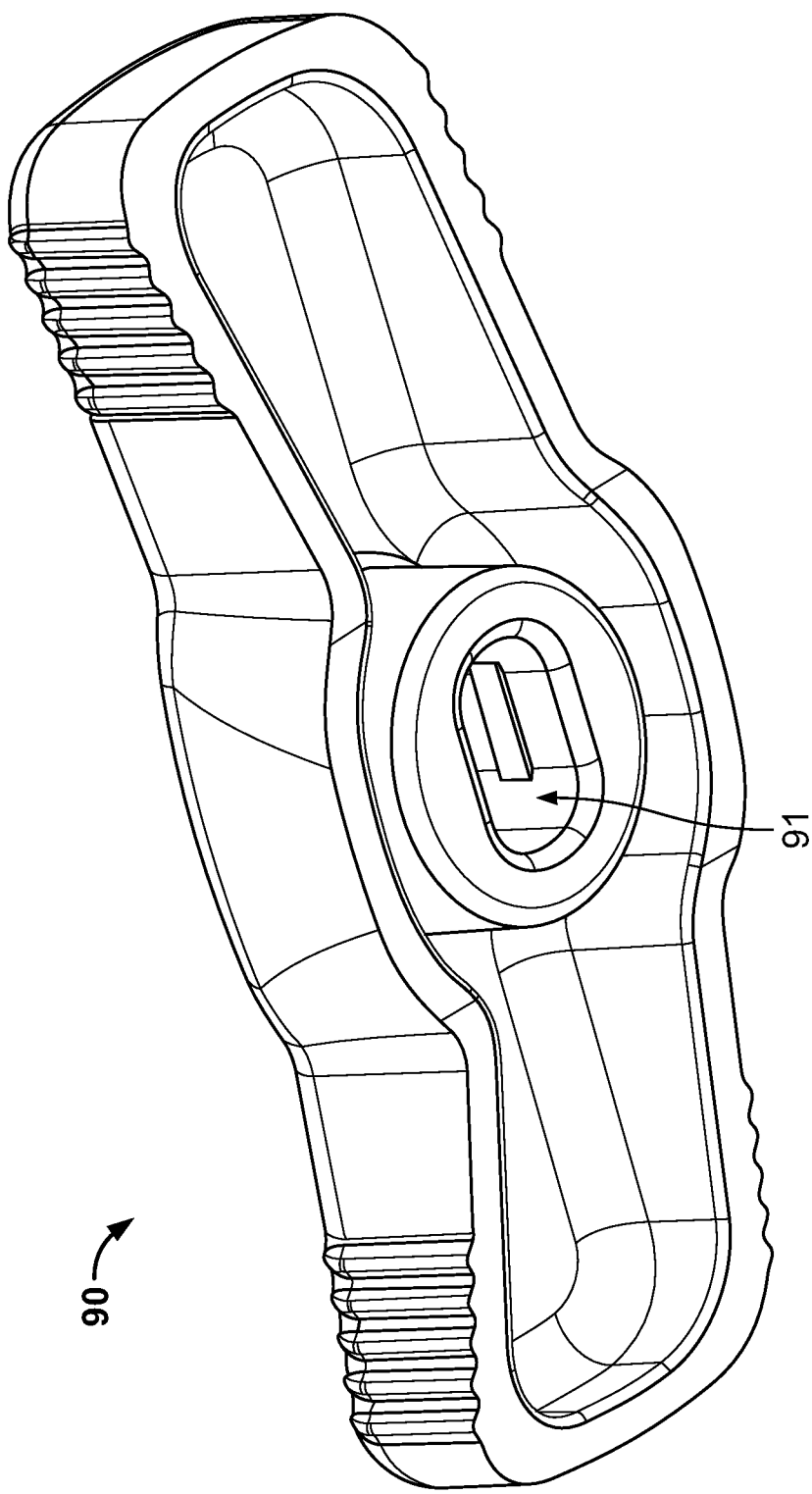
FIG. 48 is a bottom perspective view of an exemplary handle of the assembly of FIG. 12.

As shown in FIGS. 16, 46 and 48, the lock plate 80 can be configured to provide a means of coupling the handle 90 to the stem 20 via a female socket 84 on the bottom of the plate 80 which couples to stem 20 (e.g., via a snap-fit connection), and via the engagement protrusion 85 on top of the plate 80 which couples to socket 91 of handle 90 (e.g., via a snap-fit connection).

In certain embodiments and as depicted in FIGS. 45-46, the bottom surface of plate 80 (e.g., the external surface of female socket 84) can include an abutment protrusion 86 (e.g., an abutment protrusion 86 that encompasses or extends a 90° quadrant around socket 84). Exemplary abutment protrusion extends from a first end 87 to a second end 89.

As depicted in FIG. 27, the engagement protrusion 86 can be configured to engage and/or be positioned within a mating groove 29 or the like in mounting flange 18 proximal to bore 15 (e.g., with the groove 29 in flange 18 encompassing or extending 180° in flange 18). Exemplary groove extends from a first wall 73 to a second wall 75.

When protrusion 86 is positioned in groove 29 (e.g., when plate 80 is mounted to flange 18 of body 12), the plate 80 (and handle 90, stem 20 and ball 16) can be rotated (e.g., 90°) from a first position where the first end 87 of protrusion 86 abuts against first wall 73 of groove 29 (e.g., a fully closed position for ball 16) to a second position where the second end 89 of protrusion 86 abuts against second wall 75 of groove 29 (e.g., a fully open position for ball 16). As such, protrusion 86 of plate 80 and groove 29 of flange 18 advantageously provide hard stops at the full open and the full closed positions of ball 16.

In other embodiments, it is noted that lock plate 80 could be integrated to handle 90. In other embodiments, there could be other combinations of engaging geometries or the like between plate 80 and handle 90.

It is noted that having a component (e.g., plate 80), separate from the handle 90 and stem 20, to couple the handle 90 and stem 20 can be advantageous for several reasons. For example, such a coupling between the handle 90 and stem 20 is desirable in that some end users may remove handles 90 from valves 10 that are not locked in position in order to deter operation of the valve 10. This can be common of locations with potential for public access as well as applications where valve operation is undesirable, but does not create a safety hazard. Among end users who remove handles from valves, roughly half prefer for the stem to be exposed (allowing for relatively easy valve operation with a wrench) and the other half prefer for the stem to be recessed inside the valve (thus making operation with a wrench more difficult). By utilizing a lock plate 80 with an integral coupling, both preferences can be served (e.g., the former can remove just the handle 90, the latter can remove the handle 90 and lock plate 80).

Another reason such coupling between the handle 90 and stem 20 is desirable is to allow for actuators to be mounted directly to the mounting flange 18 on the valve body 12. Some standards for stem engagement (that some actuators are designed around) were written with the intent that the valve stem would be manufactured from metal. As such, attempting to mate directly to the actuator with a plastic stem may result in a stem too weak to handle the applied load. By recessing the stem 20, a metal coupling can be made to adapt the plastic stem (and its larger cross section) to the relatively small bore of the actuator. Since exemplary stem 20 is recessed, the bulk of the coupling can fit inside of the stem bore 15 of the body 12 (on top of and around the stem 20), thus allowing a standard actuator to be mounted directly to the valve body 12.

Another reason such a coupling between the handle 90 and stem 20 is desirable is to simplify valve assembly. During assembly, the stem 20 can be inserted into the main bore 14 of the valve body 12, then rotated and pressed into the stem bore 15. As the stem 20 length increases relative to the bore 14 of the body 12, this operation becomes more difficult and the likelihood of damaging a seal in the process is increased. Using a coupling (e.g., plate 80) between the stem 20 and the handle 90 allows the stem 20 length to be minimized.

The exemplary ball valve assembly 10 provides many advantages. One advantage includes improved sealing due to increased load area for differential pressure to act on. Another advantage includes the upstream seal provides a secondary seal if the downstream seal becomes damaged. Another advantage includes the exemplary seat carriers 40, 42 are "self-centering"—e.g., the ball 16 and seats 30, 32 return to naturally centered position when the ball 16 is in the closed position. Another advantage includes, in some embodiments, driving the seal retainer 50 to a hard stop simplifies manufacturing as well as rebuilding in the field. Another advantage includes the deflecting seats 30, 32 allow for considerably larger manufacturing windows than crush seats used on some plastic valves.

Another advantage includes the configuration/design of assembly 10 does not trap cavity pressure. This is a result of floating seat carriers 40, 42 being forced away from the ball 16 when cavity pressure exists, and seats 30, 32 being designed to deflect off the ball 16 under differential load created by cavity pressure.

Another advantage includes the exemplary lockout (e.g., plate 80) cannot be removed from the valve assembly 10 (without destruction) when the valve assembly 10 is locked-out. Another advantage includes the exemplary removable lockout 80 allows exposed or recessed flats for customers who remove the handle 90 as a deterrent to valve assembly 10 operation. Another advantage includes the exemplary recessed stem 20 and bolt pattern flange 18 allow for a direct mount of an actuator to valve assembly 10 (e.g., with use of intermediate coupling). Another advantage includes the windows 83 in the lock plate 80 provide clear indication of valve position (e.g., via text 27), even when the handle 90 is removed.

Figure 49:
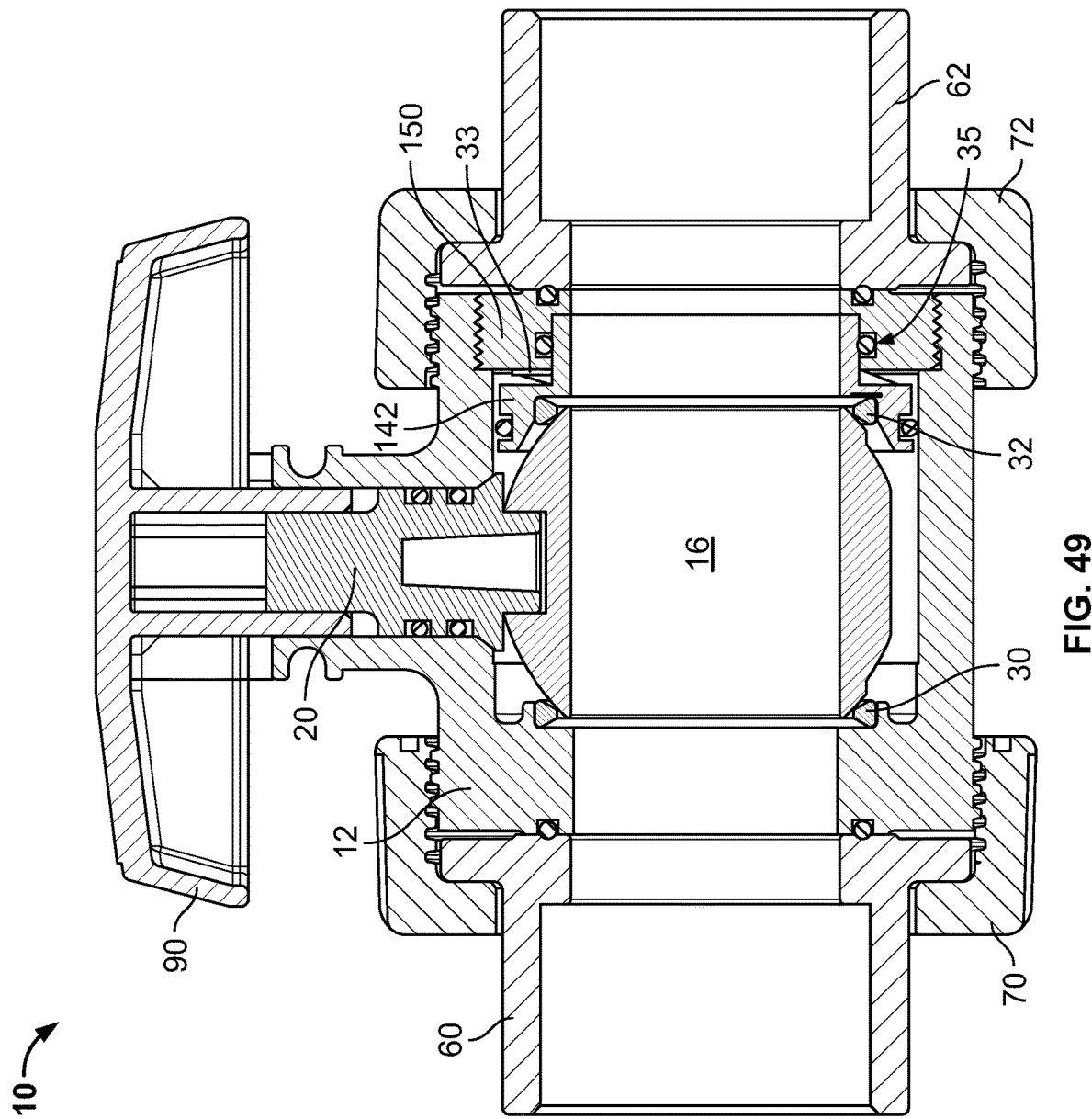
FIG. 49 is a cross-sectional side view of another exemplary ball valve assembly of the present disclosure.
Figure 51:
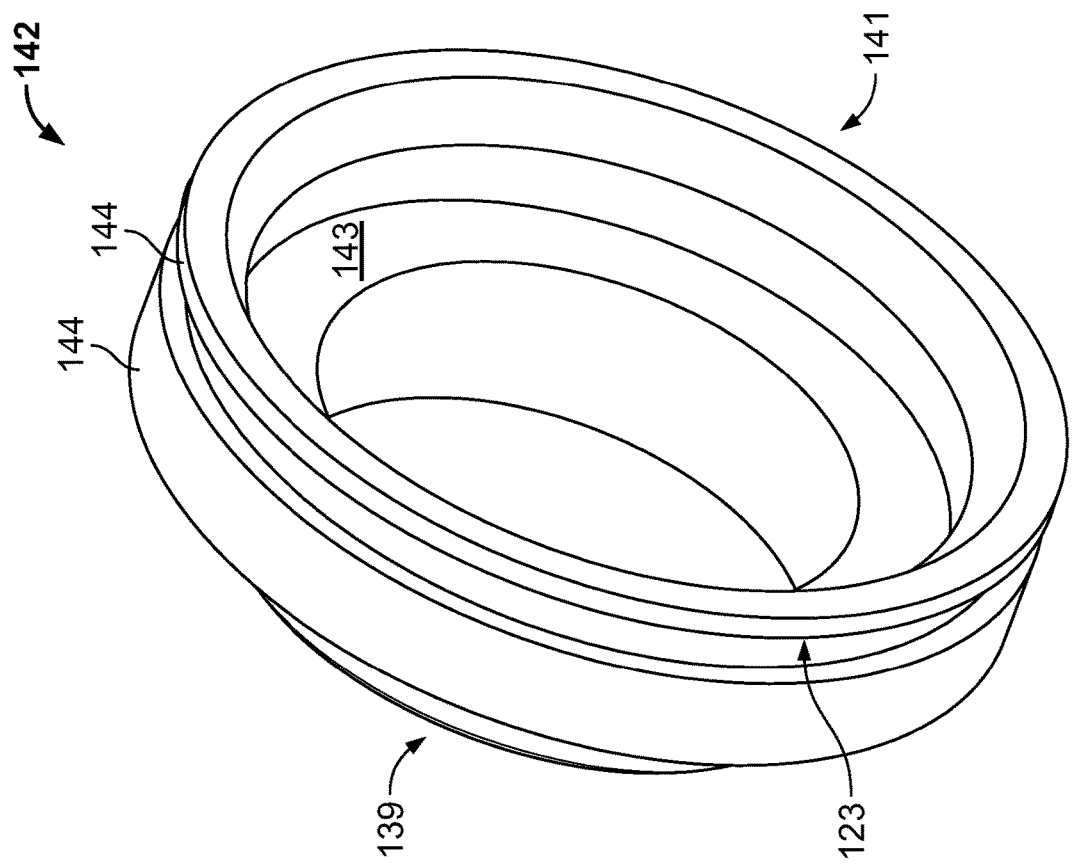
FIG. 51 is a side perspective view of the second seat carrier of FIG. 50.
Figure 50:
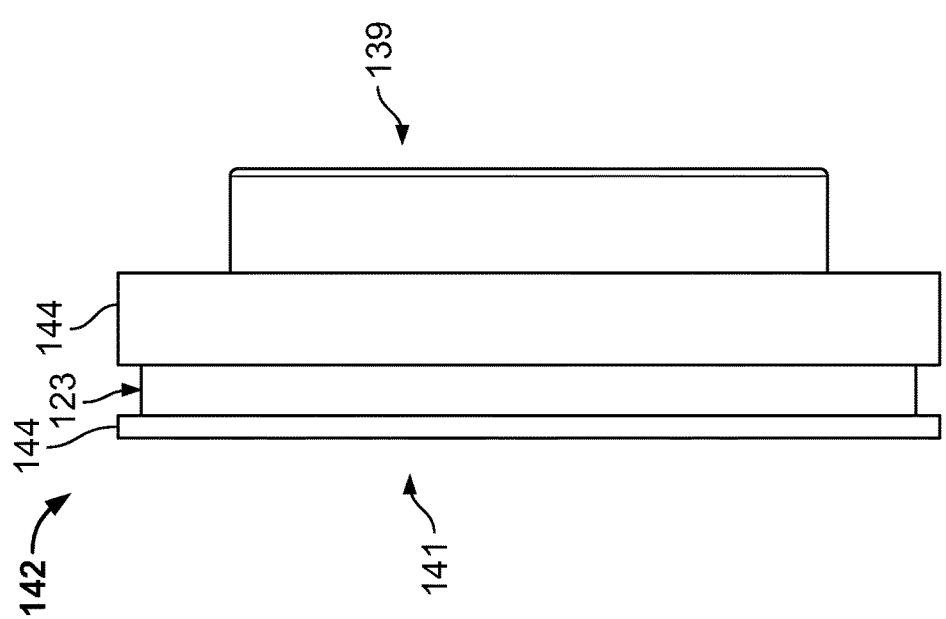
FIG. 50 is a side view of another exemplary second seat carrier.
Figure 53:
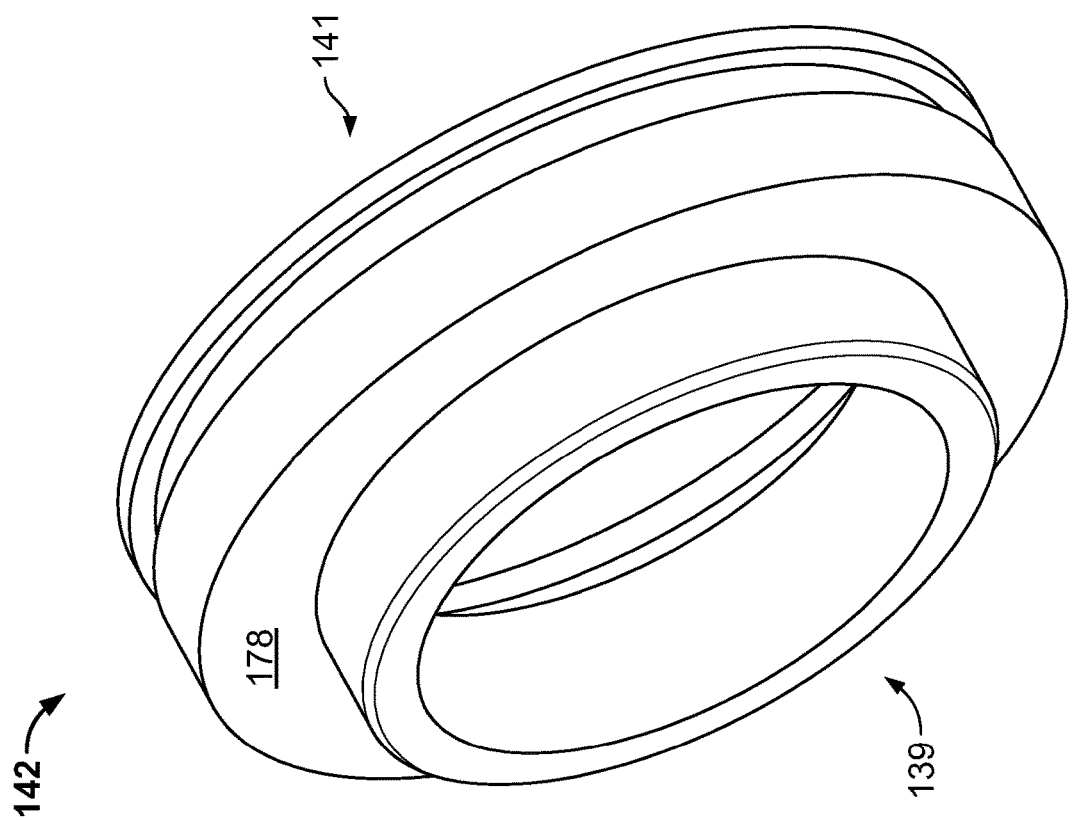
FIG. 53 is a side perspective view of the second seat carrier of FIG. 50.
Figure 52:
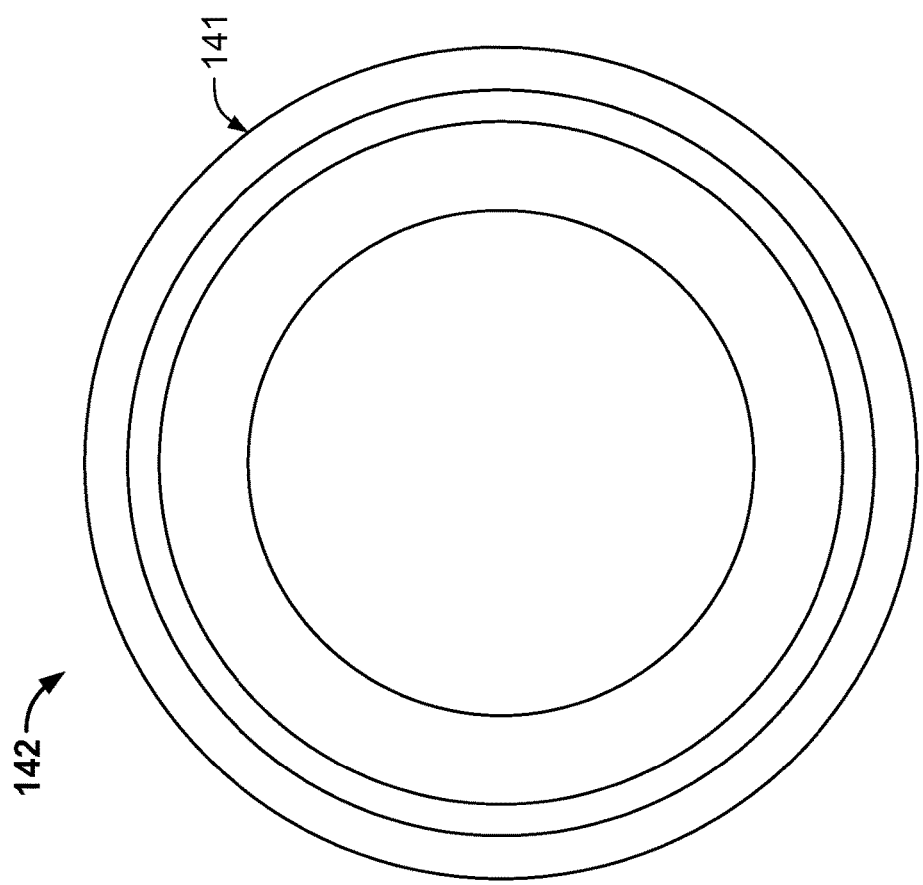
FIG. 52 is a side view of the second seat carrier of FIG. 50.
Figure 55:
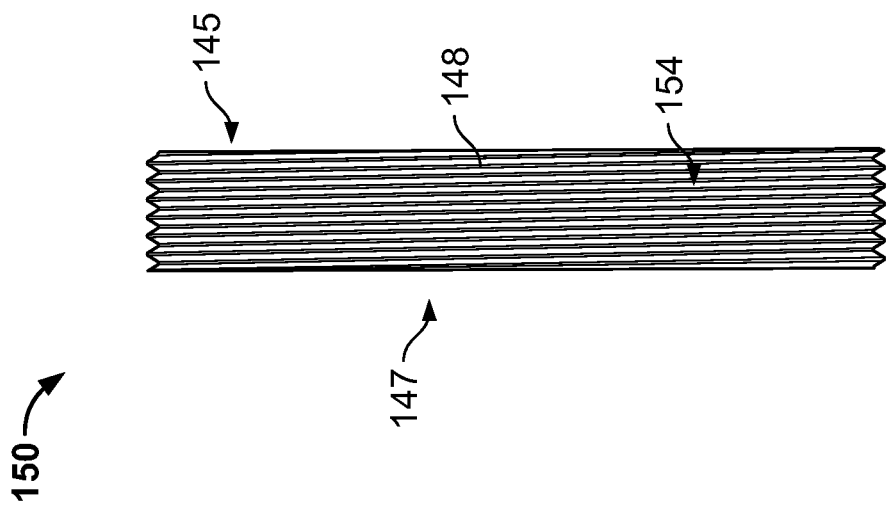
FIG. 55 is a side view of another exemplary seal retainer.
Figure 54:
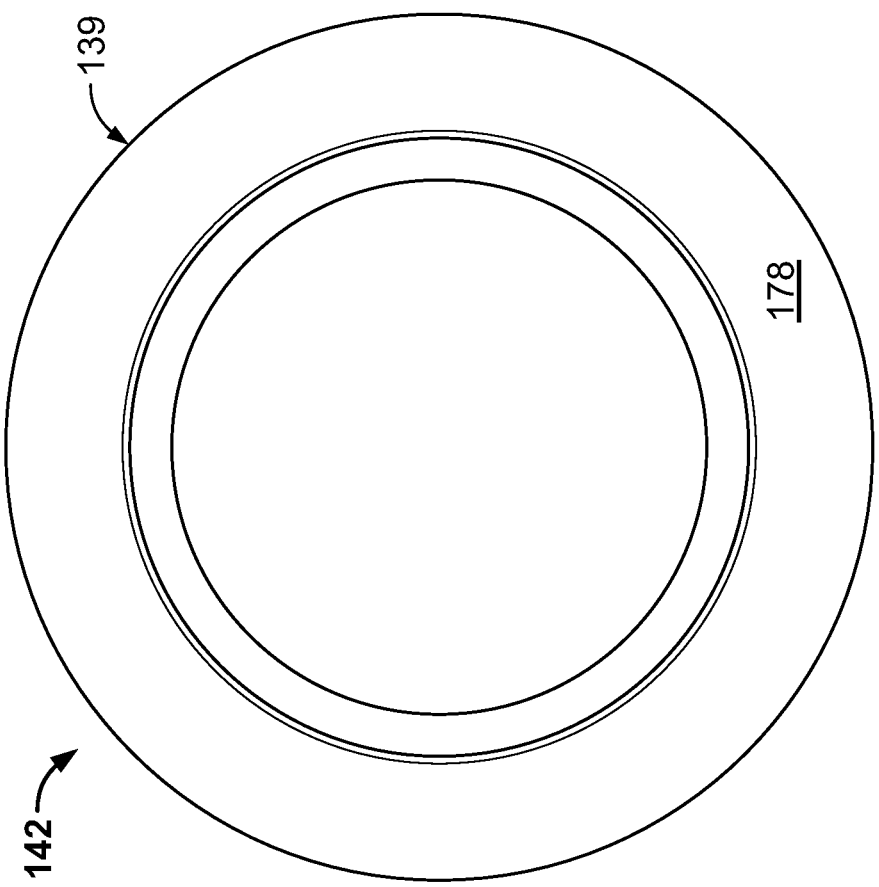
FIG. 54 is a side view of the second seat carrier of FIG. 50.
Figure 57:
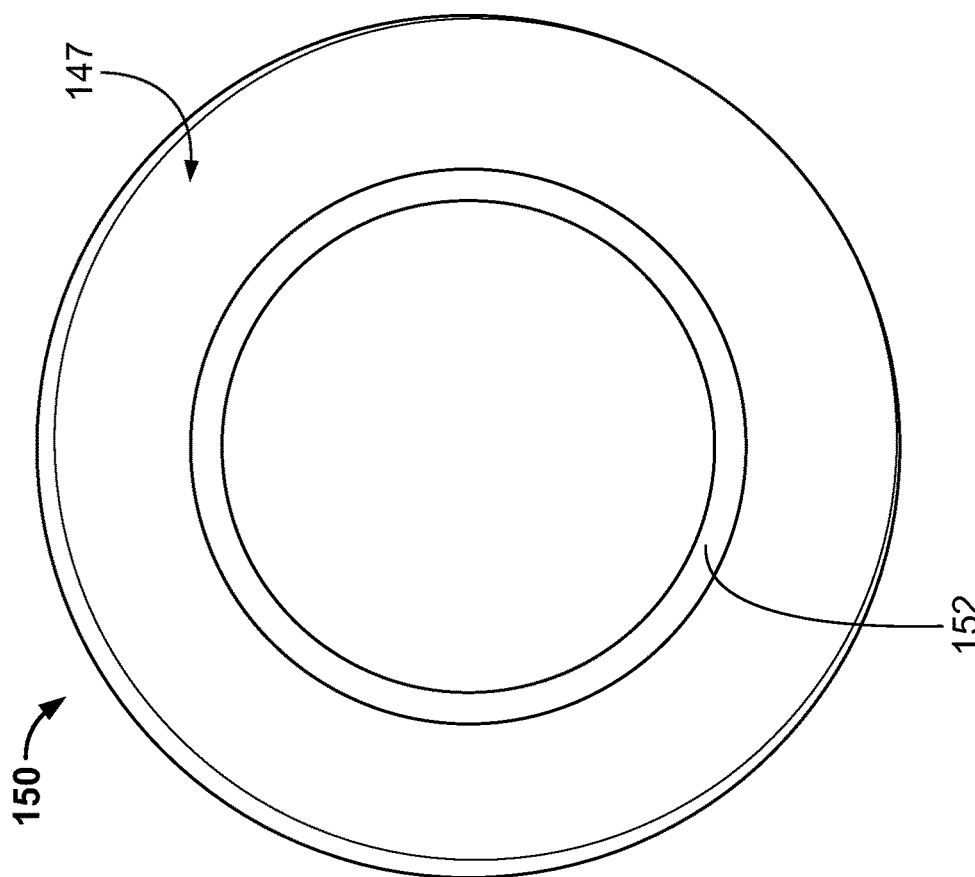
FIG. 57 is a side view of the seal retainer of FIG. 55.
Figure 56:
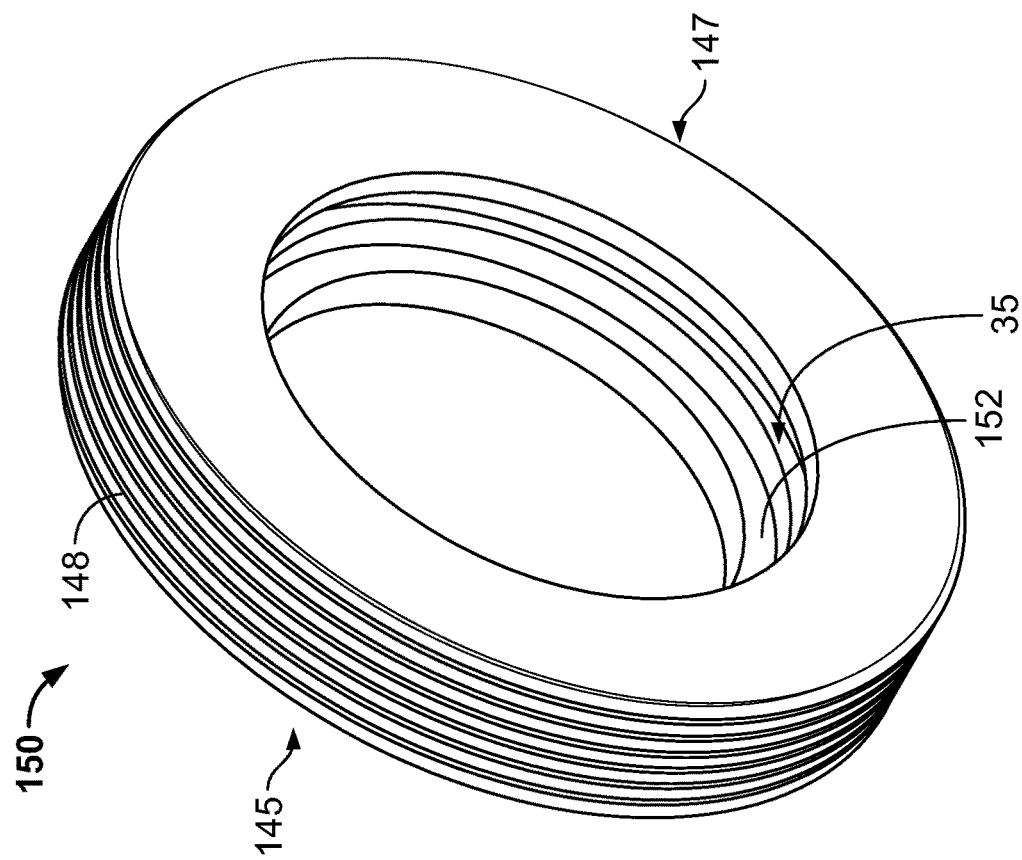
FIG. 56 is a side perspective view of the seal retainer of FIG. 55.
Figure 59:
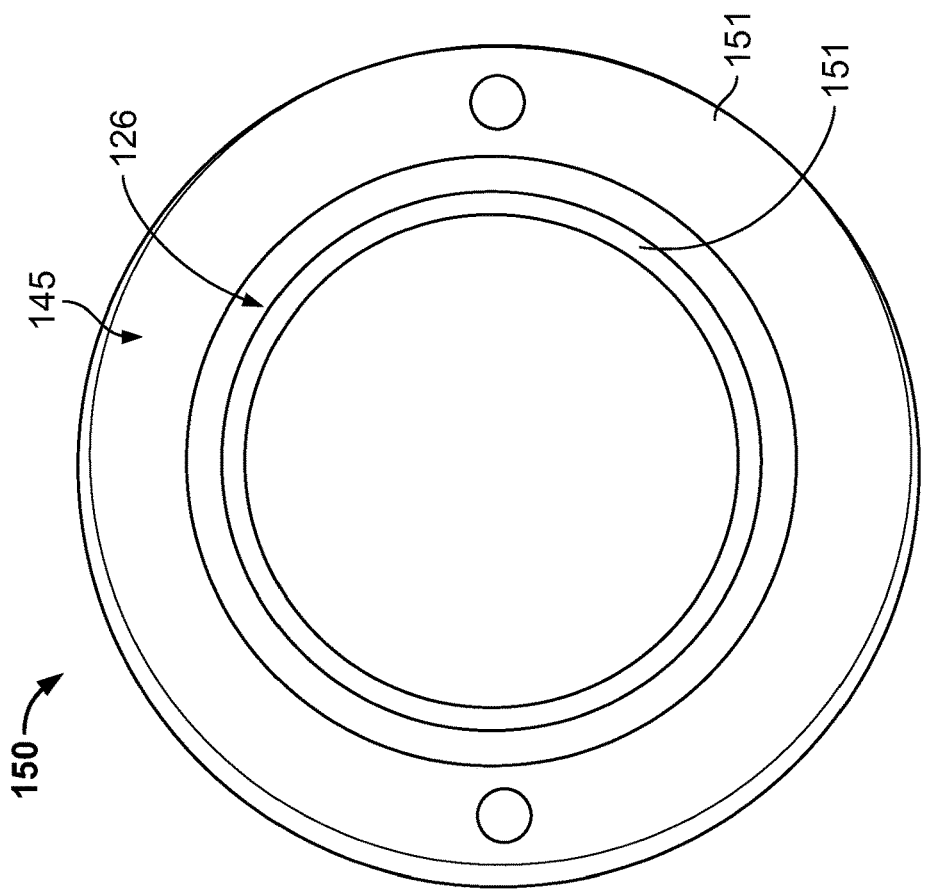
FIG. 59 is a side view of the seal retainer of FIG. 55.
Figure 58:
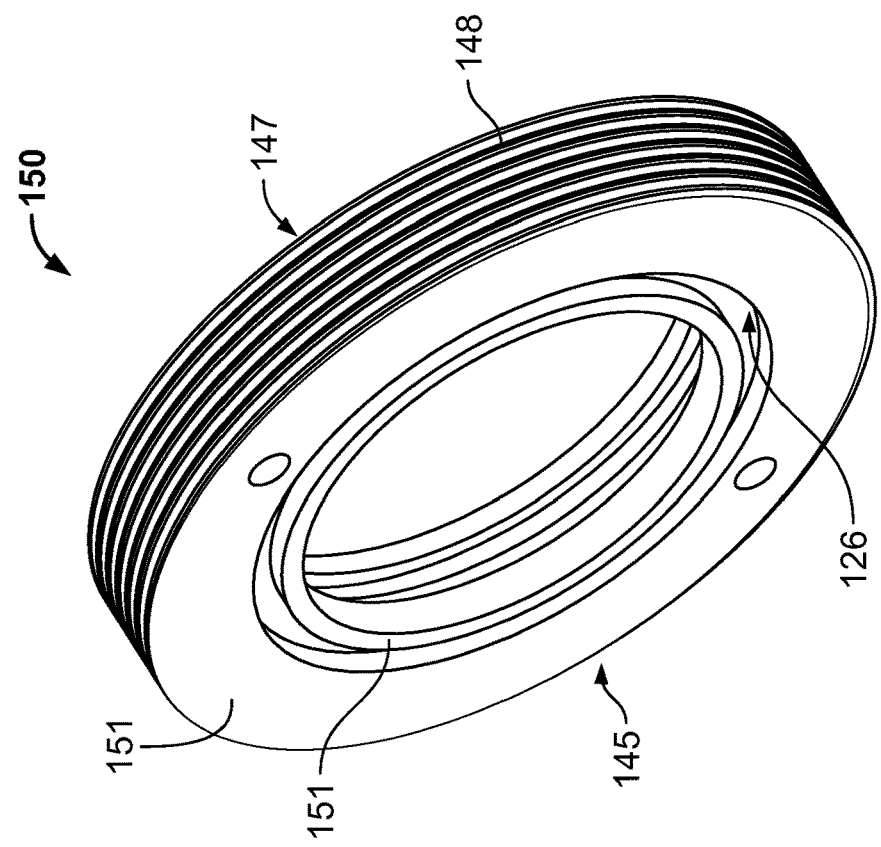
FIG. 58 is a side perspective view of the seal retainer of FIG. 55.

In other embodiments, first seat carrier 40 and/or second seat carrier 42 can be a spring-loaded carrier 40, 42. FIG. 49 depicts second seat carrier 142 being a spring-loaded carrier 142, via spring 33 positioned between carrier 142 and seal retainer 150. For example, such springs 33 can be metallic, plastic or rubber (e.g., O-ring). Such springs 33 can be wetted or non-wetted. Such springs 33 can be integral to seat carrier 40, 42 and/or 142 (e.g., thereby providing a flexing carrier 40, 42 and/or 142). In some embodiments, a spring 33 can be positioned between the first seat carrier 40 and the body member 12 (and/or with spring 33 positioned between carrier 142 and seal retainer 150).

The compression generated on the spring(s) 33 during fabrication of the ball valve assembly 10 can perform several functions. For example, such compression can be used to generate pre-load on the seats (30, 32) to create an initial seal with ball member 16, and/or it can assist in motivating the upstream seat carrier (40, 42) to move downstream when the ball member 16 is closed, and/or it can be used to enhance the centering of the ball member 16 within the valve assembly 10 in the open position. The valve assembly 10 and spring(s) 33 can be sized such that the spring(s) 33 are substantially fully compressed during assembly, or such that they are allowed to compress further during operation of the valve assembly 10.

FIG. 49 also shows seal retainer 150 including groove 35 for gasketing material 28 to form an alternative seal with seat carrier 142.

As shown in FIGS. 49-54, exemplary second seat carrier 142 is substantially cylindrical with a through hole, and extends from an outer end 139 to an inner end 141. Second seat carrier 142 is configured to house and retain the second seat member 32, and provides a seal to the body member 12, and also provides a seal to the seal retainer 150 (thus preventing bypass between the body 12 and the seal retainer 150). Second seat carrier 142 includes an inner wall 143 configured to house, engage and/or abut against the outer end of seat 32 to house and retain the second seat member 32 within carrier 142.

Second seat carrier 142 is sealed on its OD or outer surface 144 via gasketing material 28 (e.g., O-rings 28) positioned within groove 123, with the O-ring 28 providing a piston seal against the ID or inner surface 3 of body 12, as similarly discussed above in connection with carrier 42.

As similarly discussed above and as dictated by differential pressure, second seat carrier 142 floats or moves downstream, in the direction of Arrow A in FIG. 20A, when ball 16 of the valve assembly 10 is closed (when the direction of Arrow A in FIG. 20A represents the flow direction). In other embodiments and as dictated by differential pressure, second seat carrier 142 floats or moves downstream, in the direction of Arrow B in FIG. 20B, when the ball 16 of valve assembly 10 is closed (when the direction of Arrow B in FIG. 20B represents the flow direction).

As shown in FIGS. 49 and 55-59, seal retainer 150 is substantially circular/cylindrical with a through hole, and extends from an outer end 145 to an inner end 147. Exemplary seal retainer 150 is configured to mount to the second end 9 of the body 12 and to retain the internal components (e.g., ball 16, carrier 142, seat 32) within bore 14 of body 12, as similarly discussed above in connection with retainer 50.

Seal retainer 150 includes inner wall 152 configured to house, engage and/or abut against the outer end 139 of carrier 142 to house and retain at least a portion of the carrier 142 within seal retainer 150. Seal retainer 150 provides a seal to the carrier 142 via gasketing material 28 in groove 35 of retainer 150, thus preventing bypass between the body 12 and the seal retainer 150 (e.g., with O-ring 28 in groove 35 providing a piston seal against outer end 139 of carrier 142).

As similarly discussed above, an engagement surface 63 of end connector 62 engages abutment surface 151 of seal retainer 150, with gasketing material 28 positioned within groove 126 of abutment surface 151 of seal retainer 150, and with the O-ring 28 in groove 126 providing a face seal of engagement surface 63 of end connector 62 against abutment surface 151 of seal retainer 150.

Exemplary seal retainer 150 is threaded with threads 148 on its OD or outer surface 154, with the threads 148 of seal retainer 150 configured to engage threads 8 of body 12 (e.g., until inner end 147 of seal retainer 150 abuts or engages the abutment wall 46 of body 12).

It is noted that the example embodiment provides that the seal retainer 150 can be driven to a hard stop against abutment wall 46, however, it is noted that retainer 150 could remain adjustable. For example, if retainer 150 is desired to be adjustable, retainer 150 could be driven to a predefined location or position along threads 8 between second end 9 and wall 46, or it could be further tightened against wall 46 to create appropriate/desired seat load on seats 30, 32.

As noted above, a spring 33 can be positioned between carrier 142 and seal retainer 150 (e.g., positioned between wall 178 of carrier 142 and inner end 147 of retainer 150). As such, spring 33 can thereby provide a flexing carrier 142.

FIG. 49 also shows seat 30 not including seat carrier 40. Therefore and in some embodiments without seat carrier 40, seat 30 is not configured to float.

Figure 60:
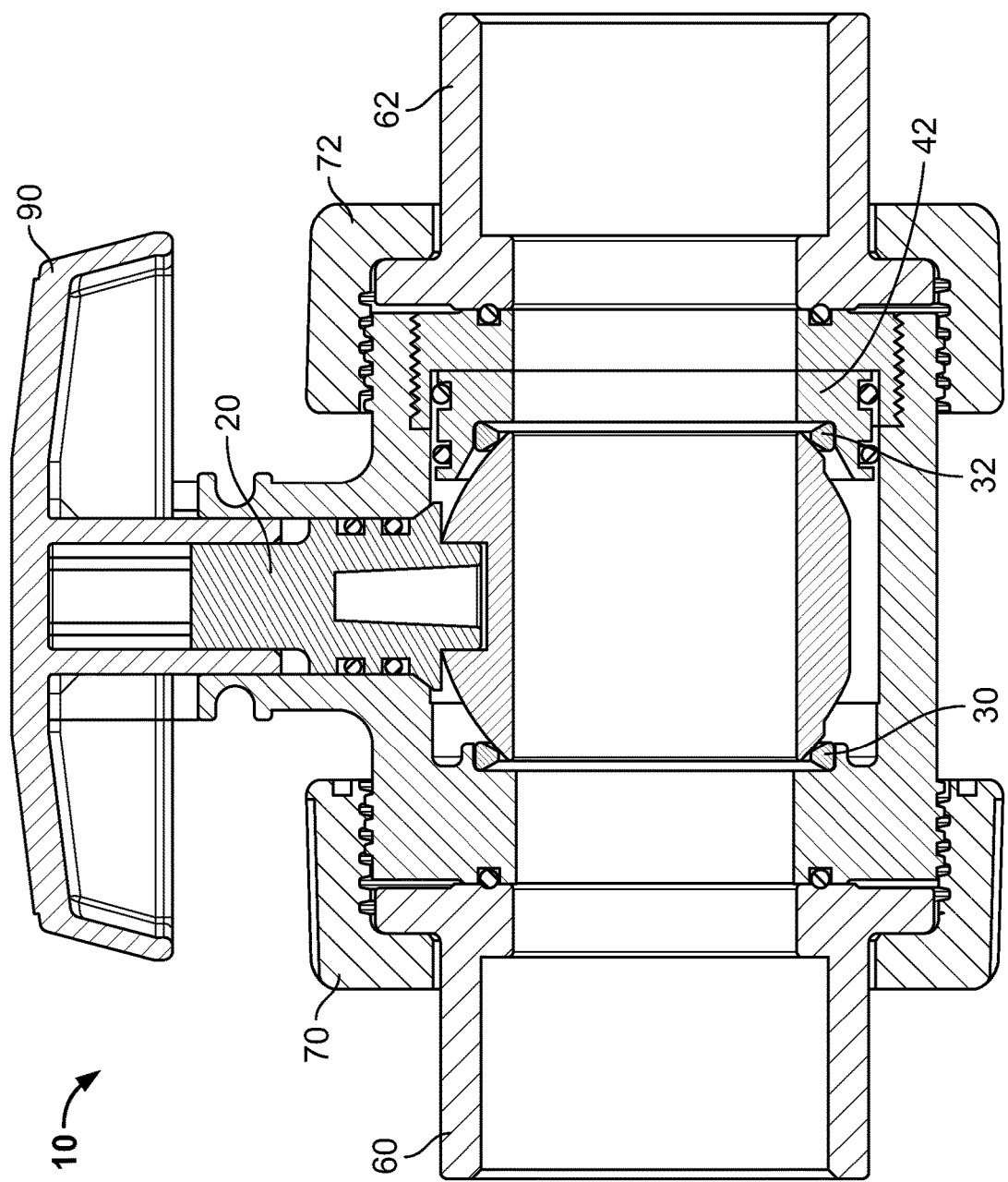
FIG. 60 is a cross-sectional side view of another exemplary ball valve assembly of the present disclosure.

FIG. 60 shows assembly 10 with seat 30 not including seat carrier 40 (e.g., seat 30 is not configured to float/move), and assembly 10 includes seat 32 and seat carrier 42. In other embodiments, it is noted that seat carrier 40 could take the form/shape of seat carrier 42 or 142 (and include retainer 50, 150), and seat 32 could or could not include carrier 42, 142 and retainer 50, 150 (e.g., seat 32 may or not be configured to float).

In some embodiments, assembly 10 may include seat carrier 40, and may not include seat carrier 42. In other embodiments, assembly 10 may include seat carrier 42, and may not include seat carrier 40.

Figure 61:
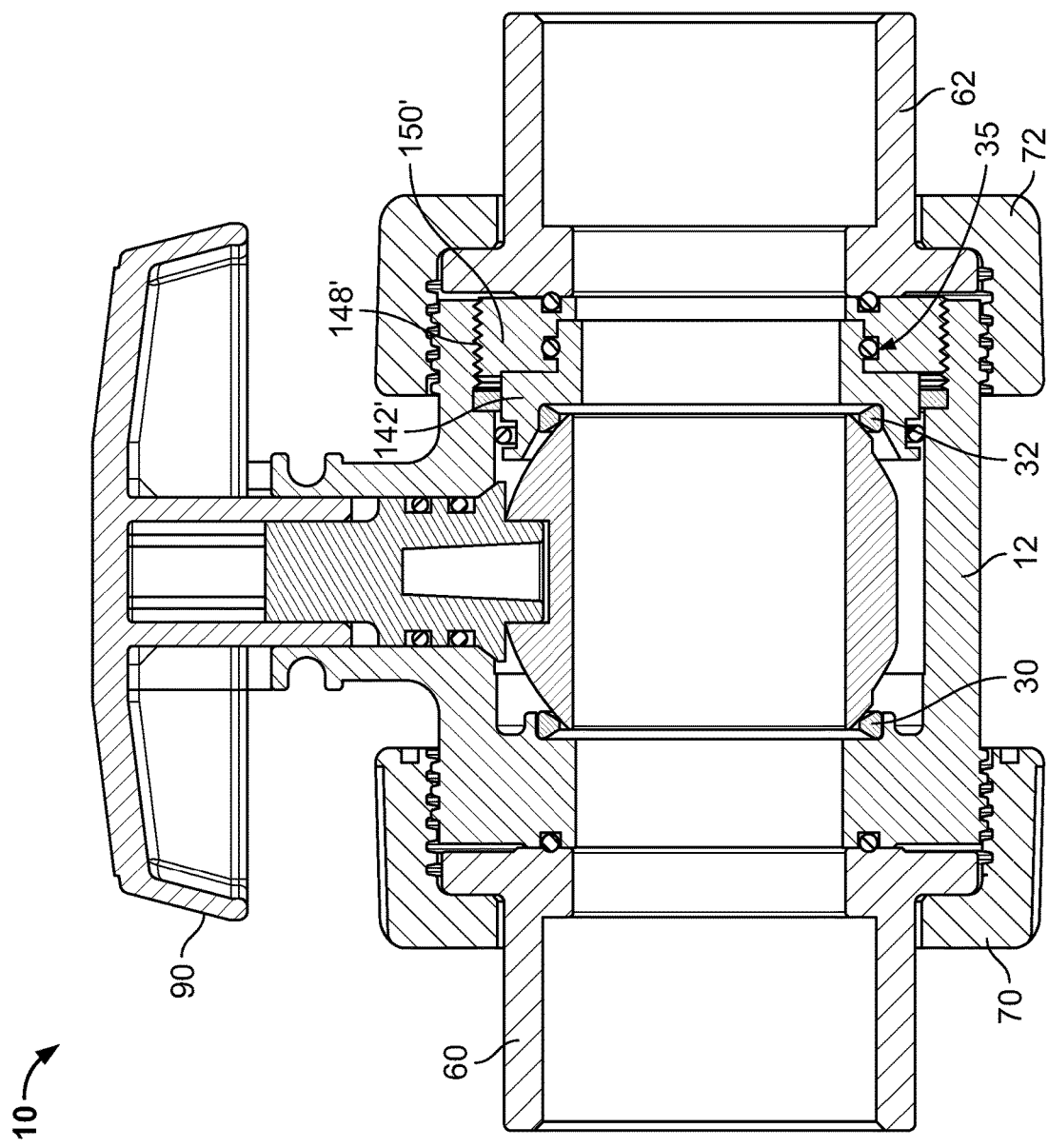
FIG. 61 is a cross-sectional side view of another exemplary ball valve assembly of the present disclosure.

FIG. 61 shows seat 30 not including seat carrier 40. FIG. 61 also shows seal retainer 150' including groove 35 for gasketing material 28 to form a seal with seat carrier 142'. FIG. 61 depicts seal retainer 150' being an adjustable seal retainer 150' (e.g., via threading 148' on seal retainer 150' and threading 8 on body 12). As shown in FIG. 61, there may not be a spring 33 or the like positioned between retainer 150' and carrier 142'.

Figure 62:
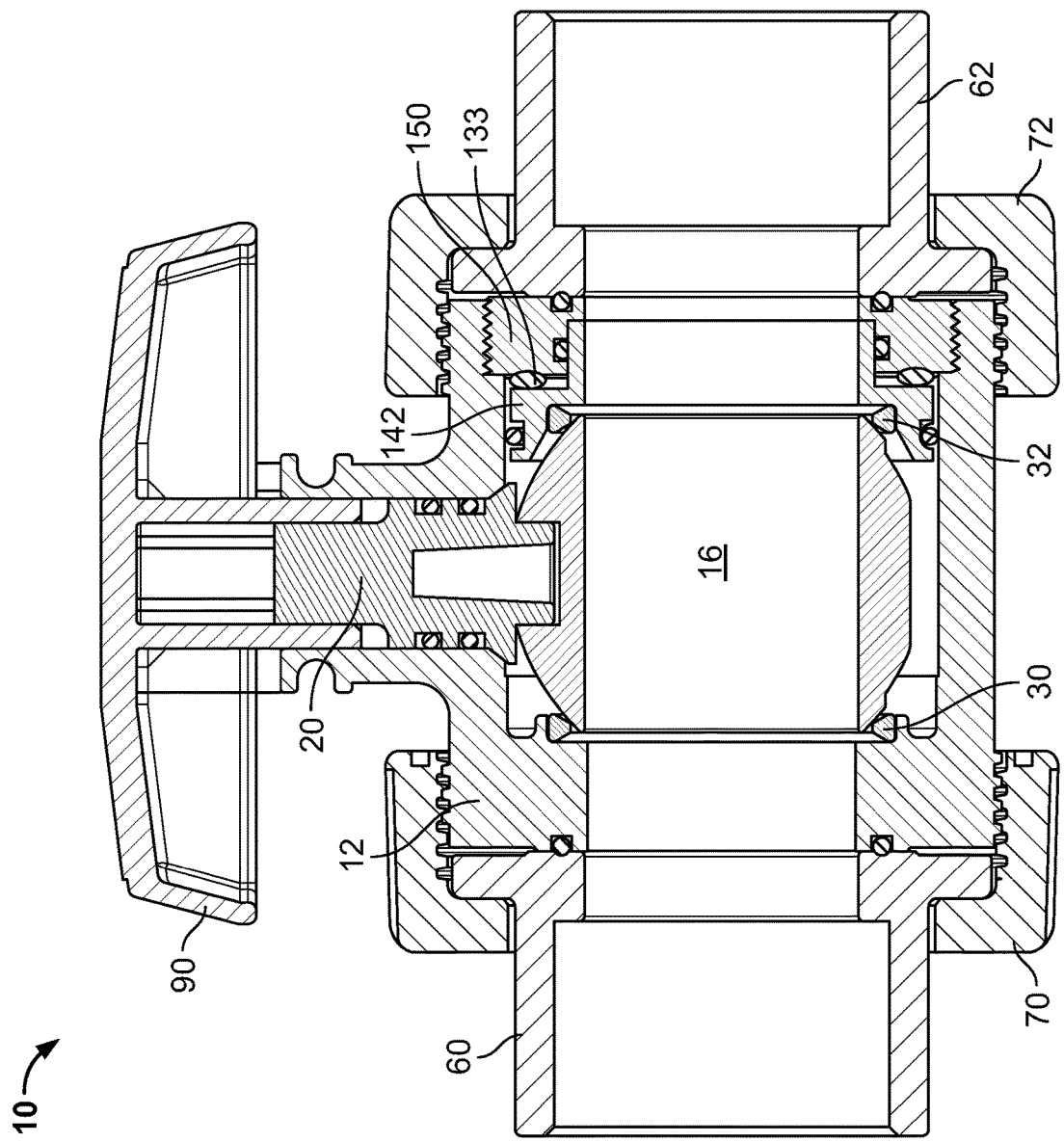
FIG. 62 is a cross-sectional side view of another exemplary ball valve assembly of the present disclosure.

FIG. 62 depicts second seat carrier 142 being an O-ring-loaded carrier 142, via O-ring 133 positioned between retainer 150 and carrier 142. O-ring 133 is configured and dimensioned to function as a spring to act on seat carrier 142, as similarly discussed above in connection with spring 33.

In certain embodiments, first seat carrier 40 and/or second seat carrier 42 can be integral to seat 30, 32. For example, first seat carrier 40 can be integral with seat 30, thereby providing an oversized seat 30 having a seal on its OD (or elsewhere). Such oversized seats 30 (or 32) can have a spring as well (e.g., integral or non-integral spring).

In other embodiments, first seat carrier 40 and/or second seat carrier 42 can be configured and dimensioned to spring to relieve pressure, and/or to maintain seat load. Such features may be especially useful with crush seats.

In certain embodiments, first seat carrier 40 and/or second seat carrier 42 could have two different seal diameters that could be loaded via compressible fluid. The volume of compressible fluid may be trapped between seals and create a cushion effect that forces seat carrier 40, 42 towards (or away from) ball 16. Carriers 40 and 42 could also be loaded via non-compressible fluid with a port through body 12 or elsewhere.

In exemplary embodiments, the present disclosure provides for a ball valve assembly including floating (pressure energized) or moving seat carriers 40, 42, 142 with a floating/moving ball 16. The present disclosure also provides for a ball valve assembly 10 including spring loaded seat carriers 40, 42, 142 with a non-wetted spring and floating ball 16.

The present disclosure also provides for a ball valve assembly including a seat carrier 40, 42, 142 with compressed fluid cushion. The present disclosure also provides for a ball valve assembly including a floating ball valve with seat carriers 40, 42, 142 externally loaded by non-compressible fluid.

The present disclosure also provides for a ball valve assembly including seat carriers 40, 42, 142 that deflect to relieve cavity pressure. The present disclosure also provides for a ball valve assembly including a lock-out plate 80 used as a coupling.

The present disclosure also provides for a ball valve assembly including a lock plate 80 with integral coupling and stops for full open and full closed positions. The present disclosure also provides for a ball valve assembly including a lock plate 80 that allows for valve operation without a handle 90. The present disclosure also provides for a ball valve assembly including a lock-out plate 80 with windows 83 to indicate open, closed, or intermediate positions.

The present disclosure also provides for a ball valve assembly including differentiated snap fits between the handle 90 and lock plate 80 and between the lock plate 80 and stem 20 to ensure that the lock plate 80 stays on the valve when the handle 90 is removed. The present disclosure also provides for a ball valve assembly including a valve with a single floating seat ring 40 or 42, 142. The present disclosure also provides for a ball valve assembly including a self-centering ball 16, seat 30, 32, and seat carrier 40, 42, 142 design.

The present disclosure also provides for a ball valve assembly including the floating seat ring 40, 42, 142 that allows the upstream seat to move downstream with the ball 16 at shutoff so that the seat remains in contact with ball 16. The present disclosure also provides for a ball valve assembly including a seat carrier 40, 42, 142 and seat 30, 32 manufactured as one piece.

The present disclosure also provides for a ball valve assembly including seat carriers 40, 42, 142 that result in lower operating torque as once the ball 16 of the assembly is opened, the ball 16 is not fighting with mechanically loaded seats 30, 32 due to a reduced pre-load requirement.

Although the assemblies, systems and methods of the present disclosure have been described with reference to exemplary embodiments thereof, the present disclosure is not limited to such exemplary embodiments and/or implementations. Rather, the systems, assemblies and methods of the present disclosure are susceptible to many implementations and applications, as will be readily apparent to persons skilled in the art from the disclosure hereof. The present disclosure expressly encompasses such modifications, enhancements and/or variations of the disclosed embodiments. Since many changes could be made in the above construction and many widely different embodiments of this disclosure could be made without departing from the scope thereof, it is intended that all matter contained in the drawings and specification shall be interpreted as illustrative and not in a limiting sense. Additional modifications, changes, and substitutions are intended in the foregoing disclosure.

What is claimed is:

1. A ball valve assembly comprising:
   a body member extending from a first end to a second end and defining a body bore and a neck bore, the body bore having a central longitudinal axis;
   a first seat carrier housing a first seat, the first seat carrier disposed in the first end of the body member;
   a second seat carrier housing a second seat, the second seat carrier disposed in the second end of the body member;
   a ball member disposed in the body bore of the body member between the first and second seat carriers, with the first and second seats engaging the ball member;
   a stem member disposed in the neck bore and coupled to the ball member;
   a seal retainer mounted to the second end of the body member, the seal retainer configured to retain the ball member, the first and second seat carriers and the first and second seats in the body member;
   a first piston seal providing a first seal between an outer surface of the second seat carrier and an inner surface of the body bore of the body member;
   a second piston seal providing a second seal between the outer surface of the second seat carrier and an inner surface of the seal retainer;
   a mounting flange positioned on top of and extending from the neck bore; and
   a lock plate positioned above an upper surface of the mounting flange and mounted to the stem member;
   wherein when the ball member is rotated to a fully closed position via the stem member, the ball member, the first and second seat carriers and the first and second seats are configured to move along the central longitudinal axis in a downstream direction in reaction to an upstream load or applied pressure,
   wherein the first piston seal and the second piston seal prevent bypass between the body member and the seal retainer, wherein a bottom surface of the lock plate includes an abutment protrusion that extends from a first end to a second end, wherein the upper surface of the mounting flange includes a mating groove that extends from a first wall to a second wall, and wherein when the abutment protrusion is positioned in the mating groove, the lock plate and the stem member can be rotated from a first position where the first end of the abutment protrusion abuts against the first wall of the mating groove to a second position where the second end of the abutment protrusion abuts against the second wall of the mating groove.

2. The ball valve assembly of claim 1, wherein the neck bore defines a stem axis, the stem axis positioned transverse to the central longitudinal axis of the body bore; and wherein when the ball member is rotated to a fully open position via the stem member, engagement of the stem member with the ball member forces the ball member to be centered on the stem axis.

3. The ball valve assembly of claim 1 further comprising a first end connector and a first fastener member mounted to the first end of the body member; and a second end connector and a second fastener member mounted to the second end of the body member.

4. The ball valve assembly of claim 3, wherein the first end connector includes an engagement surface that engages an outer surface of the first end of the body member, with gasketing material positioned within a groove of the outer surface of the first end of the body member providing a seal between the engagement surface of the first end connector and the outer surface of the first end of the body member; and wherein the second end connector includes an engagement surface that engages an abutment surface of the seal retainer, with gasketing material positioned within a groove of the abutment surface of the seal retainer providing a seal between the engagement surface of the second end connector and the abutment surface of the seal retainer.

5. The ball valve assembly of claim 3, wherein the first fastener member includes internal threads that engage threads positioned on the first end of the body member, the first fastener member engaging a shoulder surface of the first end connector to force the first end connector against the first end of the body member; and wherein the second fastener member includes internal threads that engage threads positioned on the second end of the body member, the second fastener member engaging a shoulder surface of the second end connector to force the second end connector against the second end of the body member.

6. The ball valve assembly of claim 1 further comprising a mounting pad positioned on a bottom surface of the body member, the mounting pad configured to mount to a mounting surface; and the mounting flange configured to mount to an actuator.

7. The ball valve assembly of claim 1, wherein the stem member includes a groove, with gasketing material positioned within the groove of the stem member providing a seal between the stem member and a surface of the neck bore of the body member.

8. The ball valve assembly of claim 1, wherein the engagement of the first seat with the ball member creates a seal between the ball member and the first seat carrier; and wherein the engagement of the second seat with the ball member creates a seal between the ball member and the second seat carrier.

9. The ball valve assembly of claim 1, wherein the first and second seats are each cylindrical and include a through hole, and the first and second seats each define a diamond-shaped cross-sectional profile revolved about a center axis; and wherein the first and second seats are each designed to deflect under load.

10. The ball valve assembly of claim 1, wherein the first seat carrier includes an outer surface having a groove, with gasketing material positioned within the groove of the outer surface of the first seat carrier providing a seal between the outer surface of the first seat carrier and the inner surface of the body bore of the body member.

11. The ball valve assembly of claim 1, wherein the outer surface of the second seat carrier includes first and second grooves, with the first piston seal positioned within the first groove of the outer surface of the second seat carrier providing the first seal between the outer surface of the second seat carrier and the inner surface of the body bore of the body member, and with the second piston seal positioned within the second groove of the outer surface of the second seat carrier providing the second seal between the outer surface of the second seat carrier and the inner surface of the seal retainer.

12. The ball valve assembly of claim 1, wherein an inner surface of the second end of the body member includes internal threads that extend from the second end to an abutment wall positioned a distance from the second end; and wherein the seal retainer includes threads on an outer surface, with the threads of the seal retainer configured to engage the internal threads of the body member until an inner end of the seal retainer engages the abutment wall of the body member.

13. The ball valve assembly of claim 12, wherein the seal retainer is configured to be moved to a predefined position along the internal threads between the second end of the body member and the abutment wall.

14. The ball valve assembly of claim 12, wherein the seal retainer is configured to be moved to a position along the internal threads and against the abutment wall.

15. The ball valve assembly of claim 1 further comprising a handle member mounted to the lock plate;

wherein the handle member includes a socket that engages a protrusion on an upper surface of the lock plate, and the lock plate includes a female socket on the bottom surface of the lock plate that engages the stem member.

16. The ball valve assembly of claim 1, wherein when the ball member is rotated to a first position via the stem member, a first hole of the lock plate aligns with a first aperture of the mounting flange, with a lock inserted through the aligned first hole and first aperture configured to prevent the lock plate, stem member and ball member from rotating.

17. The ball valve assembly of claim 16, wherein after the lock is removed from the first hole and first aperture and when the ball member is rotated to the second position via the stem member, a second hole of the lock plate aligns with a second aperture of the mounting flange, with the lock inserted through the aligned second hole and second aperture configured to prevent the lock plate, stem member and ball member from rotating.

18. The ball valve assembly of claim 17, wherein the first position is the fully closed position of the ball member, and the second position is a fully open position of the ball member; and
wherein when the lock is inserted through the first hole and first aperture and is locked to prevent the lock plate, stem member and ball member from rotating, the lock plate cannot be removed from the mounting flange without unlocking or destroying the lock; and
wherein when the lock is inserted through the second hole and second aperture and is locked to prevent the lock plate, stem member and ball member from rotating, the lock plate cannot be removed from the mounting flange without unlocking or destroying the lock.

19. The ball valve assembly of claim 1, wherein when the ball member is rotated to the first position, a window of the lock plate aligns with and exposes a first position indication marking of the mounting flange; and
wherein when the ball member is rotated to the second position, the window of the lock plate aligns with and exposes a second position indication marking of the mounting flange.

20. The ball valve assembly of claim 19, wherein the first position is the fully closed position of the ball member, and the second position is a fully open position of the ball member.

21. The ball valve assembly of claim 1, wherein the first position is the fully closed position of the ball member, and the second position is a fully open position of the ball member.

22. The ball valve assembly of claim 1 wherein the abutment protrusion extends from its first end to its second end to define a 90° quadrant on the bottom surface of the lock plate; and
wherein the mating groove extends from the first wall to the second wall to define a 180° semicircle on the upper surface of the mounting flange.

23. The ball valve assembly of claim 1 further comprising a face seal integral to the first seat carrier or integral to the body member, the face seal providing a seal between the first seat carrier and the body member.

24. The ball valve assembly of claim 1, wherein when the ball member is rotated to the fully closed position, and when increased cavity pressure exists in the body member, the first and second seat carriers and the first and second seats are configured to move away from the ball member to relieve the increased cavity pressure of the body member.

25. A ball valve assembly comprising:
a body member extending from a first end to a second end and defining a body bore and a neck bore, the body bore having a central longitudinal axis;
a first seat carrier housing a first seat, the first seat carrier disposed in the first end of the body member;
a second seat carrier housing a second seat, the second seat carrier disposed in the second end of the body member;
a ball member disposed in the body bore of the body member between the first and second seat carriers, with the first and second seats sealingly engaging the ball member;
a stem member disposed in the neck bore and coupled to the ball member;
a seal retainer mounted to the second end of the body member, the seal retainer configured to retain the ball member, the first and second seat carriers and the first and second seats in the body member;
a first piston seal providing a first seal between an outer surface of the second seat carrier and an inner surface of the body bore of the body member; and
a second piston seal providing a second seal between the outer surface of the second seat carrier and an inner surface of the seal retainer;
wherein when the ball member is rotated to a fully closed position via the stem member, the ball member, the first and second seat carriers and the first and second seats are configured to move along the central longitudinal axis in a downstream direction in reaction to an upstream load or applied pressure;
wherein when the ball member is rotated to the fully closed position and when the downstream direction is configured to flow from the first end to the second end of the body member, then: (i) the ball member is configured to move along the central longitudinal axis in the downstream direction and apply a first downstream load against the second seat in reaction to the upstream load or applied pressure, the first downstream load increasing sealing contact stress between the ball member and the second seat, and (ii) the first seat carrier and the first seat are configured to move along the central longitudinal axis in the downstream direction and apply a second downstream load against the ball member in reaction to the upstream load or applied pressure, the second downstream load increasing sealing contact stress between the ball member and the first seat and between the ball member and the second seat;
wherein when the ball member is rotated to the fully closed position and when the downstream direction is configured to flow from the second end to the first end of the body member, then: (i) the ball member is configured to move along the central longitudinal axis in the downstream direction and apply a third downstream load against the first seat in reaction to the upstream load or applied pressure, the third downstream load increasing sealing contact stress between the ball member and the first seat, and (ii) the second seat carrier and the second seat are configured to move along the central longitudinal axis in the downstream direction and apply a fourth downstream load against the ball member in reaction to the upstream load or applied pressure, the fourth downstream load increasing sealing contact stress between the ball member and the second seat and between the ball member and the first seat, and
wherein the first piston seal and the second piston seal prevent bypass between the body member and the seal retainer.

26. The ball valve assembly of claim 25, wherein the first seat carrier includes an outer surface having a groove, with gasketing material positioned within the groove of the outer surface of the first seat carrier providing a seal between the outer surface of the first seat carrier and the inner surface of the body bore of the body member.

27. The ball valve assembly of claim 25, wherein the outer surface of the second seat carrier includes first and second grooves, with the first piston seal positioned within the first groove of the outer surface of the second seat carrier providing the first seal between the outer surface of the second seat carrier and the inner surface of the body bore of the body member, and with the second piston seal positioned within the second groove of the outer surface of the second seat carrier providing the second seal between the outer surface of the second seat carrier and the inner surface of the seal retainer.

28. The ball valve assembly of claim 25, further comprising a mounting flange positioned on top of and extending from the neck bore; and
    a lock plate positioned above an upper surface of the mounting flange and mounted to the stem member.

29. The ball valve assembly of claim 28, wherein a bottom surface of the lock plate includes an abutment protrusion that extends from a first end to a second end,
    wherein the upper surface of the mounting flange includes a mating groove that extends from a first wall to a second wall, and
    wherein when the abutment protrusion is positioned in the mating groove, the lock plate and the stem member can be rotated from a first position where the first end of the abutment protrusion abuts against the first wall of the mating groove to a second position where the second end of the abutment protrusion abuts against the second wall of the mating groove.

30. The ball valve assembly of claim 29, wherein the first position is the fully closed position of the ball member, and the second position is a fully open position of the ball member.

31. The ball valve assembly of claim 29, wherein the abutment protrusion extends from its first end to its second end to define a 90° quadrant on the bottom surface of the lock plate; and
    wherein the mating groove extends from the first wall to the second wall to define a 180° semicircle on the upper surface of the mounting flange.

32. The ball valve assembly of claim 25, further comprising a face seal integral to the first seat carrier or integral to the body member, the face seal providing a seal between the first seat carrier and the body member.

33. The ball valve assembly of claim 25, wherein when the ball member is rotated to the fully closed position, and when increased cavity pressure exists in the body member, the first and second seat carriers and the first and second seats are configured to move away from the ball member to relieve the increased cavity pressure of the body member.

34. A ball valve assembly comprising:
    a body member extending from a first end to a second end and defining a body bore and a neck bore, the body bore having a central longitudinal axis;
    a first seat carrier housing a first seat, the first seat carrier disposed in the first end of the body member;
    a second seat carrier housing a second seat, the second seat carrier disposed in the second end of the body member;
    a ball member disposed in the body bore of the body member between the first and second seat carriers, with the first and second seats sealingly engaging the ball member;
    a stem member disposed in the neck bore and coupled to the ball member;
    a seal retainer mounted to the second end of the body member, the seal retainer configured to retain the ball member, the first and second seat carriers and the first and second seats in the body member;
    a first piston seal providing a first seal between an outer surface of the second seat carrier and an inner surface of the body bore of the body member; and
    a second piston seal providing a second seal between the outer surface of the second seat carrier and an inner surface of the seal retainer;
    wherein when the ball member is rotated to a fully closed position via the stem member, the ball member, the first and second seat carriers and the first and second seats are configured to move along the central longitudinal axis in a downstream direction in reaction to an upstream load or applied pressure;
    wherein when the ball member is rotated to the fully closed position and when the downstream direction is configured to flow from the first end to the second end of the body member, then the first seat carrier and the first seat are configured to move along the central longitudinal axis in the downstream direction and apply a first downstream load against the ball member in reaction to the upstream load or applied pressure, the first downstream load increasing sealing contact stress between the ball member and the first seat;
    wherein when the ball member is rotated to the fully closed position and when the downstream direction is configured to flow from the second end to the first end of the body member, then the second seat carrier and the second seat are configured to move along the central longitudinal axis in the downstream direction and apply a second downstream load against the ball member in reaction to the upstream load or applied pressure, the second downstream load increasing sealing contact stress between the ball member and the second seat, and
    wherein the first piston seal and the second piston seal prevent bypass between the body member and the seal retainer.

35. The ball valve assembly of claim 34, wherein the first seat carrier includes an outer surface having a groove, with gasketing material positioned within the groove of the outer surface of the first seat carrier providing a seal between the outer surface of the first seat carrier and the inner surface of the body bore of the body member.

36. The ball valve assembly of claim 34, wherein the outer surface of the second seat carrier includes first and second grooves, with the first piston seal positioned within the first groove of the outer surface of the second seat carrier providing the first seal between the outer surface of the second seat carrier and the inner surface of the body bore of the body member, and with the second piston seal positioned within the second groove of the outer surface of the second seat carrier providing the second seal between the outer surface of the second seat carrier and the inner surface of the seal retainer.

37. The ball valve assembly of claim 34, further comprising a mounting flange positioned on top of and extending from the neck bore; and
    a lock plate positioned above an upper surface of the mounting flange and mounted to the stem member.

38. The ball valve assembly of claim 37, wherein a bottom surface of the lock plate includes an abutment protrusion that extends from a first end to a second end,
    wherein the upper surface of the mounting flange includes a mating groove that extends from a first wall to a second wall, and
    wherein when the abutment protrusion is positioned in the mating groove, the lock plate and the stem member can be rotated from a first position where the first end of the abutment protrusion abuts against the first wall of the mating groove to a second position where the second end of the abutment protrusion abuts against the second wall of the mating groove.

39. The ball valve assembly of claim 38, wherein the first position is the fully closed position of the ball member, and the second position is a fully open position of the ball member.

40. The ball valve assembly of claim 38, wherein the abutment protrusion extends from its first end to its second end to define a 90° quadrant on the bottom surface of the lock plate; and wherein the mating groove extends from the first wall to the second wall to define a 180° semicircle on the upper surface of the mounting flange.

41. The ball valve assembly of claim 34, further comprising a face seal integral to the first seat carrier or integral to the body member, the face seal providing a seal between the first seat carrier and the body member.

42. The ball valve assembly of claim 34, wherein when the ball member is rotated to the fully closed position, and when increased cavity pressure exists in the body member, the first and second seat carriers and the first and second seats are configured to move away from the ball member to relieve the increased cavity pressure of the body member.

43. A ball valve assembly comprising:
a body member extending from a first end to a second end and defining a body bore and a neck bore, the body bore having a central longitudinal axis;
a first seat carrier housing a first seat, the first seat carrier disposed in the first end of the body member;
a second seat carrier housing a second seat, the second seat carrier disposed in the second end of the body member;
a ball member disposed in the body bore of the body member between the first and second seat carriers, with the first and second seats engaging the ball member;
a stem member disposed in the neck bore and coupled to the ball member;
a seal retainer mounted to the second end of the body member, the seal retainer configured to retain the ball member, the first and second seat carriers and the first and second seats in the body member;
a first piston seal providing a first seal between an outer surface of the second seat carrier and an inner surface of the body bore of the body member;
a second piston seal providing a second seal between the outer surface of the second seat carrier and an inner surface of the seal retainer; and
a face seal integral to the first seat carrier or integral to the body member, the face seal providing a seal between the first seat carrier and the body member,
wherein when the ball member is rotated to a fully closed position via the stem member, the ball member, the first and second seat carriers and the first and second seats are configured to move along the central longitudinal axis in a downstream direction in reaction to an upstream load or applied pressure, and
wherein the first piston seal and the second piston seal prevent bypass between the body member and the seal retainer.

44. The ball valve assembly of claim 43, wherein the first seat carrier includes an outer surface having a groove, with gasketing material positioned within the groove of the outer surface of the first seat carrier providing a seal between the outer surface of the first seat carrier and the inner surface of the body bore of the body member.

45. The ball valve assembly of claim 43, wherein the outer surface of the second seat carrier includes first and second grooves, with the first piston seal positioned within the first groove of the outer surface of the second seat carrier providing the first seal between the outer surface of the second seat carrier and the inner surface of the body bore of the body member, and with the second piston seal positioned within the second groove of the outer surface of the second seat carrier providing the second seal between the outer surface of the second seat carrier and the inner surface of the seal retainer.

46. The ball valve assembly of claim 43, further comprising a mounting flange positioned on top of and extending from the neck bore; and
a lock plate positioned above an upper surface of the mounting flange and mounted to the stem member.

47. The ball valve assembly of claim 37, wherein a bottom surface of the lock plate includes an abutment protrusion that extends from a first end to a second end,
wherein the upper surface of the mounting flange includes a mating groove that extends from a first wall to a second wall, and
wherein when the abutment protrusion is positioned in the mating groove, the lock plate and the stem member can be rotated from a first position where the first end of the abutment protrusion abuts against the first wall of the mating groove to a second position where the second end of the abutment protrusion abuts against the second wall of the mating groove.

48. The ball valve assembly of claim 47, wherein the first position is the fully closed position of the ball member, and the second position is a fully open position of the ball member.

49. The ball valve assembly of claim 47, wherein the abutment protrusion extends from its first end to its second end to define a 90° quadrant on the bottom surface of the lock plate; and
wherein the mating groove extends from the first wall to the second wall to define a 180° semicircle on the upper surface of the mounting flange.

50. The ball valve assembly of claim 43, wherein when the ball member is rotated to the fully closed position, and when increased cavity pressure exists in the body member, the first and second seat carriers and the first and second seats are configured to move away from the ball member to relieve the increased cavity pressure of the body member.

* * * * *